US008934587B2

(12) United States Patent
Weber

(10) Patent No.: US 8,934,587 B2
(45) Date of Patent: Jan. 13, 2015

(54) SELECTIVE-SAMPLING RECEIVER

(76) Inventor: Daniel Weber, Cedar City, UT (US)

(*) Notice: Subject to any disclaimer, the term of this patent is extended or adjusted under 35 U.S.C. 154(b) by 39 days.

(21) Appl. No.: 13/552,949

(22) Filed: Jul. 19, 2012

(65) Prior Publication Data

US 2013/0023225 A1 Jan. 24, 2013

Related U.S. Application Data

(60) Provisional application No. 61/510,348, filed on Jul. 21, 2011.

(51) Int. Cl.
*H04L 25/08* (2006.01)
*G01S 7/02* (2006.01)
*G01S 7/28* (2006.01)
*G01S 7/36* (2006.01)

(52) U.S. Cl.
CPC .............. *G01S 7/023* (2013.01); *G01S 7/2813* (2013.01); *G01S 7/36* (2013.01)
USPC .......................................... 375/346; 375/348

(58) Field of Classification Search
CPC .. H04B 1/7107; H04B 1/7115; H04B 1/7117; H04L 27/2649
USPC .................. 375/346, 348, 350, 349, 144, 148
See application file for complete search history.

(56) References Cited

U.S. PATENT DOCUMENTS

| | | | |
|---|---|---|---|
| 4,584,710 A | | 4/1986 | Hansen |
| 4,878,251 A | * | 10/1989 | Richardson .................... 455/206 |
| 4,972,430 A | | 11/1990 | Cantwell |
| 5,294,933 A | * | 3/1994 | Lee et al. ....................... 342/159 |
| 5,600,675 A | * | 2/1997 | Engeler ........................... 375/261 |
| 6,172,970 B1 | * | 1/2001 | Ling et al. ...................... 370/347 |
| 6,243,052 B1 | * | 6/2001 | Goldstein et al. ............. 343/895 |
| 6,901,105 B1 | | 5/2005 | Razzell |
| 6,930,637 B2 | * | 8/2005 | Brothers et al. ............... 342/427 |
| 7,139,393 B1 | | 11/2006 | Murase |

(Continued)

FOREIGN PATENT DOCUMENTS

| | | |
|---|---|---|
| WO | WO2006/078314 | 7/2006 |
| WO | WO 2006078314 | 7/2006 |

OTHER PUBLICATIONS

Applebaum, Sidney P. "Adaptive Arrays with Main Beam Constraints", IEEE Transactions on Antennas and Propagation, vol. AP-24, No. 5, Sep. 1976.

(Continued)

*Primary Examiner* — Emmanuel Bayard
(74) *Attorney, Agent, or Firm* — Workman Nydegger

(57) ABSTRACT

A receiver that selectively samples a received signal in order to suppress an interference component of the signal while recovering a desired component. The selective sampling may be accomplished by low cost, low complex analog or digital circuitry. The receiver includes a first input that receives a first signal, including a desired signal component and an interference signal component and a second input that receives a second signal including the interference component only. The first and second signals are then provided to the sampling circuitry. First, the phase of the interference component of the both the first and second signals is aligned. Next, the points in a wave cycle that the second signal is at a power minimum are detected. Finally, first signal is sampled close to the point when the second signal is at the power minimum to recover the desired signal component and suppress the interference component.

19 Claims, 45 Drawing Sheets

(56) References Cited

U.S. PATENT DOCUMENTS

| | | | |
|---|---|---|---|
| 7,174,022 B1* | 2/2007 | Zhang et al. | 381/92 |
| 7,295,145 B2 | 11/2007 | Weber | |
| 7,417,584 B1* | 8/2008 | Reifler et al. | 342/148 |
| 7,660,341 B2 | 2/2010 | Durand et al. | |
| 7,969,344 B1 | 6/2011 | Mahafza | |
| 8,026,839 B2 | 9/2011 | Weber | |
| 2001/0050948 A1 | 12/2001 | Ramberg et al. | |
| 2002/0064245 A1 | 5/2002 | McCorkle | |
| 2002/0169578 A1* | 11/2002 | Yang | 702/152 |
| 2003/0112905 A1 | 6/2003 | Heinzl et al. | |
| 2004/0046695 A1* | 3/2004 | Brothers et al. | 342/427 |
| 2004/0053596 A1 | 3/2004 | Svensson et al. | |
| 2005/0253748 A1* | 11/2005 | Brookner | 342/74 |
| 2006/0077097 A1* | 4/2006 | Dybdal et al. | 342/359 |
| 2006/0079290 A1 | 4/2006 | Seto et al. | |
| 2006/0176988 A1 | 8/2006 | Sohn et al. | |
| 2006/0212910 A1 | 9/2006 | Endres et al. | |
| 2007/0086547 A1 | 4/2007 | Sobchak et al. | |
| 2007/0096976 A1 | 5/2007 | Loehner et al. | |
| 2007/0244698 A1* | 10/2007 | Dugger et al. | 704/228 |
| 2008/0291087 A1* | 11/2008 | Tietjen et al. | 342/372 |
| 2008/0317259 A1* | 12/2008 | Zhang et al. | 381/92 |
| 2009/0161749 A1* | 6/2009 | Nangia et al. | 375/233 |
| 2011/0157067 A1* | 6/2011 | Wagner et al. | 345/174 |
| 2013/0201898 A1* | 8/2013 | Yu et al. | 370/312 |

OTHER PUBLICATIONS

Godara, Lal Chand, "Smart Antennas", Book, pp. 1-443, 2004 CTC Press LLC, Boca Raton, Florida.

Griffiths, Lloyd J., "An Alternative Approach to Linearly Constrained Adaptive Beamforming", IEEE Transactions on Antennas and Propagation, vol. AP-30, No. 1, Jan. 1982.

Matthaei, G. et al., "Microwave Filters, Impedance-Matching Networks, and Coupling Structures", Book, pp. 434-440, 1980 Norwood, MA: Artech House.

Thomas, Timothy et al., "Suppression of Strong Interference in Broadband Communications via Filter Banks", IPCOM000141444D, Sep. 23, 2004, Allerton 2004, Motorola, Inc.

U.S. Appl. No. 11/186,712, May 21, 2007, Notice of Allowance.
U.S. Appl. No. 11/186,712, Jun. 27, 2007, Notice of Allowance.
U.S. Appl. No. 11/186,712, Sep. 11, 2007, Notice of Allowance.
U.S. Appl. No. 11/938,697, Jan. 4, 2011, Office Action.
U.S. Appl. No. 11/938,697, Jul. 8, 2011, Notice of Allowance.
PCT/US2012/047724, Dec. 21, 2012, International Search Report and Written Opinion.

* cited by examiner

Encoding SSR TX process to encode data streams.

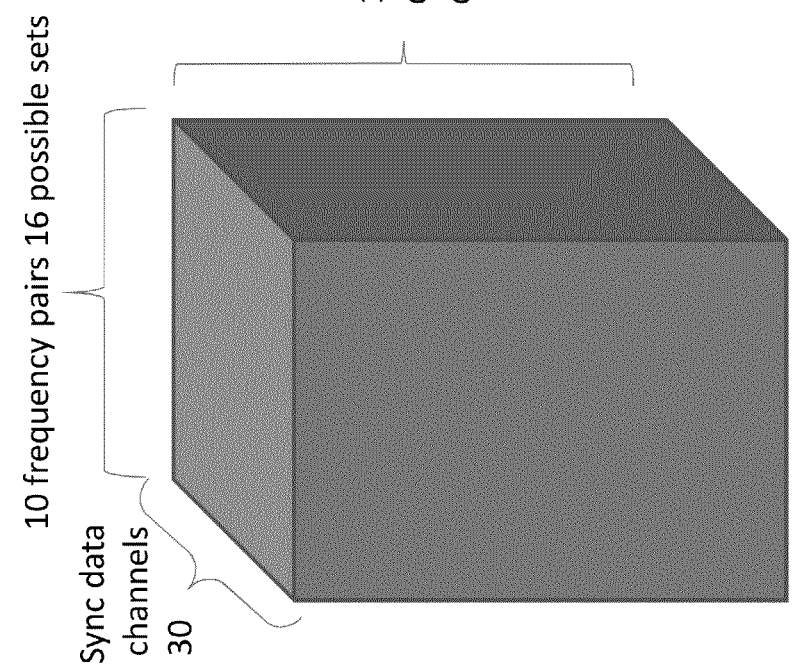

10 frequency pairs 16 possible sets

Sync data channels 30

10 RX delay channels

With the many different ways that the SSR can be applied there are countless possibilities of ways to encode a data transmission in the transmission process itself. Without including modulation types in the figure on the left 4800 possible TX ways are possible with the self imposed constraints as shown. When the wrong key is chosen the encoded data stream is never received. Such a interception of the data stream leaves the data open to be cracked by ever sophisticated programs and systems.

4800 possible transmission types as shown.

FIG. 41

Two frequency channels and four vertical channels gives a two to one data overlay with four data streams per frequency channel.

4400

SELECTIVE-SAMPLING RECEIVER

CROSS-REFERENCE TO RELATED APPLICATIONS

This application claims the benefit of U.S. Provisional Application 61/510,348, filed Jul. 21, 2011, which application is incorporated by reference in its entirety.

BACKGROUND OF THE INVENTION

1. The Field of the Invention

The present invention relates generally to receiver systems and methods for interference suppression. More specifically, the present invention relates to a selective-sampling receiver and methods able to mitigate the interference in received signals.

2. The Relevant Technology

Transmitting and receiving radio frequency (RF) signals over the airwaves is a vital part of the world today, having wide use in military and commercial applications. For example, radar systems at an airport send and receive signals that are used to track airplanes taking off and landing. Radar signals are also used to track the movement of armed forces on a battlefield or are used to track incoming enemy missiles or planes. In like manner, cellular phones use an antenna to send and receive voice communication signals.

All systems that receive RF signals, from the hand held cellular phone to the most complex radar system, include a receiver. The receiver is used to process signals received from an antenna. For example, the receiver may down convert the frequency of the received signals or may amplify the received signals. The receiver may also be used to sample portions of the signals. Once the receiver has finished processing the received signals, the receiver will generally send the signals to other equipment and systems such as a signal processor for further processing.

However, the signals that are provided to or received by the receiver often are distorted by various amounts of signal interference. This interference and/or noise may be from natural causes such as rain or other environmental effects. The interference may also come from other RF signals that have not been properly isolated from the desired signal. The interference may even be purposefully added, such as an interference signal from a radar jamming device used in a military application. Interference can prevent a receiver from correctly receiving and interpreting desired signals. As a result, the interference must be dealt with by the receiver or the signal provided to the signal processor will be distorted.

In the past, many techniques have been used to suppress signal interference in the receiver. Perhaps the most common is the use of a generalized side lobe canceller. The generalized side lobe canceller uses low-gain antennas to isolate the interference signals from a desired signal. Adaptively selected magnitude and phase weights are applied to the interference signals. These weights are then used to estimate the interference component of the desired signal. The estimated interference component is then subtracted out of the desired signal, thus leaving a signal free of most interference.

Another technique that is used in receiver interference suppression is the co-channel interference mitigation in the time-scale domain algorithm. This algorithm uses a wavelet transform to estimate and reconstruct the interference from a null space in the desired signal in the time-scale domain. The estimated interferer is then subtracted from the observations and the remaining signal is an approximation of the desired signals.

These techniques and others in the prior art are able to reasonably suppress signal interference. However, they are very complex and costly. For example, a large number of antenna arrays may be necessary for interference estimates. In addition, the receiver requires costly processing abilities for making the interference estimates and then subtracting them out of the desired signal. The receiver may also need complex circuitry to perform the interference suppression operation. Therefore, what would be advantageous is a low complexity receiver with the ability to suppress interference signals using low cost components.

BRIEF SUMMARY OF THE INVENTION

The forgoing problems with the prior state of the art are overcome by the principles of the present invention, which relate to a receiver with the ability to selectively-sample a received signal in order to suppress an interference signal component of the signal or suppress or remove noise including thermal noise while recovering a desired signal component. The selective-sampling may be accomplished by low cost, low complex analog or digital circuitry. The sampling may also be accomplished by digital algorithms.

The receiver includes a first input (e.g., an antenna) that receives a first signal. The first signal may include a desired signal component and an interference signal component. This first signal may be the summation output of a sigma-delta ($\Sigma\Delta$) beam-forming network The receiver also includes a second input that receives a second signal. The second signal includes the interference component only in some embodiments. This second signal may be the difference output of a $\Sigma\Delta$ beam-forming network which has subtracted out the desired signal component.

The first and second signals are provided to sampling circuitry. The sampling circuitry, which may be analog or digital circuitry, performs a sampling operation on the signals. First, the phase of the interference component of the both the first and second signals is aligned. Next, the points in a wave cycle where the interference component of the second signal are at a power minimum are detected. Finally, the first signal is sampled as close as possible to the point when the second signal is at the power minimum as the interference component of the first signal will also be at a power minimum. With the interference component at a minimum, only the desired signal component will be sampled. In this way, the desired signal is recovered and the interference signal is suppressed.

In other embodiments, the unwanted signal can be recovered when aspects of the desired signal are known. A timing signal, for example, for the desired signal can be used to sample a signal (that includes both the desired and undesired components) at the zero crossings of the desired signal. This enables the undesired or unwanted signal to be recovered. Once the unwanted signal is recovered, it can be subtracted out or be inputted to the zero crossing input of a second stage Selective Sampling Receiver to recover the desired signal. Embodiments further suppress thermal noise in one or more channels processed by the selective-sampling receiver.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

FIG. 41 illustrates an example of encoding using SSRs.

DETAILED DESCRIPTION OF THE PREFERRED EMBODIMENTS

Figure 1A:
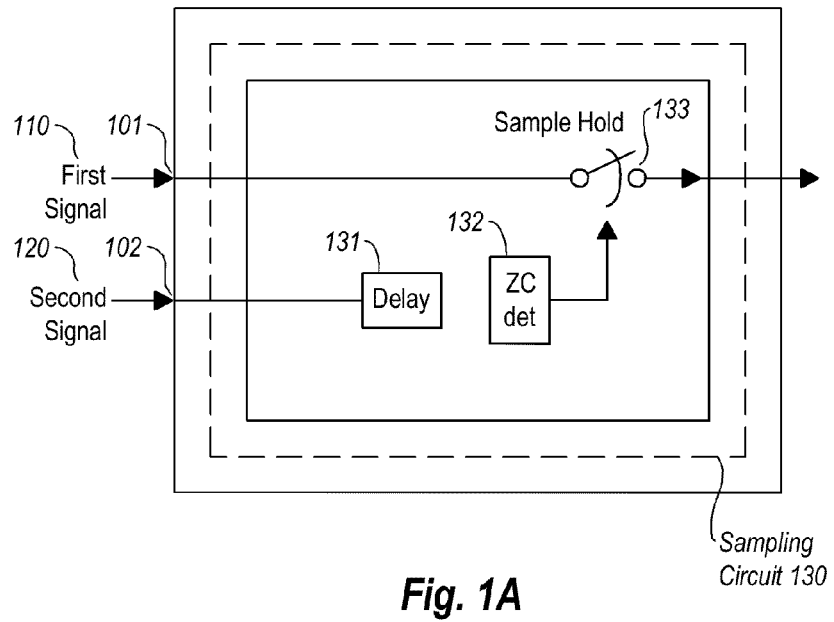
FIG. 1A schematically illustrates a ideal selective-sampling receiver in accordance with the principles of the present invention.

The following applications are incorporated herein by reference: U.S. patent application Ser. No. 11/938,697 filed Nov. 12, 2007, U.S. Pat. No. 7,295,145, and U.S. Provisional Patent Application Ser. No. 60/590,095, filed Jul. 22, 2004.

Embodiments of the present invention relate to a receiver (or a selective-sampling receiver (SSR)) with the ability to selectively-sample a received signal in order to suppress an interference signal component of the signal or noise in the signal while recovering a desired signal component. The selective-sampling may be accomplished by low cost, low complex analog or digital circuitry. The sampling may also be accomplished by digital algorithms.

Embodiments of the present invention further relate to systems and methods for suppressing noise (including thermal noise), removing interference, and/or recovering signals using a selective sampling receiver as disclosed herein. The suppression of noise and/or removal of unwanted signals from a desired signal can have many applications that can be implemented with mainly passive components in some embodiments.

The receiver includes a first input that receives a first signal. The first signal includes a desired signal component and an interference signal component. This first signal may be the summation output of a sigma-delta (ΣΔ) beam-forming network The receiver also includes a second input that receives a second signal. The second signal includes the interference component only in one embodiment. This second signal may be the difference output of a ΣΔ beam-forming network which has totally subtracted out the desired signal component.

The first and second signals are provided to sampling circuitry. The sampling circuitry, which may be analog or digital circuitry, performs a sampling operation on the signals. First, the phase of the interference component of the both the first and second signals is aligned. Next, the points in a wave cycle that the interference component of the second signal is at a power minimum are detected. Finally, the first signal is sampled as close as possible to the point when the second signal is at the power minimum as the interference component of the first signal will also be at a power minimum. With the interference component at a minimum, only the desired signal component will be sampled. In this way, the desired signal is recovered and the interference signal is suppressed. The recovered signal can be digitized.

Embodiments of the selective-sampling receiver mitigate interference. Embodiments operate in one or more domains including the frequency domain and/or the time domain. The selective sampling receiver can operate after the frequency domain filtration of interference. For example, a simulation may be of two signals at exactly the same radio frequency. As a result, the frequency domain filtering cannot separate out desired signal from the undesired signal. This separation, however, can be done in the time domain by the embodiments disclosed herein.

The selective sampler may incorporate high-speed samplers. These devices take samples of a signal as it passes by in time and converts the samples into a digital format. By selecting when samples are taken, the selective sampling receiver can recreate the desired signal and/or the unwanted or interfering signal.

For example, as an interfering signal is received, its wave passes through its place of rest, or minimum energy points, twice a cycle. These points are at the 0 degree and 180 degree points in one example. By synchronizing off an interfering signal's minimum energy points and keying the sampler accordingly, signals can be seen that would be otherwise hidden by the stronger interfering signal.

In some embodiments of the selective-sampling receiver, only the phase of the unwanted signal is used—not the amplitude. As a result, embodiments are much simpler, less expensive, and easier to implement than traditional subtraction scheme devices since nulling/subtraction schemes need both the phase and amplitude to accurately suppress a signal.

Embodiments provide suppression of an unwanted signal, whether the unwanted signal is introduced on purpose or is introduced because of noise such as thermal noise. Test results show approximately a 20-30 dB or a 100-1000 to-one suppression of an unwanted signal or unwanted signals. Greater suppression is possible with higher quality radio receivers that will properly process still smaller wanted signal in the presence of the jamming signal. Simulations have shown 40-50 dB or 10,000-100,000 to one suppuration from a signal stage. Referring to FIG. 1A, an exemplary selective-sampling receiver system 100 in which the principles of the present may be practiced is illustrated. Selective-sampling receiver system 100 is shown by way of illustration only and is not intended to limit the scope of the appended claims. It will become to clear to one skilled in the art from reading this specification that there are numerous ways to implement the selective-sampling receiver 100.

Selective-sampling receiver 100 includes a first receive input 101 for accessing a first signal 110. First signal 110 may be a sine wave, a square wave, a triangular wave, a pulse or any other periodic waveform at any frequency. Selective-sampling receiver 100 takes advantage of the periodic nature of the input waveform to perform a selective-sampling operation as will be described in more detail below with respect to FIG. 2.

First signal 110 is comprised of a desired signal component and an interference signal component. First signal 110 may also include other components such as thermal noise. In some embodiments, first signal 110 may be the summation output of a sigma-delta (ΣΔ) beam-forming network as will be described in further detail to follow. However, this is not required as first signal 110 may be produced by any means known in the art that combines two or more signal components into a single signal.

Selective-sampling receiver 100 also includes a second receive input 102 for accessing a second signal 120. Second signal 120 may also be a sine wave, a square wave, a triangular wave, a pulse or any other periodic waveform at any frequency. Second signal 120 is comprised of an interference signal component and may include other signal components such as thermal noise. In some embodiments, second signal 120 may be the difference output of a ΣΔ beam-forming network as will be described in further detail to follow. However, this is not required as second signal 120 may be produced by any means known to the art.

In other embodiments discloses herein, the first signal 110 and the second signal 1120 may be the same signal, the same signal transmitted and/or received at different times, or the like. In another example, the second signal 120 may be the wanted signal such that the selective sampling receiver can recover the unwanted signal from the first signal 110.

Selective-sampling receiver 100 further includes sampling circuitry 130. Sampling circuitry 130 is configured to selectively sample the first signal 110 so as to suppress the interference component of the signal and thereby recover the desired signal component. Sampling circuitry 130 may be implemented by numerous different combinations of analog or digital components. Advantageously, the selective-sampling operation may be performed by sampling circuitry 130 components that are low complexity and low cost. It should be noted that selective-sampling receiver 100 may perform the selective-sampling operation on any periodic waveform of any frequency. This includes using the selective-sampling operation in applications such as radar, sonar, and hearing aids. The selective-sampling receiver and the selective-sampling operation should not be construed to only apply to high frequency applications.

For example, sampling circuitry 130 may include delay circuitry 131 for aligning the phase of the interference component of both the first signal 110 and the second signal 120. Zero-crossing detector circuitry 132 may be used to detect the power minimums of the interference components during a wave cycle. Sample-hold circuitry 133 may be used to sample the first signal 110 at the proper time. In FIG. 1, sample-hold circuitry 133 is depicted as a switch that closes whenever zero-crossing detector 132 detects a power minimum. Sampling circuitry 130 may also include other components such as inverters, amplifiers for signal amplification, resistors, filters, and the like. As mentioned, there are numerous circuit component implementations of selective-sampling circuitry 130.

Figure 1B:
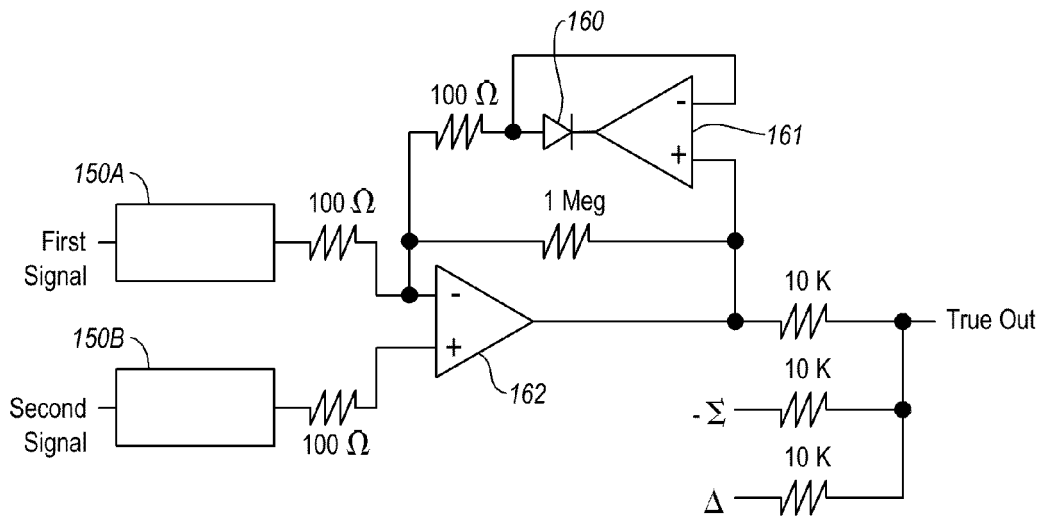
FIG. 1B schematically illustrates a specific analog embodiment of the selective-sampling receiver of FIG. 1A.

FIG. 1B illustrates a specific analog implementation of selective-sampling receiver 100. This specific implementation is by way of example only, and should not be read to limit the claims. As mentioned previously, one skilled in the art will appreciate that there are numerous different circuit implementations of selective-sampling receiver 100. As will be obvious from FIG. 1B, all of the components of the specific analog implementation of selective-sampling receiver 100 are low complexity, low cost consumer electronic components that may be easy implemented.

Specific analog implementation of selective-sampling receiver 100 includes elements 150A and 150B that may correspond to delay circuitry 131 of FIG. 1B and is used to align the phases of the interference components. Diode 160 acts as the zero-crossing detector 132 and the sample-hold circuitry 133. In this example, the diode 160 responds to absolute biasing and produces gain when the second signal is more negative than the first signal, which is the inverse of the desired relationship. As a result, the first and second signals may be rectified in some embodiments. This occurs during the negative cycle of the waveforms.

Operational-amplifier 161 is used to bias the diode to avoid non-linearity's that might otherwise be produce during sampling. When the magnitude of the first signal is greater than the magnitude of the second signal, which occurs at the power minimums of the second signal, diode 160 will not conduct and resistance in the feedback loop of operational-amplifier 162 will be high. This provides timing for the sampling that effectively blocks the interference component of the first signal and allows gain for the desired signal component from operational amplifiers. Alternatively, when the magnitude of the second signal is greater than the first signal, then diode 160 conducts and a gain of one or unity is added to the signal. Various resistors are also used in this implementation for signal control, by producing a mirror image of the unity gain signal that when added, cancels the unity gain signal out.

This circuit may be tuned, if necessary, by attenuating the first signal, thereby decreasing the amount of time that the amplitude of the first signal exceeds the amplitude of the second signal. However, as the first signal is attenuated, the circuit will suffer from decreased signal to noise ratio since noise from the second signal is imprinted on to the output of the circuit. However, the output can be used to trigger the digitalization of the first signal, allowing for reconstruction of the desired signal that is then passed on. As the first signal becomes more attenuated, the timing resolution of the selective-sampling increases.

This circuit may also be used with multipath and/or pulsed signals. The system described above will produce continuous output of a bore-site signal in the absence of any overpowering multipath or jamming signal. This means that the first part of the accessed first signal is passed since it is at bore-site. When a multipath signal is present, the composite signal will tend to pull the desired signal off of bore-site resulting in the squelching of the channel. If necessary, the pulses can be filtered out if needed for a specific application.

Figure 2:
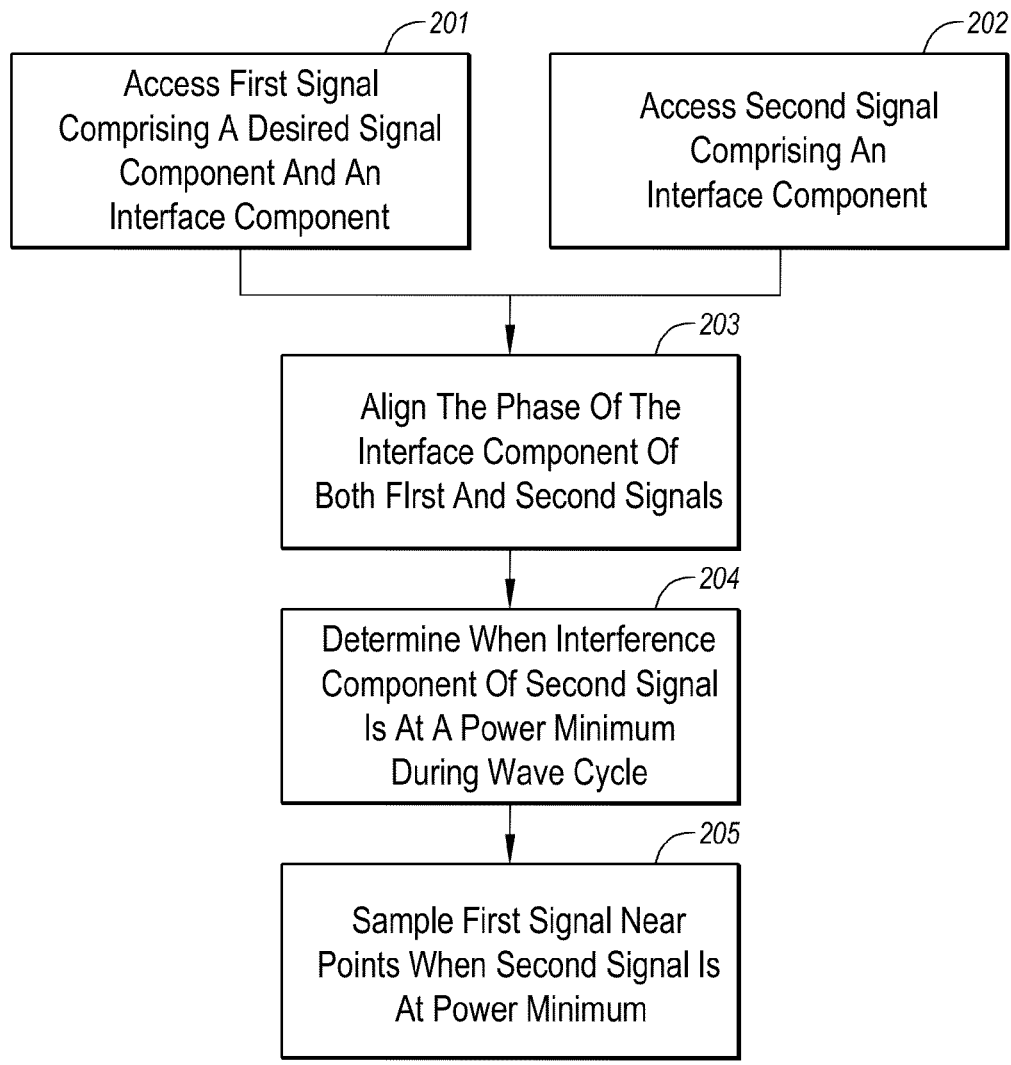
FIG. 2 illustrates a flowchart of a method for performing a selective-sampling operation.

As has been mentioned, the selective-sampling receiver 100 is configured to perform a selective-sampling operation using the selective-sampling circuitry 130 for the digital implementation. The selective sampling operation may also be performed by a digital algorithm. Referring to FIG. 2, a method 200 for a selective-sampling receiver to perform the selective-sampling operation is described. The method 200 will be discussed with reference to the selective-sampling receiver of FIG. 1. The selective-sampling receiver accesses a first signal comprising a desired signal component and an interference component (201) and accesses a second signal, either from an external source or an internal source, comprising an interference component (202). As can be seen in FIG. 2, the order that the selective-sampling receiver accesses the two signals is unimportant to the principles of the present invention, although in many embodiments the two signals will be accessed or received simultaneously.

In other embodiment, the first signal includes a desired component and an interference component and/or noise and the second signal includes timing signal/timing method of encoding the zero crossing information of the known desired signal or known crossing of the unwanted signal, or signals.

Selective-sampling circuitry in the selective-sampling receiver, such as delay circuitry 131, aligns the phase of the interference component of both the first and second signals (203). The selective-sampling receiver takes advantage of the fact that the interference component of the first signal may lead or lag the interference component of the second signal by a phase of 90 degrees in some embodiments. By delaying either the first or the second signal by 90 degrees, the phase of the interference components in both the first or second signal should be aligned.

The selective-sampling circuitry then determines when the interference component in the second signal is at a power minimum during a wave cycle (204). As the first and second signals are usually periodic, they will have predictable power minimums or zero crossing points. For example, a sine wave has two power minimums or zero crossing points per wave cycle, which is referred to the Nyquist sampling rate. The selective-sampling circuitry, such as zero-crossing detector 132, detects when the second signal has the power minimums. Since the interference components of the first and second signals are aligned, the interference component of the first signal will be at a power minimum whenever the second signal is at a power minimum.

The selective-sampling circuitry samples the first signal as close as possible to the point in time that the second signal is at a power minimum (205). The sampling may be accomplished by the sample-hold circuitry 133 of FIG. 1A. As mentioned previously, the interference components of both the first and second signals will be at a power minimum at the same time when their phases are aligned. Consequently, only the desired signal component and perhaps a noise component of the first signal will remain to be sampled if the sampling occurs during the power minimum of the second signal. As a result, any signal that is reconstructed from the sampling will be very close to the desired signal. As long as the sampling is performed at least at the Nyquist sampling rate of the first signal, then a reasonable desired signal may be reconstructed. The reconstructed signal may then be provided by the selective-sampling receiver to other instruments, such as a signal processor in a radar system, for further use and analysis. The sampling rate can be increased in some embodiments as disclosed in more detail below.

Advantageously, the selective-sampling method just described suppresses the unwanted interference signal component and recovers the desired signal component without the need for time consuming calculations to determine interference estimates and then to subtract them from the desired signal. In addition, since the selective-sampling receiver derives when to sample from the power minimums of the interference signal component in real time, it is able to respond to changes in the interference environment almost instantaneously.

Figure 3A:
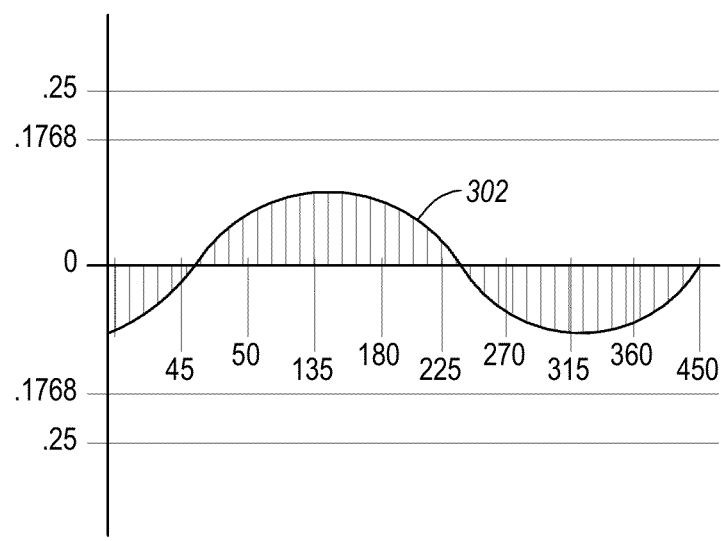
FIG. 3A illustrates a desired signal.

A specific example of the selective-sampling operation will now be described with reference to FIGS. 3A, 3B and 3C. In FIG. 3A, a 450 degree portion of a desired signal 302 at bore-sight is shown. A bore-sight signal is one that is directly in front of an antenna and has maximum power. The desired signal has a 360 degree cycle and has power maximums around 135 degrees and 315 degrees. The amplitude at these points is between 0 and 0.1768 in this example.

Figure 3B:
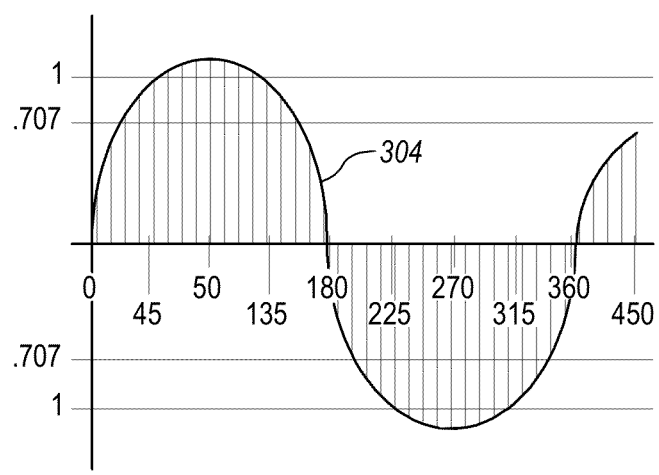
FIG. 3B illustrates an interference signal and its power minimums.

FIG. 3B depicts a 450 degree portion of an interference signal 304. The interference signal has power maximums around 90 and 270 degrees, which have amplitude of around 1 and, in this example, power minimums at 0 and 180 degrees. There is also a power minimum at 360 degrees, which is the start of a new wave cycle. Note that during the 450 degrees that are shown, the magnitude of the interference signal 304 is much greater than the magnitude of the desired bore-sight signal 302 and would thus dominate the desired signal 302.

Figure 3C:
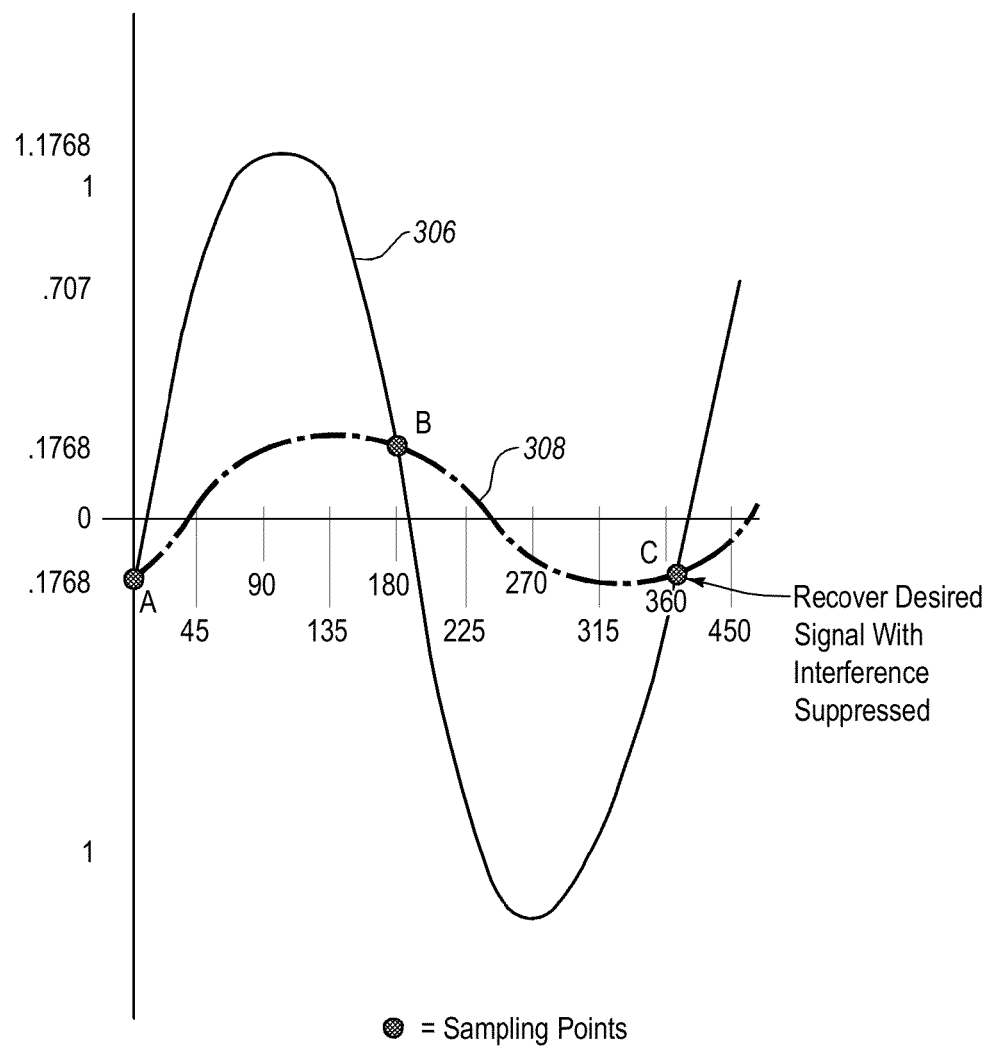
FIG. 3C illustrates a summation signal of the signals in FIGS. 3A and 3B.

FIG. 3C depicts a signal 306 that is a summation of the desired signal 302 and the interference signal 304. This may represent the first signal of FIG. 1A. As can be seen, the magnitude of the summation signal 306 is close to the magnitude of the interference component as the interference component dominates the signal. FIG. 3C also shows sampling points A, B, and C. Sampling point A corresponds to the power minimum of the interference component at 0 degrees, sampling point B corresponds to the power minimum at 180 degrees, and sampling point C corresponds to the power minimum at 360 degrees.

When the summation signal is sampled as close as possible to the summation points, the desired signal may be recovered. The recovered signal is depicted by the dashed line 308 in FIG. 3C. As can be seen, the recovered signal (dashed line 308) closely mirrors the original desired signal 302 of FIG. 3A.

Figure 4:
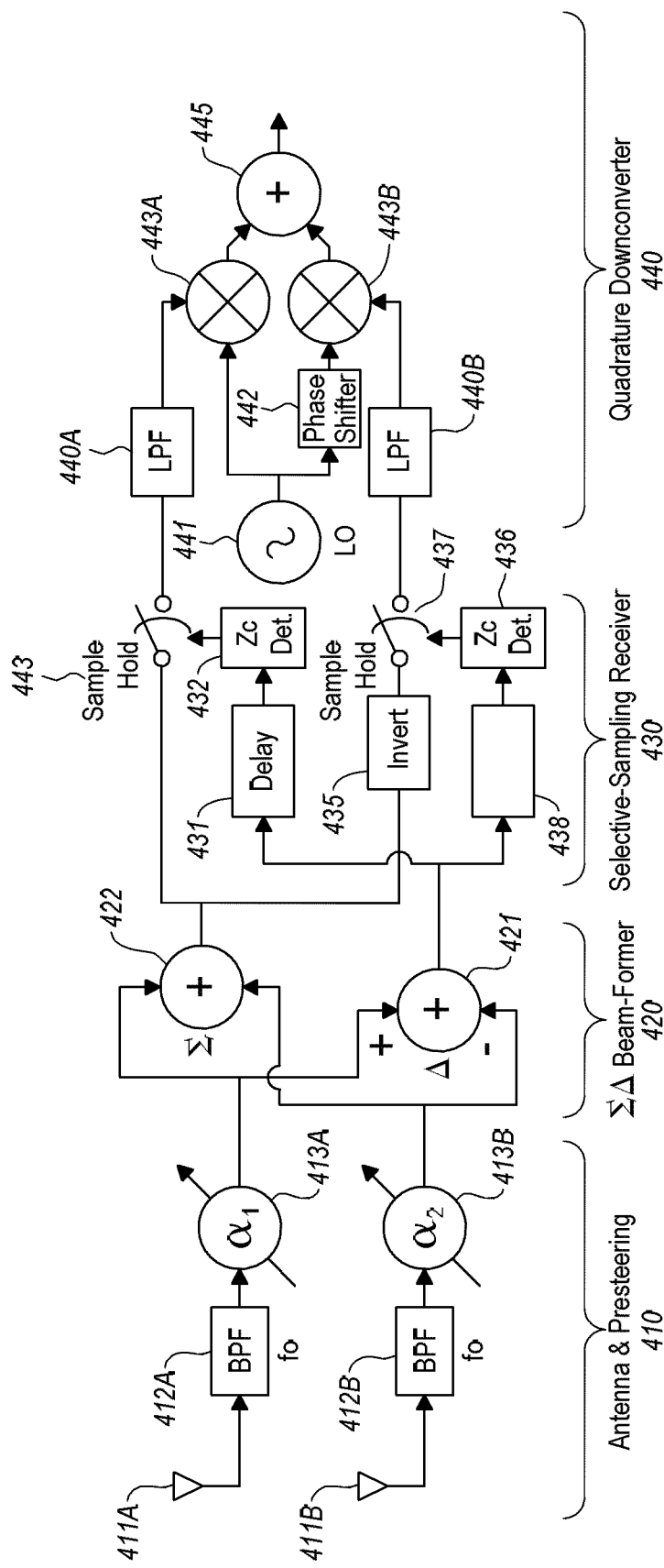
FIG. 4 schematically illustrates a receiver system in which a selective-sampling receiver in accordance with the principles of the present invention may be implemented.

Referring to FIG. 4, a two channel receiver system 400 in which a selective-sampling receiver in accordance with the present invention may be implemented is illustrated and will now be described. Receiver system 400 includes antenna and steering section 410, a $\Sigma\Delta$ beam-former 420, a selective-sampling receiver 430, and a quadrature down converter 440.

Antenna and steering section 410 includes two antenna elements 411A and 411B that are used to measure two signals. Antennas 411 may be any antenna known in the art, such as for example a monopulse antenna array. For example, antenna 411A may be used to measure a signal containing both the desired signal and the interference signal while antenna 411B is used to receive the same signal, but at a different phase angle. The measured signals are passed through band pass filters 412A and 412B, which are used to filter out unwanted signal bands and may be any filter known in the art. The filtered signals are then steered by steering networks 413A and 413B, which may be any known steering network in the art, to the inputs of $\Sigma\Delta$ beam-former 420. In the depicted example, steering network 413A is used to steer one of the measured signals to the bore-sight angle of arrival, while steering network 413B is used to steer the other measured signal to some off bore-sight angle of arrival. The steering network of 413 A and 413 B are used to steer the antenna network in such a way as to put the signal of interest at bore site angle.

The $\Sigma\Delta$ beam-former 420, which may be any $\Sigma\Delta$ beam-former known in the art, has a summation channel 422 and a difference channel 421. The summation channel 422 produces a first signal which is a composite sum of the desired signal component and the interference signal component. On the other hand, the difference channel 421 produces a second signal where one-half of the received signal is subtracted from the other half. However, when the second signal is at bore-site, the desired signal component is phased out, thus leaving only the difference component in the second signal.

The first and second signals are then provided to selective-sampling receiver 430, which may correspond to selective-sampling receiver 100 of FIG. 1A. However, FIG. 4 depicts an alternative embodiment of the selective-sampling receiver. In this embodiment, both an in-phase and quadrature component of the first signal will be sampled. To preserve all signal information in some instances, it may be necessary to selectively sample both the in-phase and quadrature components of the first signal. This helps to prevent loss of signal information and minimize distortion produced in the analog reconstruction process. The sampling circuitry components of selective-sampling receiver 430 will be the same or similar to those described above in relation to selective sampling receiver 100.

For the in-phase sampling, the second signal passes through delay circuitry 431, where it is delayed in order to align its phase with the interference component of the first signal in the manner previously described. The zero-crossing detector circuitry 432 then detects when the second signal is at a power minimum during a wave cycle. The sample-hold circuitry 433 then samples the first signal, producing a signal that suppresses the interference and recovers the desired signal.

For the quadrature sampling, the first signal is passed through an impedance inverter 435, which creates a quadrature component of the first signal. The second signal is passed through circuitry 438, which creates a quadrature component of the second signal and aligns the phases of the signals. The zero-crossing detector 436 detects when the quadrature second signal is at a power minimum during a wave cycle. The sample-hold circuitry 437 then samples the quadrature first signal, producing a signal that suppresses the interference and recovers the desired signal.

Both the in-phase and quadrature sampled signals are then passed to quadrature downconverter 440. Both signals pass through low-pass filters 440A and 440B in order to remove harmonic content introduced in the sampling operation. Some local oscillation 441 is mixed by mixers 443A and 443B with the in-phase and quadrature signals respectively, the local oscillation having been converted to quadrature by impedance inverter 441 before the mixing. Finally, the adder circuitry 445 combines the in-phase and quadrature signals to reconstruct the desired signal.

The two channel receiver system just described suppresses interference without the need for complex circuitry. Cross talk between the summation and difference channels in the $\Sigma\Delta$ beam-former, however, may limit the suppression of the interference. However, providing isolation for the two channels helps to overcome this problem. The isolation may be accomplished by any isolation technique known to one skilled in the art.

Figure 5:
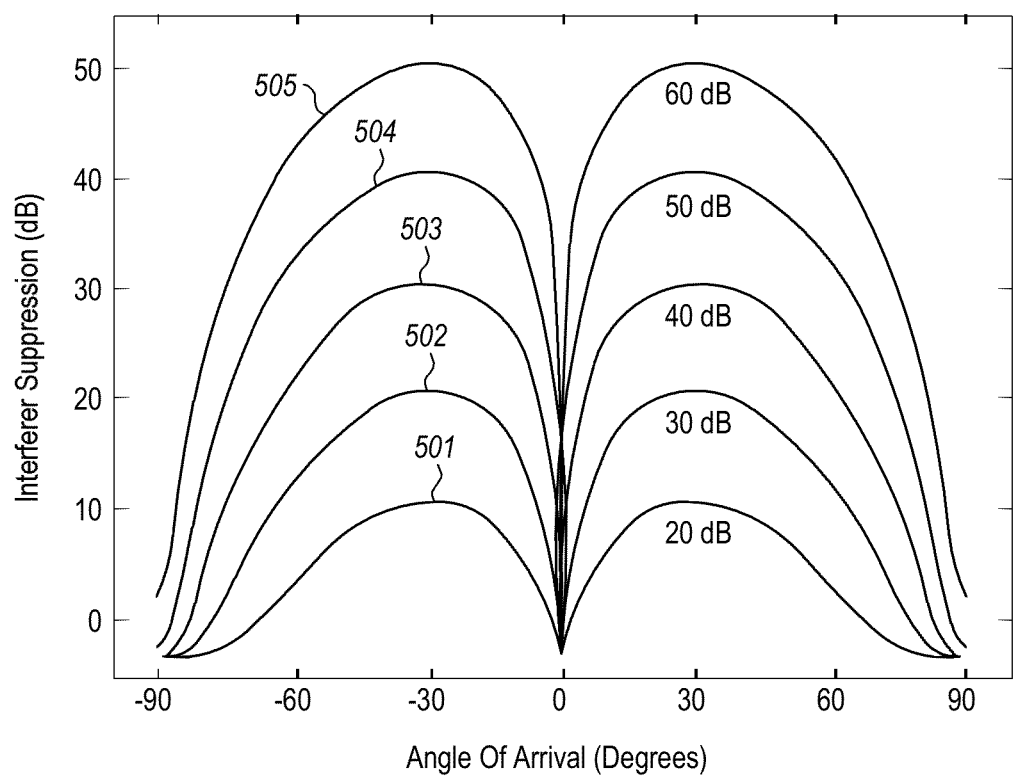
FIG. 5 illustrates interference suppression versus channel isolation for various angle of arrival.
Figure 6:
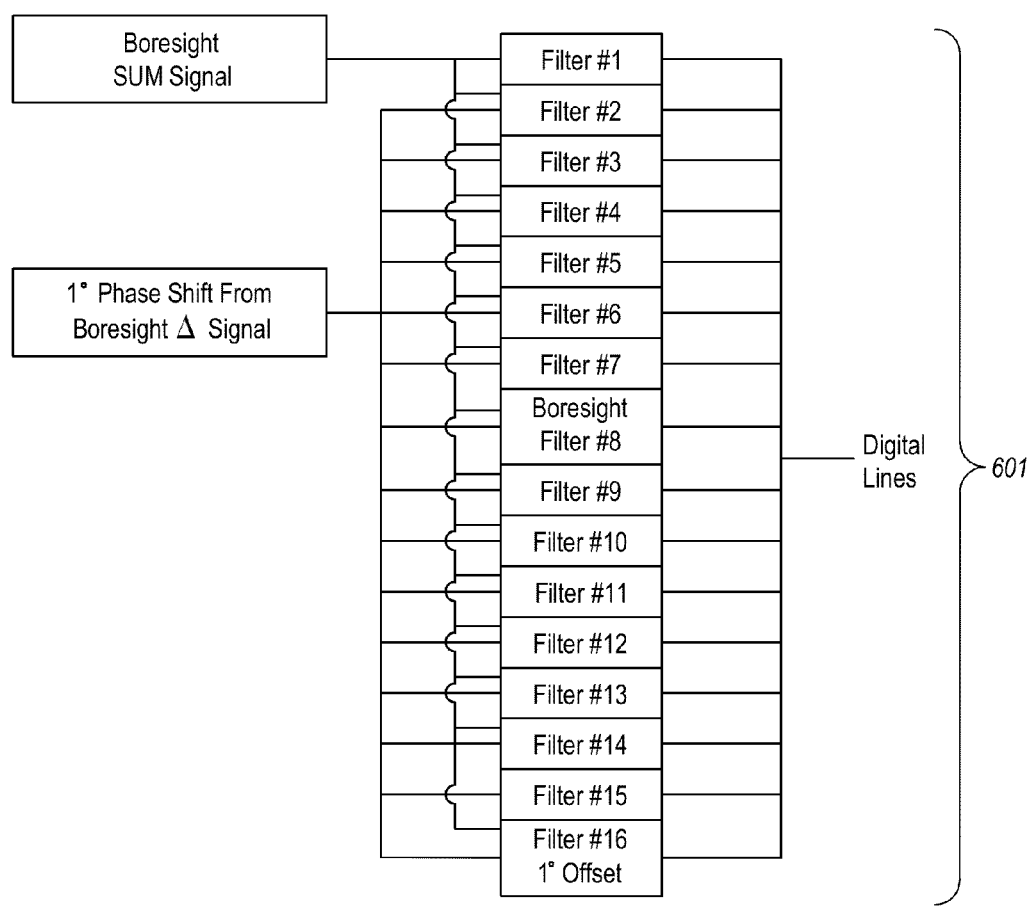
FIG. 6 schematically illustrates multiple selective-sampling receivers implemented in a bank configuration with each cell in the bank having a slightly different input relationship.

FIG. 5 shows interference suppression versus the angle of arrival of the interference signal for various levels of isolation in the beam-former. For example, curve 501 illustrates interference suppression for 20 dB of isolation, curve 502 illustrates interference suppression for 30 dB of isolation, curve 503 illustrates interference suppression for 40 dB of isolation, curve 504 illustrates interference suppression for 50 dB of isolation, and curve 505 illustrates interference suppression for 60 dB of isolation. In some embodiments, the selective-sampling receiver 100 may be utilized in a bank of multiple selective-sampling receivers. This is done to increase the field of view that may be monitored by a system implementing the selective-sampling receivers as the measured azimuth and elevation angles are increased. This is illustrated in FIG. 6, which depicts a bank 601 of 16 selective-sampling receivers or filters. In this embodiment, the first signal comprising the interference and desired signal components is still measured at bore-sight as in the two channel case and is provided to all 16 selective-sampling receivers. The second signal consisting of the interference signal, however, is shifted for every selective-sampling receiver, 1 degree in the depicted example, such that the interference component is slightly different for each receiver. The sampling operation will still be performed as described previously, i.e. the first signal will be sampled when the interference component of the second signal is at a power minimum.

Figure 7:
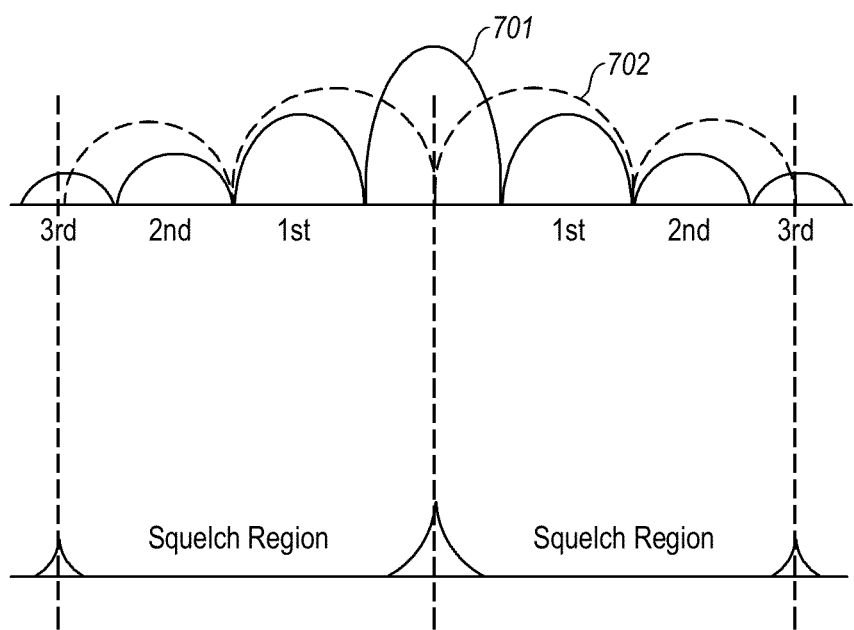
FIG. 7 illustrates squelch performance of a selective-sampling receiver.

The selective-sampling receiver also may be implemented in a system that uses a sub-array to measure an antenna beam. In this case, only the even side lobes will have a receiver in-lobe condition. As a result, a squelch region will be provided for the odd side lobe energy. In addition, a squelch region is produced and there is no output when the delta input is of a greater value than the attenuated sum input. This can be seen in FIG. 7. In FIG. 7, the main beam 701 shown with the squelched lobe 702. This embodiment may be useful in preventing interference from electronic counter measures that often time enter the main lobe from the side lobes.

The selective-sampling receiver and selective-sampling method described with relation to FIGS. 1A, 2, and 4 above are useful in counter-counter measure systems that are used to block electronic counter measures and tracking systems that are used to suppress decoy signals. In particular, the ability of the selective-sampling receiver to adjust almost instantaneously to a change in the interference environment can be helpful in a situation where a radar jamming signal is present in order to prevent a target from being seen. This ability is also helpful to discriminate between a target and a decoy, for example an airplane using radar, a ship using sonar or submarine pulling a decoy to deflect detection by radar or sonar.

The selective-sampling receiver and selective-sampling method described with relation to FIGS. 1A, 2, and 4 above may be utilized in many medical applications. For example, the selective sampling receiver may be used in ultrasound systems. An ultrasound transducer is a series of piezoelectric transducers placed in parallel with each other. As a sound pulse is sent out it travels at the speed of sound until it hits something such as soft tissue. It then reflects some of the energy, which is picked up by the ultrasound transducer. Each piezoelectric sensor picks up some of this received energy and a computer processing an image is formed. The selective sampling receiver helps to focus the received energy for better imaging.

Likewise MRI systems pickup radio frequency energy in order to form its image. When water atoms are placed in a strong magnetic field the atoms align to the same orientation. When this water is pulsed with RF energy, the atoms shift alignment to respond to the RF pulse similar to a microwave oven. When the RF energy stops, the water realigns to the magnetic field and in the process releases RF energy as well. This energy is read and an image is formed. Different densities of water release different amounts of RF energy which look different on the final image. The selective sampling receiver is capable of focusing in on smaller areas of interest or increase the resolution in troughs areas. In addition, since more than one thing can be seen at the same time in the same field of view higher resolution images are possible.

The selective sampling receiver may also be used in hearing aids and other such devices. In a hearing aid or other repeater applications, the second signal may be produced by the system itself. This means that the information that is obtained from the second signal discussed previously (i.e., when to sample and the zero-crossing point of the second signal) can be predicted by the system. As a result, only a first signal containing both an interference and desired signal component is actually accessed or received by the hearing aid. However, since the zero-crossing point is predicted for the interference component, the desired component is sampled as previously discussed and the desired signal can be produced.

The selective-sampling receiver and selective-sampling method described with relation to FIGS. 1A, 2, and 4 above may also be utilized in communications networks. Because the selective sampling receiver has the ability to suppress unwanted signals, two satellites or communication towers may be in close proximity to each other and transmit using the same frequencies. Since each satellite or communication tower will have its own selective sampling receiver, the amount of data that may be transmitted is increased as each satellite or communication tower will suppress unwanted signals from the other satellite or tower.

Accordingly, the principles of the present invention relate to a selective-sampling receiver and method. The selective-sampling receiver utilizes low complexity, low cost components to achieve a high level of interference signal suppression. This removes the need for expensive hardware to be used in interference suppression. In addition, the need for complex possessing capabilities is also removed. Accordingly, the principles of the present invention are a significant advancement in the art.

In order to find the right time to sample a signal that is made up of more than one component (a desired signal and at least one interference signal) resulting in the separation of one of the components, antennas can be used to pick up patterns that have nulls. The desired signal is placed in this null in the antenna or an antenna network pattern meaning that this antenna has no input from the desired signal. A second antenna or antenna network will have the desired signal in its antenna pattern along with the interferer.

One such system is a monopulse antenna array. Two antennas create this antenna network. Two channels are created; one is called the sum channel since antenna elements A and B are added up in it. The second channel is called the Delta channel since one half of the received signal is subtracted from the other half. For example input A is subtracted from input B. A-B and the radio frequency pickup patterns as compared to angle of approach of RF energy can be determined. A signal that is at bore-site (directly in front of the antenna array) has maximum input in the Sum channel. But since the inputs are matches in all antenna pickups, the delta channel has no pick up of the signal since antenna A completely subtracted from antenna B.

Now using the delta channel that has only the interferer signal, the point in time to sample the sum channel that has the interferer and the desired signal can be determined.

In one embodiment, a satellite dish Gain of the desired signal from competing satellites is 10-20 dB. In the selective sampling receiver this separation in amplitude isn't created with satellite dish gain but in interference suppression ending with an equal amount of amplitude difference in the final product. Two satellites can now exist in close proximity operating on the same frequency and not interfere with one another using embodiments of the invention. Advantageously, the data throughput may be doubled when dealing with properly designed system utilizing embodiments of invention described herein.

Embodiments of the invention can be used with any type of waveform (sine, square, triangle, pulse, cable, twisted pair line, etc.) and any transmission medium (air, water, electromagnetic, etc.) to detect energy levels of these waveforms. Sampling can be accomplished during the representative power levels taken from the waveform.

With repetitive sampling of a waveform, the waveform can be converted into a steady power level. This may include multipath signals although the exact power level may not be known. Fluctuating power levels may be due to background signals that are not synced to the detected or predicted waveform and resulting sampling points. Separation of these fluctuating levels can be done mathematically or with a filter such as a capacitor. When a waveform is held to a steady power level, weaker waveforms can be detected and received. Alternatively, known or sampled/detected sources of interference can be sampled such that they do not appear in the final sampled output.

By sampling as discussed herein, a signal can be produced that is suppressed. This allows for the same frequency to be used for both receiving and transmissions. This may be used, by way of example and not limitation, in repeaters and hearing aids. When sampling is accomplished, it is preferably done at twice the primary frequency or twice the intermediate frequency or twice the received frequency. This is above the Nyquist sampling rate. Further, embodiments of the invention can quickly respond to changes in the interfering signal since it is one half of the received wavelength.

Placing the signal of interest or the desired signal into an amplitude null on an antenna or an antenna array or other device or system which produces a receiving/pickup signal, the undesired signals can be minimized for a minimum or constant or known energy point at which sampling is accomplished. In one embodiment, the signal of interest and the undesired signal are offset in the pickup system such that the undesired signal is present and the desired signal is not.

After analyzing the undesired signal or signals for the proper timing, which is preferably located at the minimum energy points or any known or constant energy points, the desired signal can be sampled accordingly. In some embodiments, a phase delay may be needed in order to accomplish sampling at the same point of time when referring to the phase of the undesired signals.

In one embodiment, to avoid the un-uniformed multiple signal addition of the undesired signal that occurs when producing an antenna's null as compared to an omni directional antenna's addition of the same signals coming from different angles of approach, a purely null or delta antenna system pickup system can be used. In such a system, the signal of interest is placed into the true null for interference analyzing. The signal of interest is then sampled out of the two null channels that are offset from the signal of interest in opposite directions or orientations when compared to the graphed null pickup patterns. The output of these two pickups is full wave rectified or changed to an absolute value and added. The provides for a suppressed, but present signal of interest and a uniformed pickup pattern for the signal of interest and the interfering signals that are analyzed in the true delta pickup pattern, except close to boresight or the center of the dual delta pickup patterns. This eliminates the ambiguities that form from using unlike system channels that have different pickup patterns.

Sinusoidal thermal noise signals can also be suppressed due to the same signals being used throughout with small delays added to provide for different angles of approach. As the channels are compared to each other they will be similar and the point of suppression for this noise can be found. As a result the system signal to noise should at least remain constant as it passes through the system.

One embodiment uses the angle of approach to isolate the signal of interest and such systems are inherently directional. When enough energy is received from phase analyses for the unwanted signal, the unwanted signal will be suppressed from off null angels of approach. This allows for added angle accuracy to be achieved.

An analog or digital algorithm that compares received levels from different channels such as a sum and difference channels of a mono-pulse receiver system where the signal of interest is placed in a null so that when this channel passes through its zero crossing the sum channel is sampled.

A bank of analog circuits/digital algorithms where the input to each cell in the bank is formed to represent a different angle of approach resulting in a wide field of view. Multiple returns are processed in a parallel process of evaluation allowing for faster evaluation of the received wave front.

Counter-counter measure systems may utilize large energy returns (jamming of interference) or numerous radio echoes (balloon or decoys). Because one embodiment of the invention uses an operational amplifier, a diode and a few resisters, it is less likely to be affected by high energy particles as found in space that will damage large integrated circuits such as signal processors. This analog suppression of the unwanted signals and reception of wanted signals can be performed fast.

Tuning of such an analog system in regards to sensitivity to angle of approach is accomplished by attenuation of the channel in which the desired and undesired signals are placed. Now when the amplitudes are compared in the two channels the desired signal should be larger in order to come out of the comparator. Signal to noise degradation can be overcome if sampling is done from the un-attenuated channel before it is attenuated.

A receiver can take advantage of more than one transmitter in the antennas field of view but use the tuning to separate out the different transmitters. This can allow for more than one satellite to be in a satellite receivers/dishes field of view and yet have the receiver choose which transmitted signal to pass on for processing.

When one embodiment of the system is tuned, the signal output may be either a sinusoidal signal if the signal of interest is in it or noise if the signal of interest is not in it or is two small to overcome the noise floor.

In one embodiment, it is possible to squelch out unwanted signals by manipulating the pickup patterns so that the desired angle of approach is phased but unwanted or undesired angles of approach are squelched. This is accomplished by overlapping the pickup patterns such as arrays of different sizes such as a full size into the sum input and half the size into the delta input in a mono-pulse system. As a result the odd sidelobes are squelched.

In pulse systems or spread spectrum systems this approach can be used and the need for very accurate timing systems eliminated. This is done by utilizing the angle of approach. The first signal will pass from the angle of interest but multi-paths come from different angles of approach that will pull the received signal out of the angle bin being used. As a result the first leading pulse will be passed and other paths can squelch the channel.

The Handling of Multiple Interferers

When linear jamming/interfering source are presented in a Selective Sampling Receiver's Delta Channel the receiver may operate in the amplitude domain. Since the sum and delta antenna patterns are not linear it limits the number of interferers that can be present in the field of view in the amplitude domain. Embodiments of the invention can also operate when the sum and delta system has many jamming/interfering sources. In this case, it is possible for the two or more sources to have different amplitudes in the sum and delta channels. The zero crossing of the combined sine wave can be dependent on amplitude and phase/frequency of the two interfering signals. In this case, embodiments of the invention can change to the frequency domain by demodulating frequency modulated signals from the respective Sum and Delta channels. This eliminates any problems associated with non linear amplitude summing of the multiple jamming or interfering sources that can affect the zero crossing.

In one embodiment, the invention may start by limiting the amplitude entering into the frequency domain. This reduces the affect of atmospheric noise that appears as pops or hisses in AM Amplitude Modulated systems.

One advantage of frequency modulation is that it is free from the effects of atmospheric noise or "static" that affects only the amplitude of the wave, since all the information is in the frequency variations. If the modulation is removed and the amplitude of the signal is varied, the ratio detector is advantageously not sensitive to the level. Some FM demodulators respond to the amplitude as well as the frequency, so the signal may be limited before detection. However, this is not necessary for a ratio detector.

Figure 8:
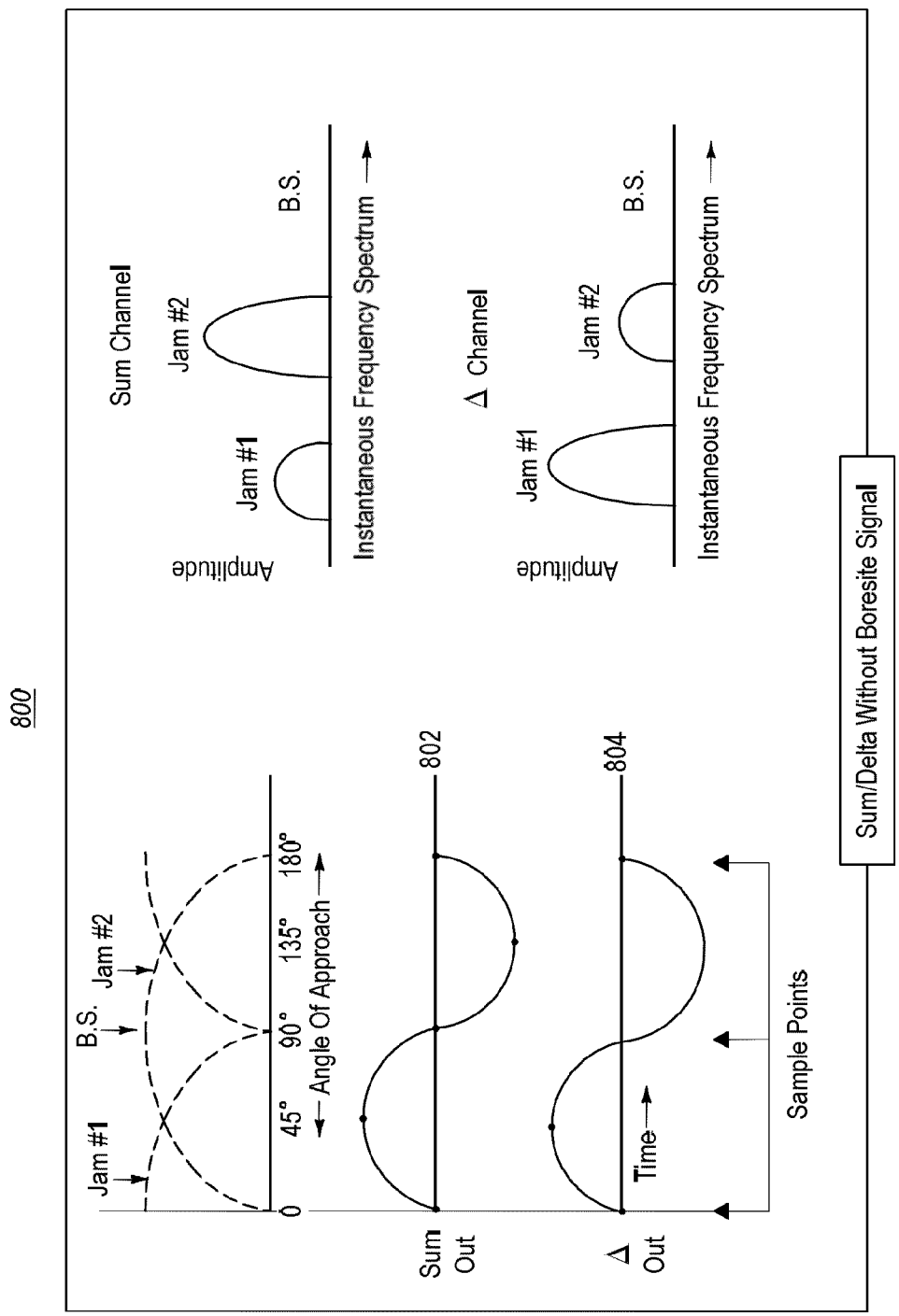
FIG. 8 illustrates a sum/delta without boresite signal.

FIG. 8 illustrates one embodiment of an approximate amplitude and frequency summation 800 that would be found in the different channels. Note that the amplitudes changed but the frequency did not. This illustrates that when two interfering signal sources and no boresite signal is present in the sum channel 802 and delta channel 804, the frequency demodulated signals will be the same. As a result both interfering signals can be suppressed by using the time domain suppression techniques described herein or other appropriate suppression such as subtraction.

Figure 9:
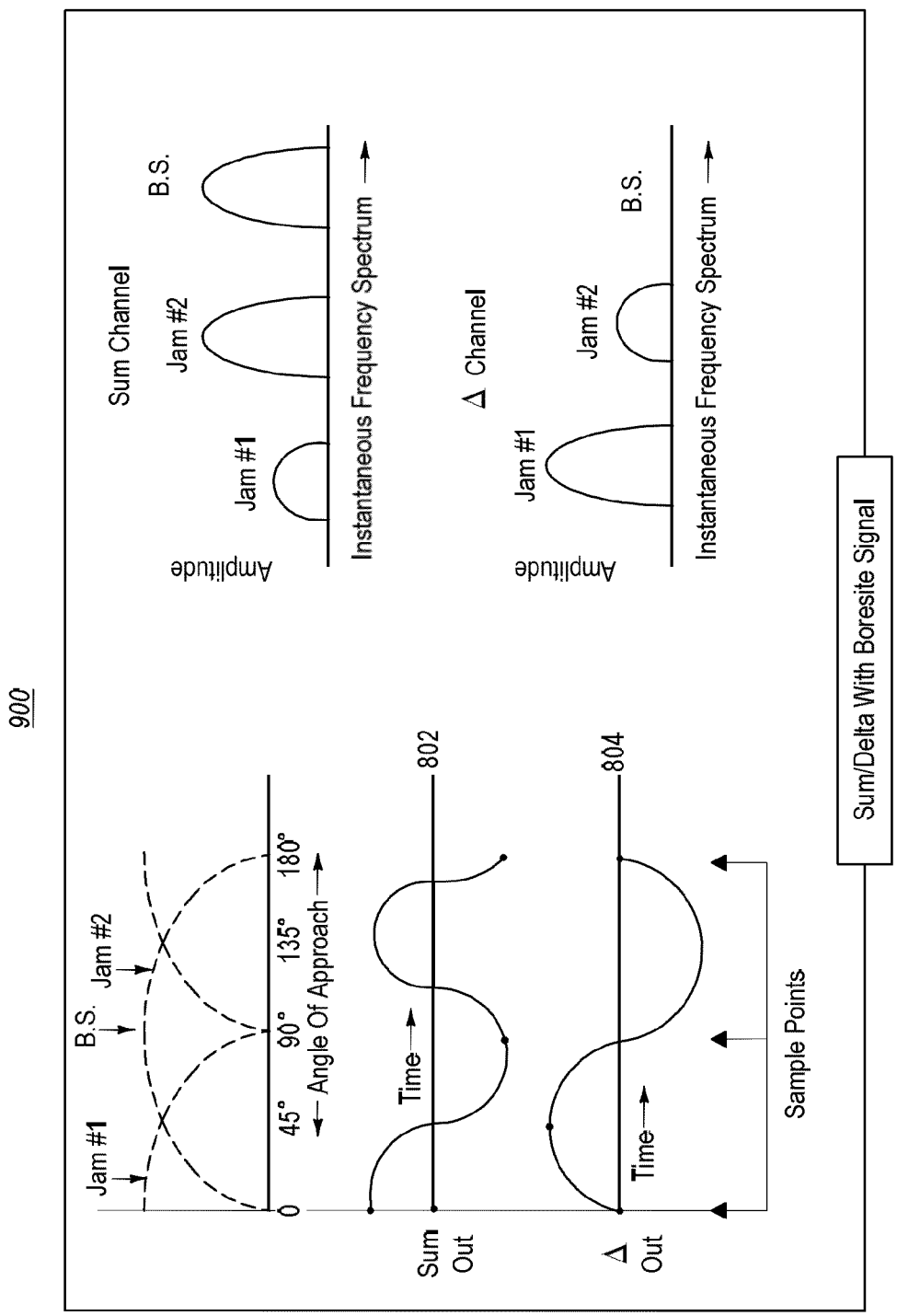
FIG. 9 illustrates a sum/delta with boresite signal.

Now when a signal is added at boresite, this signal contributes to the demodulated FM spectrum of the Sum channel 902 but not to the Delta channel 904 as seen in FIG. 9 at 900.

The demodulated Sum channel 902 is offset directly by the FM properties of the boresite signal source. As a result, a boresite signal can be seen in the presence of multiple off-boresite signal sources.

As a result, it may be useful to include not only Frequency and/or Amplitude Modulation techniques but Phase, Pulse, or any modulation scheme or any domain or practice that is used to convey or measure information. This may include at any RF radio frequency, IF intermediate frequency, base band, or data stream of any kind whether created intentionally, as the case of broadband jamming or unintentionally as is the case of unintended interference.

It may also include recovered interference of any kind through any type of system that creates a system in which the desired information is in one channel with the interference, and only the interference in the other channel.

An imaging system using a multi-element array that creates one or more pencil receiver beams that can be used to scan for RF sources or reflections of RF signals at different bore-site angles is within the scope of the invention. Such a system can be used for navigation during bad weather or in complete darkness. When used in aviation, a runway can be lined with low power transmitters that such a system can see the runway. In addition, the runway can be illuminated with an RF beam of energy so that you can see reflections of objects that may be on the runway.

Furthermore, forward looking radar systems can be made or transmitters can be collocated with beacon lights. If a geological survey was done at each such beacon/transmitter the surrounding landscape can be simulated out of a database and presented to the pilot. And time stamp and ID from each transmitter may be needed.

In one example, such as with IED (Improvised Explosive Device), it is necessary to generate an interfering signal. IED's are often detonated when a signal (such as from a cellular device) is received by the IED. The interfering signal (such as a broadband signal) is being generated as increasing strength in order to compensate for improvements to the IEDs. One drawback to this approach is that the generated interfering signal now interferes with other communications.

Embodiments of the invention can overcome this problem by simply using information about the interfering signal, which is shown in this specific example. This information can be communicated in any way, optically for example. Timing differences can also be accounted for. In this case, knowing the interfering signal allows the desired signal (such as communications among the various entities) to be recovered. In fact, because the interfering signal is known, efficiencies in recovery can be achieved.

More particularly, in the IED environment the jammer signal (or interfering signal) is not necessarily picked up but rather communicated to the receiver because it is known, which would provide even greater channel isolation, and greater performance. This communication can be a signal pickup such as through an antenna, data link in any form, or a synchronizing/timing pulse that synchronize the two systems. Any type of system that will communicate enough information to find the phase of the unwanted signal is within the scope of the invention.

Embodiments of the invention include many different systems and methods.

High Frequency Forced Sampling.

In this embodiment, the unwanted signal (second signal) is in one channel and both the desired and unwanted signal is in the other (first signal). If a higher frequency signal is added coherently and equally or substantially equally to both channels (signal number one and signal number two) and is large enough to dominate the other signals, a zero crossing is produced at the higher frequency zero crossing rate by the second signal when the first signal is offset by the desired signal amplitude at the time of sampling as seen in FIG. 24.

Figure 24:
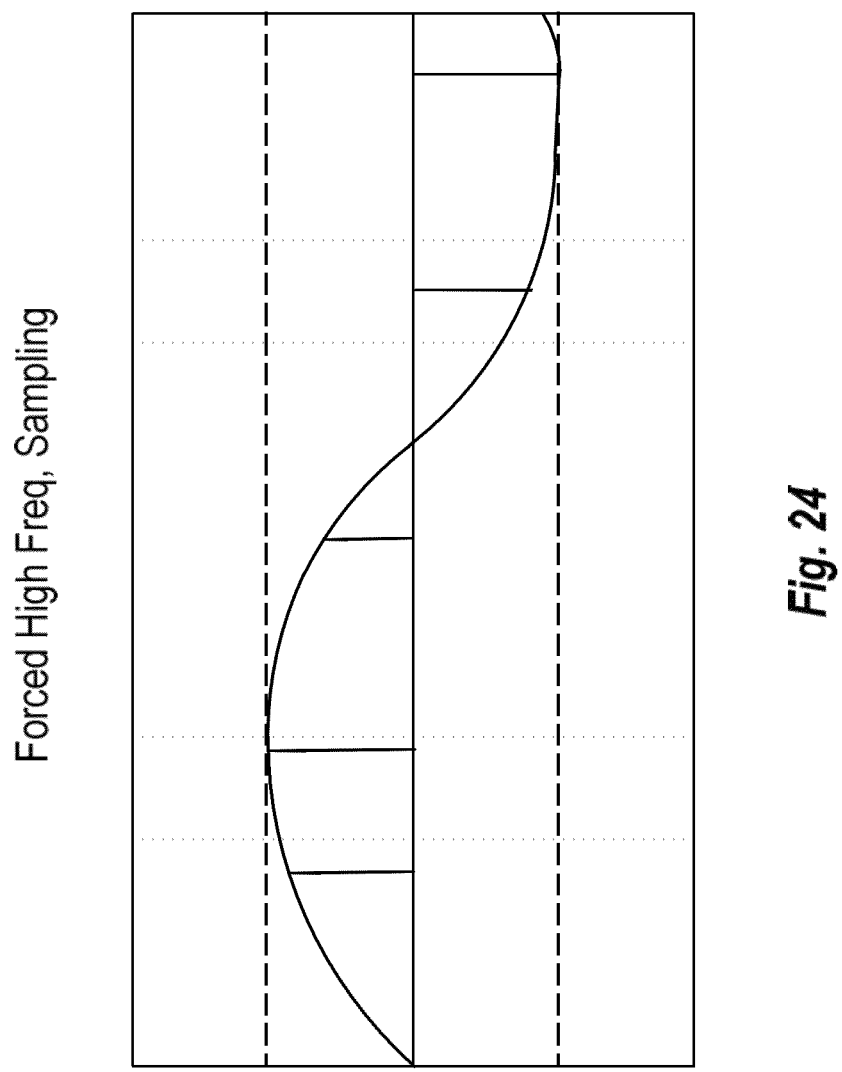
FIG. 24 illustrates forced high frequency sampling.

This simulation, as shown in FIG. 24, validates the Selective Sampling Receiver's process and validates the Forced High Frequency sampling process that increase the number of samples that are available for reconstruction of the desired signal. In the wire wrapped simulation there were approximately 20-40 samples for every wave of reconstructed desired signal. As a result only a sample hold circuit was used for reconstruction. FIG. 24 illustrates the desired wave and the samples.

This is done by equally adding a higher frequency larger amplitude signal equally to both signal channels as to dominate both channels in a proportional fashion. As the channels pass through the composite zero crossing they are offset by the desired signal which shows up in the sampled output of the Selective Sampling Receiver at the higher frequencies rate as shown in the simulation.

'High Frequency Forced Sampling'

The unwanted signal (second signal) is in one channel and the desired and unwanted signal is in the other (first signal). If a higher frequency signal is added coherently and equally to both channels (signal number one and signal number two) and is large enough to dominate the other signals, a zero crossing is produced at the higher frequency zero crossing rate by the second signal when the first signal is offset by the desired signal amplitude at the time of sampling.

This gives us many samples per desired lower frequency cycle and more than satisfies the Nyquist sampling needs for reconstruction which can be accomplished with the sample hold circuit itself. This allows the Selective Sampling Receiver process to be implemented with the data stream, voice, or base band frequency of the receiver rather than the intermediate or radio frequency. This greatly simplifies the application of the Selective Sampling Receiver to a whole host of low cost high volume applications.

This gives us many samples per desired lower frequency cycle and more than satisfies the Nyquist sampling needs for reconstruction which can be accomplished with the sample hold circuit itself if enough samples are taken. This also allows the selective sampling receiver process to be implemented within a data stream, voice, or base band frequency of the receiver or even a sonar system rather than the intermediate or radio frequency. This simplifies the application of the selective sampling receiver to low cost and/or high volume applications.

Unwanted Signal Recovery.

When the desired signal is known at the time of broadcast, the zero crossing of the desired signal can be communicated through encoding, a second frequency broadcast or other means such as dual modulation. This can allow for zero crossing sampling based on the desired signal. What is recovered is the unknown components such as jamming and/or noise, which includes thermal noise. Once the undesired signal (e.g., unknown components) are recovered, the undesired signal can be used for zero crossing detection and applied to a Selective Sampling Receiver to then obtain the desired signal, or the unwanted signal can be subtracted out.

Data Broadcasting.

By repeating the desired signal at a set time delay at the same broadcast frequency, all components except noise components (and which may include Doppler shift) will be received at two different times. When two inputs to a selective sampling receivers delta sum network are identical except for a time delay that corresponds to the TX time delay (before it is inputted into the delta sum network), the data signal will pass. The signals are used to create a sum/addition and delta/subtraction networks and passed to the selective sampling receiver. With pulse operation a blanking pulse may be applied to prevent the noising up of the receiver as the second received and delayed signal passes through the Delta network. In this example, noise, other data streams with different delays or other interference can be suppressed.

Two Frequency/Modulation Type Operation

Figure 23:
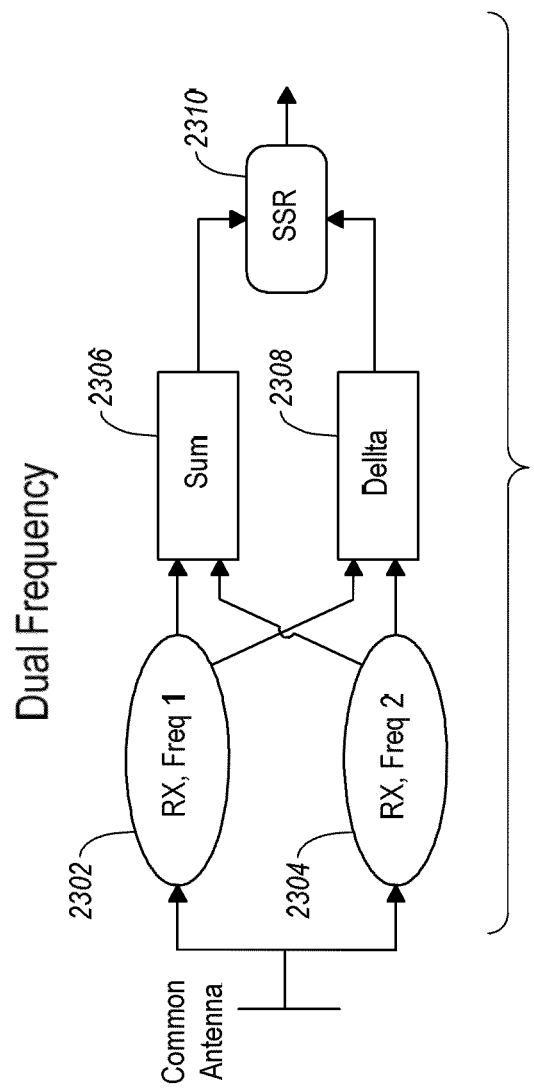
FIG. 23 illustrates dual frequency using SSRs.

By sending identical information, or timing information on a second frequency or modulation type, a delta/sum network can be produced and used as an input into the selective sampling receiver, as seen in FIG. 23 for example. A transmitted timing signal can also be directly applied to the sampler from this second receiver that has the desired signal zero crossing sync encoded onto it. The result is (i) a desired signal when the desired signal is transmitted on two frequencies, modulation types, antenna polarities, and supplied to a nulling stage or (ii) the unwanted signal components when the timing information for the desired signals zero crossing is broadcast. When interference is from a known source, the second frequency channel can be tuned to the unwanted signal and directly applied to the zero crossing detector. The result is a high quality sample of the phase of the unwanted signal for use with the selective sampling receiver as disclosed herein. This broadcasted zero crossing information can be of the zero crossing of the jamming signals when the jamming signals are known at the time of transition to include cable TV or internet systems.

Two Frequency, Two Antenna Sum Delta, and/or Phase Delay Operations.

Figure 19:
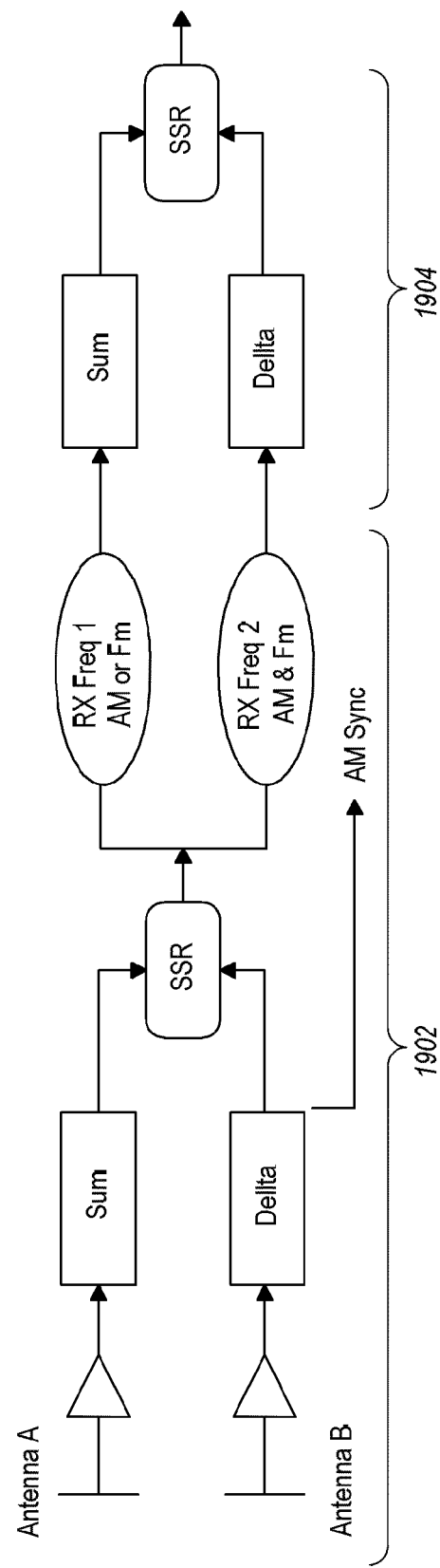
FIG. 19 illustrates cascading SSRs.
Figure 20:
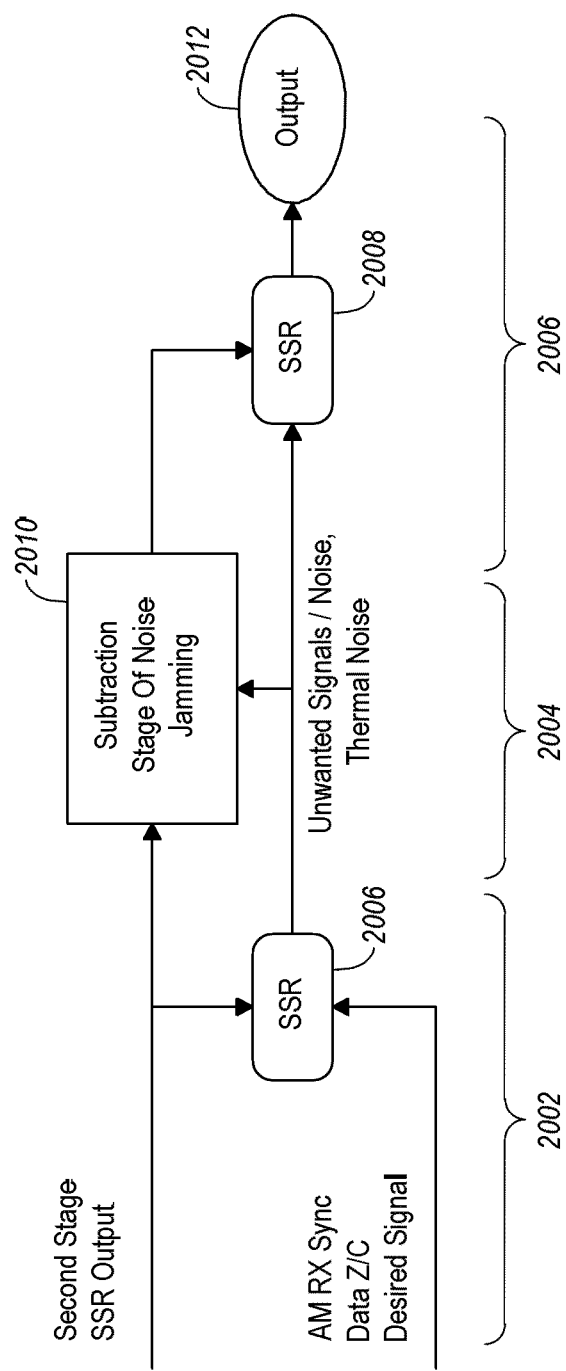
FIG. 20 illustrates another example of cascading SSRs.
Figure 22:
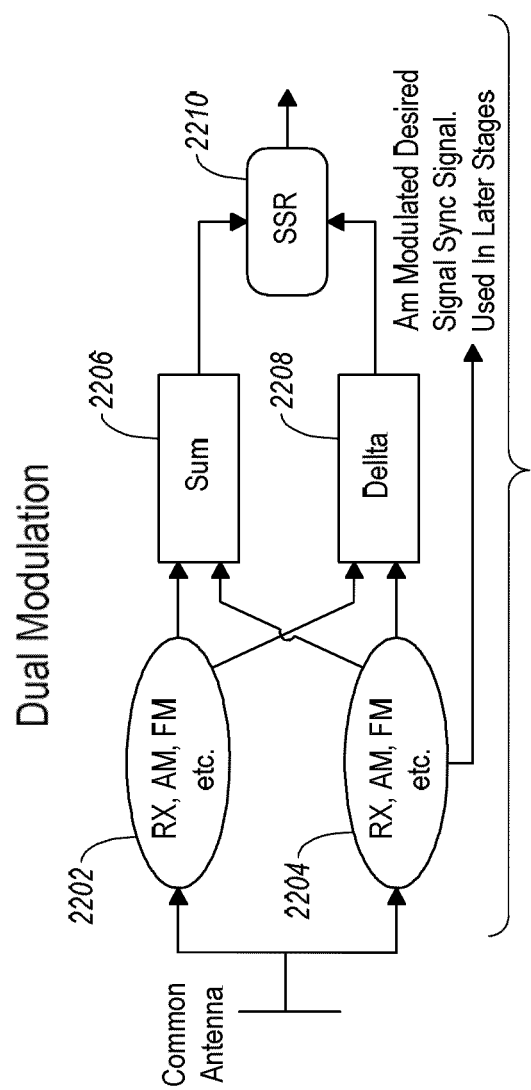
FIG. 22 illustrates dual modulation using SSRs.

By applying a sum delta network to the antenna/preamp signal a directional selective sampling receiver can be accomplished as seen in FIGS. 19 and 20 for example. The SSR output is then applied to one RF receiver and demodulator for each frequency. Alternatively, the demodulation may be performed by the RF receiver. With identical information on both frequencies, a second sum delta network is applied to the received signals. The second selective sampling receiver filters out non matched signals to include jamming and most noise components in the receiver as it is passed from stage to stage the third SSR uses the desired signals sync data from the second stage receiver possibly from a different modulation type. This stage filters out the desired signal and leaves the noise and unwanted signals. After subtracting this noise out of the signal channel a final SSR is applied that filters out most of the remaining noise and unwanted signals. This is only one of many possible combinations of SSR types that can be applied. Dual Modulations By providing more than one signal on the same carrier such as television and stereo broadcasts timing information of the zero crossing or nulls and sums can be produced from identical broadcasts on two different types of modulation such as AM and FM modulation and proper timing information produced/provided and supplied to a selective sampling receiver as seen in FIG. 22 for example.

GPS Data Modulation.

When a GPS system is synched with a satellite, data can be modulated onto the carrier by slightly changing the data stream from what is expected. Similarly when timing data is provided, once a selective sampling receiver sync/null is achieved, data can be conveyed by changing from the expected timing/null.

Multi-Path Filtering

Figure 21:
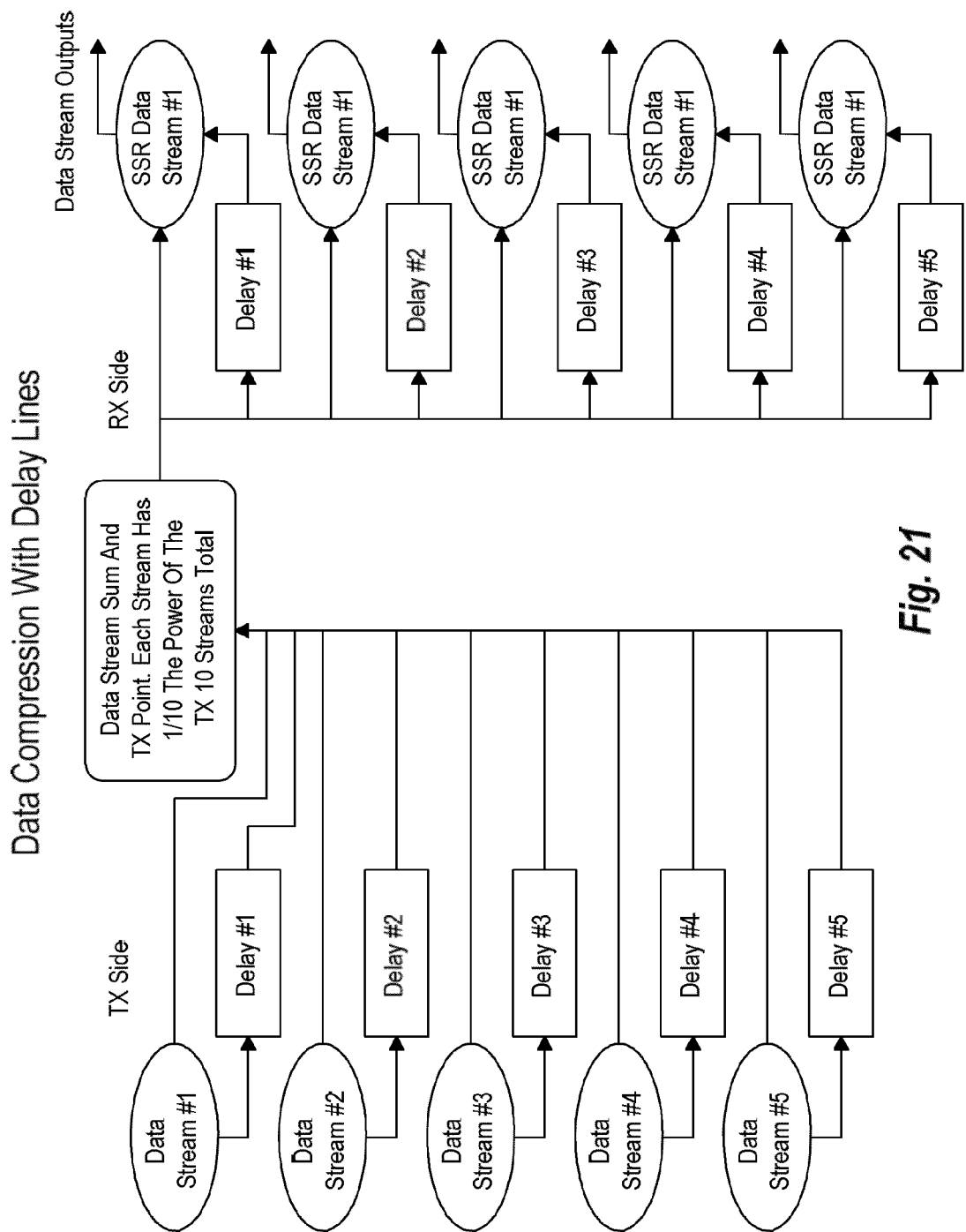
FIG. 21 illustrates data compression with delay lines.

Multi-path can degrade or even prevent communication. This is when two identical signals are received at almost the same time, which results in nulling and adding in an antenna and if the delay is large enough it will provide what amounts to two data streams. Since two signals that are delayed is a way to tune the selective sampling receiver, this multi-path can be beneficial by allowing a selective sampling receiver to filter out data streams that occupy the same medium to include frequency at the same time as seen in FIG. 21 for example. Such a system would take advantage of the multi-path and further clean the signal up which allows us to operate deeper into a null and provide cleaner signals. It also separates the desired signal out from other broadcasts with the 100-10,000 to one isolation capabilities that have been shown in test results and simulations. This also allows for many data streams to occupy the same medium (such as but not limited to Ethernet cable, inferred, cable TV, over the air broadcasts) at the same time. For instance the 30 dB separation shown in our published paper represents the ability to have over 10 times the data flow down a cable using this method with 20 dB or $\frac{1}{100}^{th}$ the interference of the other feeds in the SSR tuned output.

Figure 38:
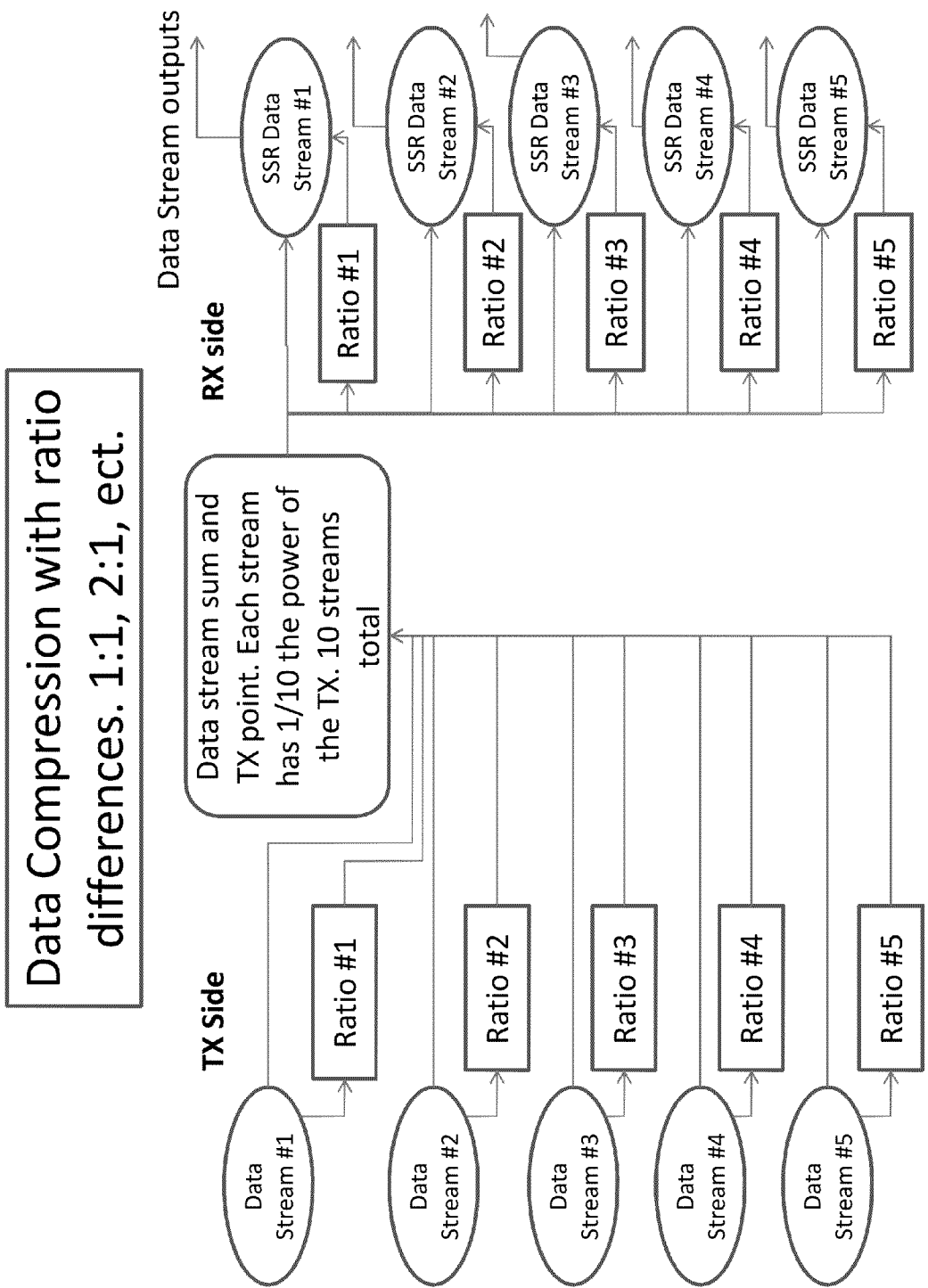
FIG. 38 illustrates an example of data compression with ratio differences using SSRs.

FIG. 38 illustrates the ability to reuse a bandwidth to transmit multiple data streams. The various data streams can be separated, for example, on the basis of ratio comparison. The amplitudes of the signals can be used to separate the various data streams. In one example, the signal/data is transmitted twice through dual modulation or dual frequency or like means. The second transmission occurs at different amplitude and may be delayed. The different in amplitude enables a ratio between the signals in each data stream to be identified and separated. Thus, many signals can be transmitted at the same frequencies as well.

Figure 39:
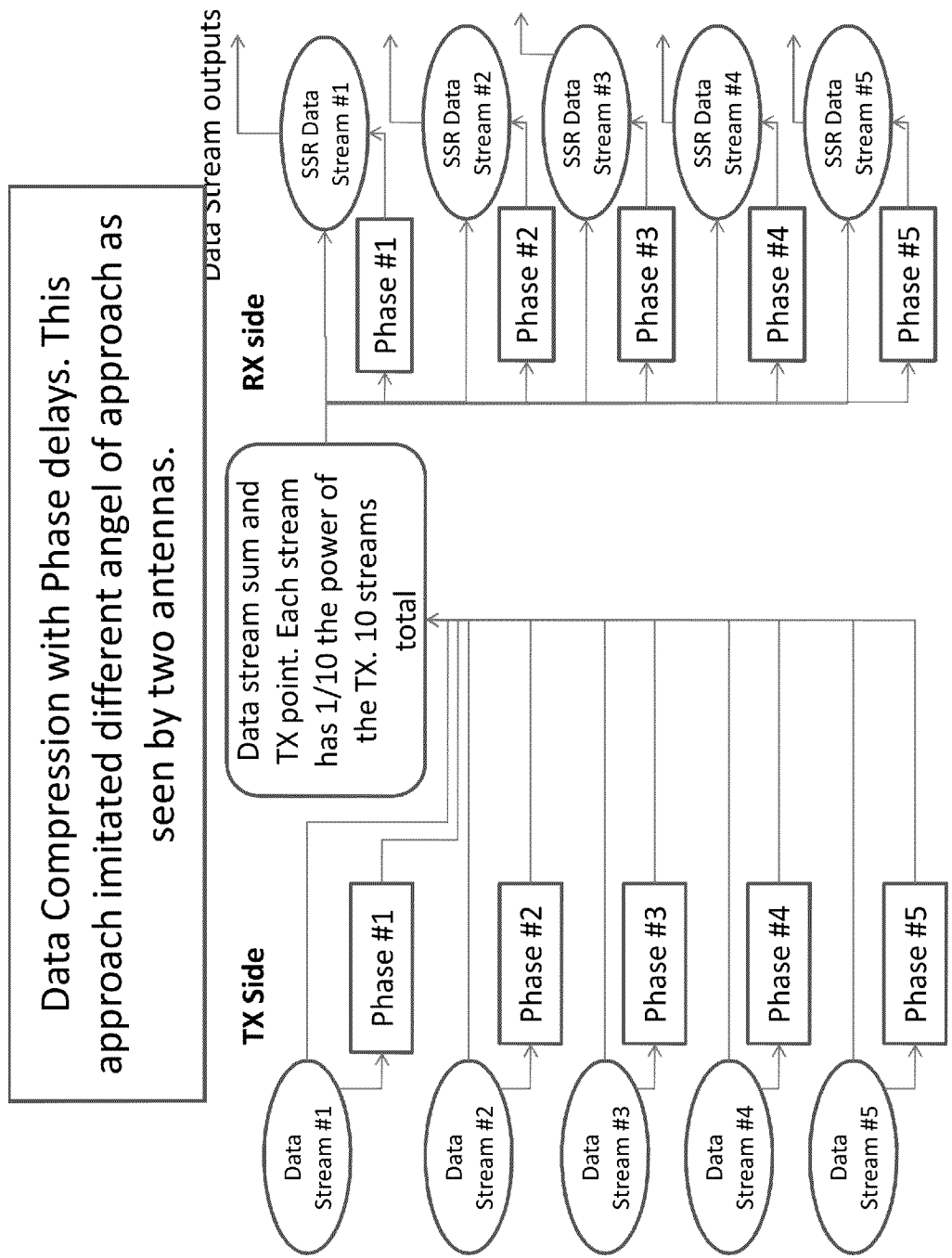
FIG. 39 illustrates data compression with phase delays using SSRs.

FIG. 39, for example, demonstrates the ability to use an SSR to implement data compression using phase delays. The various channels can be distinguished on the basis of phase delay. This approach can imitate the different angle of approach as seen by a two antenna array. Like the ratio, the phase with which the second signal (in each data stream) may be transmitted at a different phase. The SSR can adapt to and detect the phases to separate the data streams similar to the phase steering of a antenna array. As previously indicated, the various data streams may use the same frequency band.

Dish Receiver Jamming Elimination

Figure 40:
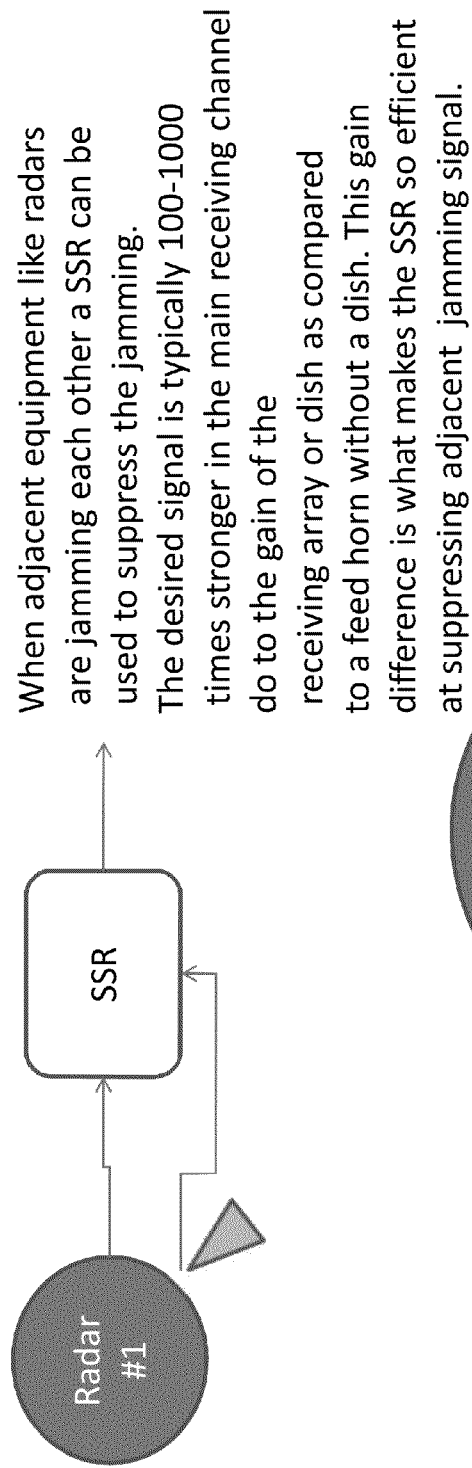
FIG. 40 illustrates an example of suppressing adjacent jamming signals.

When a radar or other focused antenna/dish or array receiver is being jammed the dish acts as a focus to the desired signal. The jamming signal is usually from one angle of approach and at a high amplitude. Since the feed horn of the dish antenna has the focused energy from the desired signal, the desired signal is much stronger than in a feed horn without the dish that is focused to the jamming source. When a second feed horn is fixed as to pick up the jamming energy and fed to the SSR's zero crossing detector after coherent mixing with the STALO the jamming signal is mostly eliminated. This arrangement will eliminate all jamming from the Jammer regardless of the lobe of the radar that the undesired signal is coming in on. When multiple jammers are present and the side-lobe/back-lobe is an issue, a feed horn that is attached to the back of the sail/dish and focused in the direction of the antenna lobe the jamming source entering in this lobe will be eliminated. A second way that the multiple jammers can be dealt with is with multiple horns each receiving energy form the undesired sources that are switched between as the dish makes its rotation. FIG. 40 illustrates an example of removing the jamming effect of adjacent equipment as previously described.

Data Security by Encoding Data Transmission Type

By taking advantage of the different ways information can be transmitted, different time delays pulsed transmission with different length pulses, data rates, continuous wave delayed signals of different delays, two frequency operation of many frequencies, different modulation types, antenna position, antenna polarities, etc., tens to hundreds of thousands different combinations can be used to transmit data before the encoded data itself is transmitted. The differences in encoding the data and encoding the data transmission type is that the encoded data is available to be cracked over time when the encoded data is received. On the other hand when the transmission type is encoded the data is never received without the key and no cracking of the encoded data is possible. Such a system would use a user name that can be easily scanned and the bank would send out the encoding type to the scanner for reception of the desired data.

Figure 10:
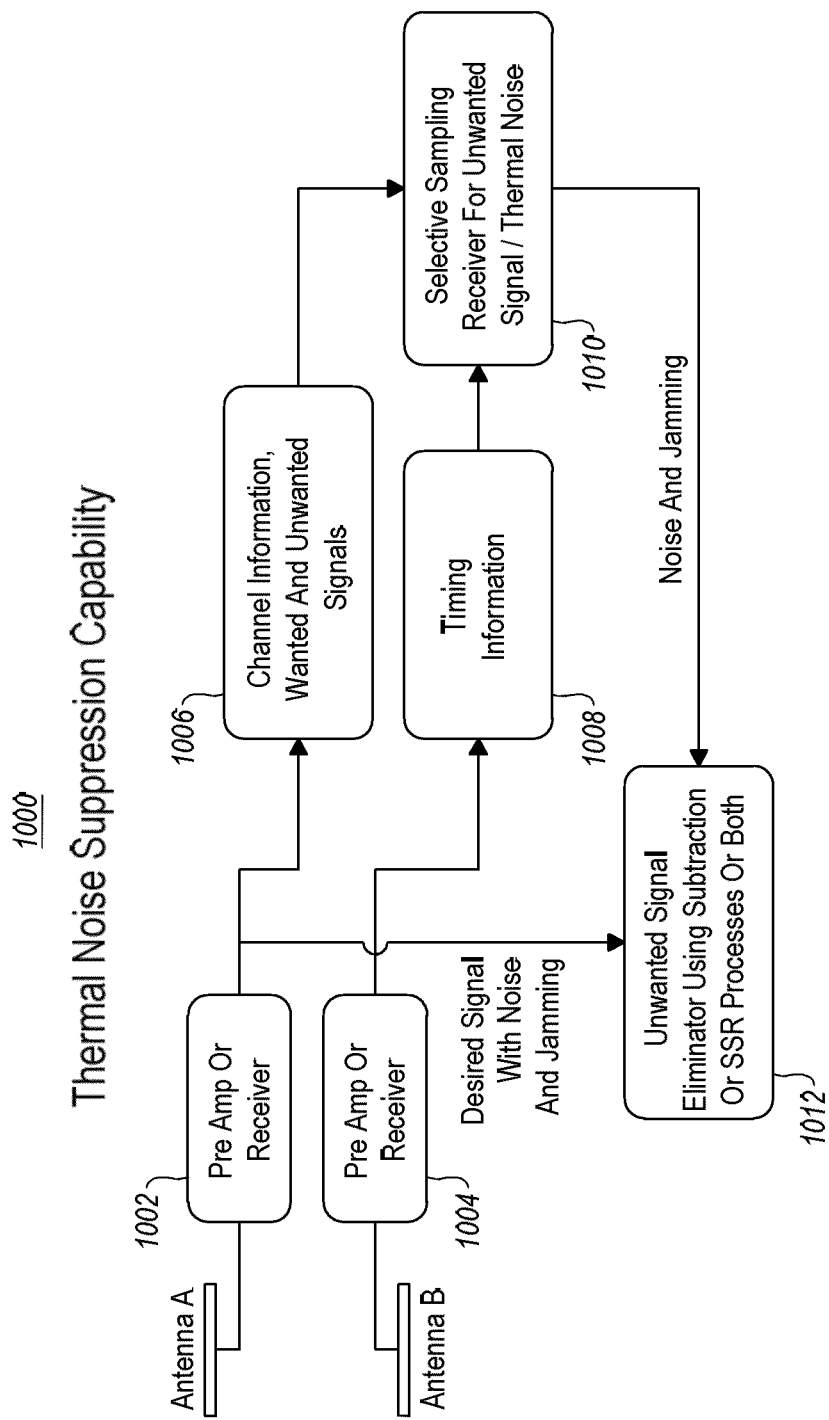
FIG. 10 illustrates thermal noise suppression capability in a selective sampling receiver.

FIG. 10 illustrates thermal noise suppression in or using a selective sampling receiver. In this example and in the following embodiments, systems and/or methods are disclosed. In this case, the selective sampling receiver also receives a known signal that can be sampled at known sample points. When the selective sampling receiver samples at the known sample points (e.g., zero crossings of the known signal), the undesired signals (noise or jamming) can be recovered. The remaining noise and jamming can then be subtracted out or applied to a zero crossing detector of a second selective sampling receiver that eliminates the noise or both. This also applies to a sum/delta that eliminates/nulls in the desired signal prior to demodulation.

Signals in a system 1000 in FIG. 10 are received at Antenna A and Antenna B. The received signals at the antenna A may include wanted and unwanted signals, which are provided to the selective sampling receiver. Antenna B receives a signal that includes timing information of the desired signal. The signal from antenna A may be provided to a pre amplifier or receiver 1002 and the signal from antenna B may also be provided to a pre amplifier or receiver 1004. The output 1006 of the receiver 1002 includes channel information of both the wanted and unwanted signals. The output 1008 of the receiver 1004 includes timing information 1008. An SSR 1010 can then use the timing information 1008 to sample the channel information 1006 at the nulls of the timing information. This enables the SSR 1010 to identify the unwanted signal from the channel information 1006 or the output of the receiver 1002. This includes a delta/sum channel that is run through a demodulator to eliminate amplitude differences between the sum and delta channels before subtraction which leaves the delta channel null desired signal. The output of the SSR 1010, which includes the unwanted signals (e.g., noise and jamming) can then be subtracted out of the output of the receiver 1002 to recover the desired signal. The subtraction can be done in a component 1012, which may be by subtraction, an SSR or other suitable device or any combination thereof.

More generally, the system 1000 can use the timing information of the signal in the output 1008 can be used to sample at known sample points to recover the unwanted signal(s) in the SSR 1010. The separated out unwanted signals or information can then be used to cancel out noise/jamming in the original signal channel received at the antenna A to thus recover the desired signal or can be used for SSR processing or both.

Figure 11:
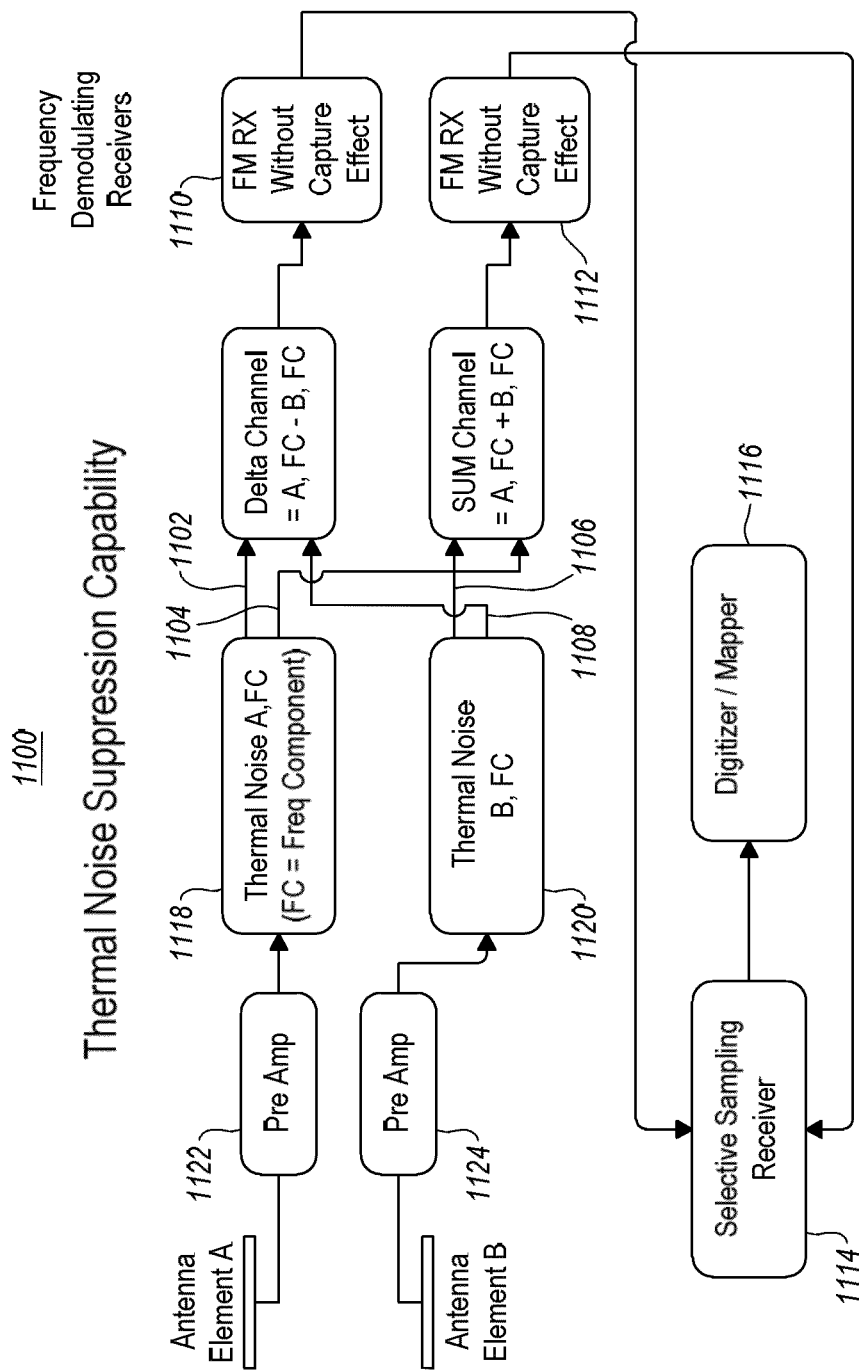
FIG. 11 illustrates thermal noise suppression capability when demodulating signals.

FIG. 11 illustrates an example of thermal noise suppression capability in a system that is comprised of or includes an SSR. In this example, signals are received at the antenna A and B and may be pre amplified. The output 1118 of the amp 1122 includes thermal noise and a frequency component while the output 1120 of the amp 1124 includes thermal noise and a frequency component. More specifically, the resulting signals from the A channel include thermal noise A, and a frequency component (desired signal) while the resulting signals from the B channel include thermal noise B and a frequency component (desired signal) desired signal component. The delta channel receives signal 1102 and 1108 while the sum channel receives the signal 1106 and the signal 1104 (signals 1102 and 1104 are the same and the signals 1106 and 1108 are the same but 1108 is inverted to form the delta channel). The outputs of the delta channel and the sum channel are provided, respectively to the frequency demodulator 1110 and the frequency demodulator 1112 without capture effect in one embodiment. The outputs of the frequency demodulators 1110 and 1112 are provided to the selective sampling receiver 1114 or to a subtraction stage to remove thermal noise or other interference. Thermal noise can be canceled in this embodiment do to the fact that Delta/Sum networks provide identical frequency to the frequency demodulators resulting in identical signals in both outputs which results in proper zero crossing timing to eliminate the thermal noise components as seen in FIGS. 8 and 9. The output of the SSR can be digitized or mapped, for example, by a digitizer/mapper 1116. The frequency demodulators 1110 and 1112 aid in overcoming amplitude problems. In other words, amplitudes are less of a concern because the frequency components are the same or substantially the same. The SSR 1114 lives in a null where the desired signal is canceled. In other words, a null is created to feed into a subtraction stage and/or the zero crossing detector for sampling purposes in order to identity either unwanted or desired signals. When a Sum/Delta receiving antenna network is formed all of the elements are coherent in sum channel where as in some elements energy is subtracted to form the Delta channel. This has a direct affect on the zero crossings between the sum and Delta channels in the amplitude domain. But when we look in the frequency domain both signals regardless of the amplitude are composed of the same frequencies. As a result interference from such sources that affect the individual elements whether internally produced or produced by national processes in the elements or preamps themselves will be suppressed.

The SSR 1114 or a subtraction stage uses the frequency demodulator in both the sum and delta channels. When applying selective sampling or a subtraction stage to demodulated FM signals, thermal noise components from the element and the preamplifiers can be suppressed.

In FIG. 11, since there is no negative frequency (unlike amplitude which may be negative), the SSR 1114 will provide similar deflection of the frequency demodulator 1110 and 112 for both the sum channel and the delta channel. When applying the SSR or subtraction stage to demodulated (FM) signals, thermal noise components from the elements and the preamp 1122 and 1124 can be suppressed or eliminated.

Figure 12:
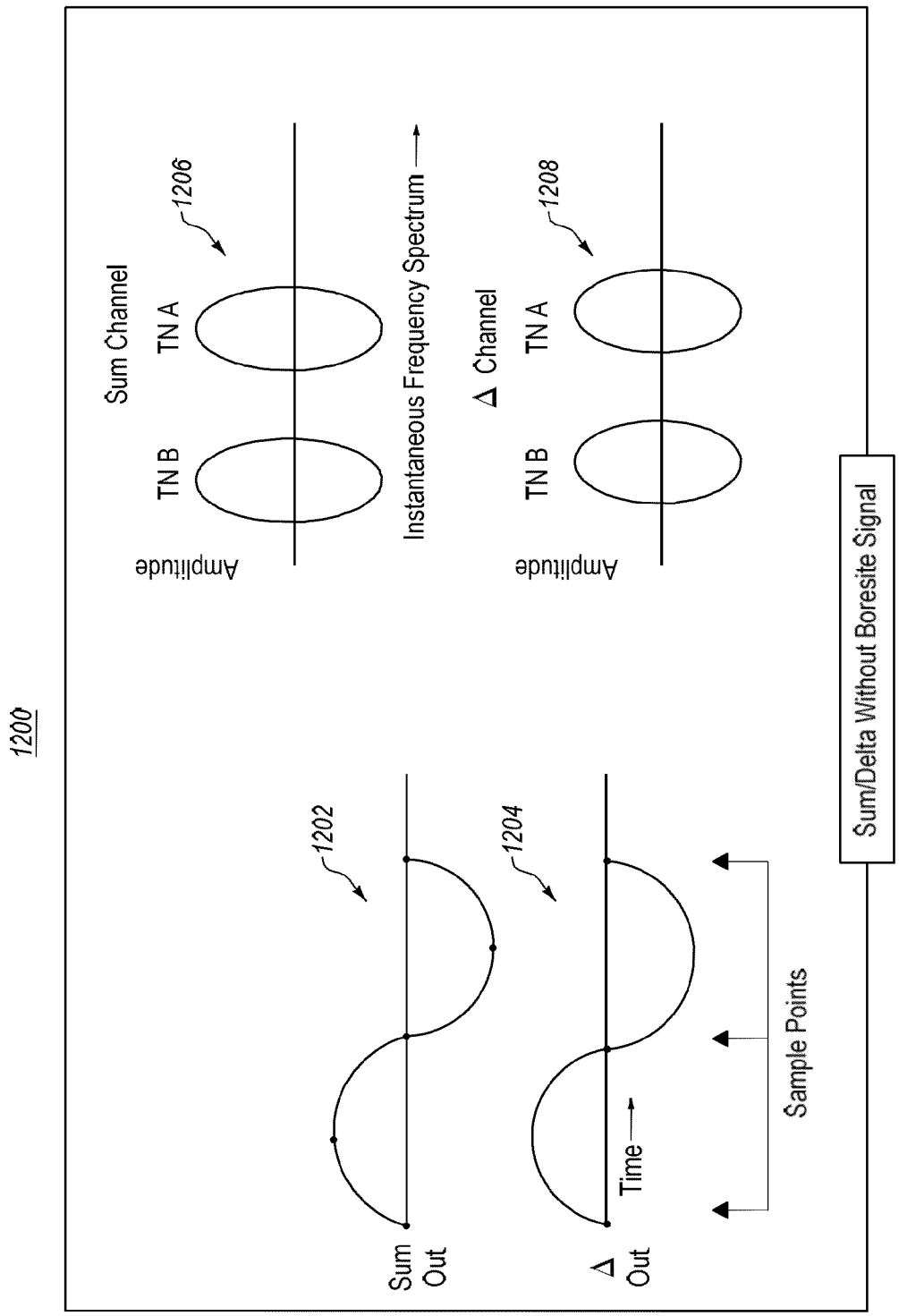
FIG. 12 illustrates the suppression of thermal noise in a selective sampling receiver.

FIG. 12 illustrates an output 1202 of the sum channel and an output 1204 of the delta channel. With continued reference to FIG. 11, thermal noise will appear in both frequency demodulators. As a result, the sum and the delta channels may be affected by the same thermal noise. The SSR or subtraction stage suppresses signals that are the same. As a result, thermal noise is suppressed in the receivers. The frequency demodulation in the sum channel is shown as a frequency component line 1206 and in the delta channel as a frequency component line 1208. The frequencies of the undesired signals respond the same to frequency demodulation even in cases where amplitudes are different. The desired signal is canceled in the delta stage before frequency demodulation so it is not present in the zero crossing stage or is cancelled in the subtraction or cancellation stage. This allows the desired signal to pass unlike the thermal noise (or other undesirable signal) which can be removed.

Figure 13:
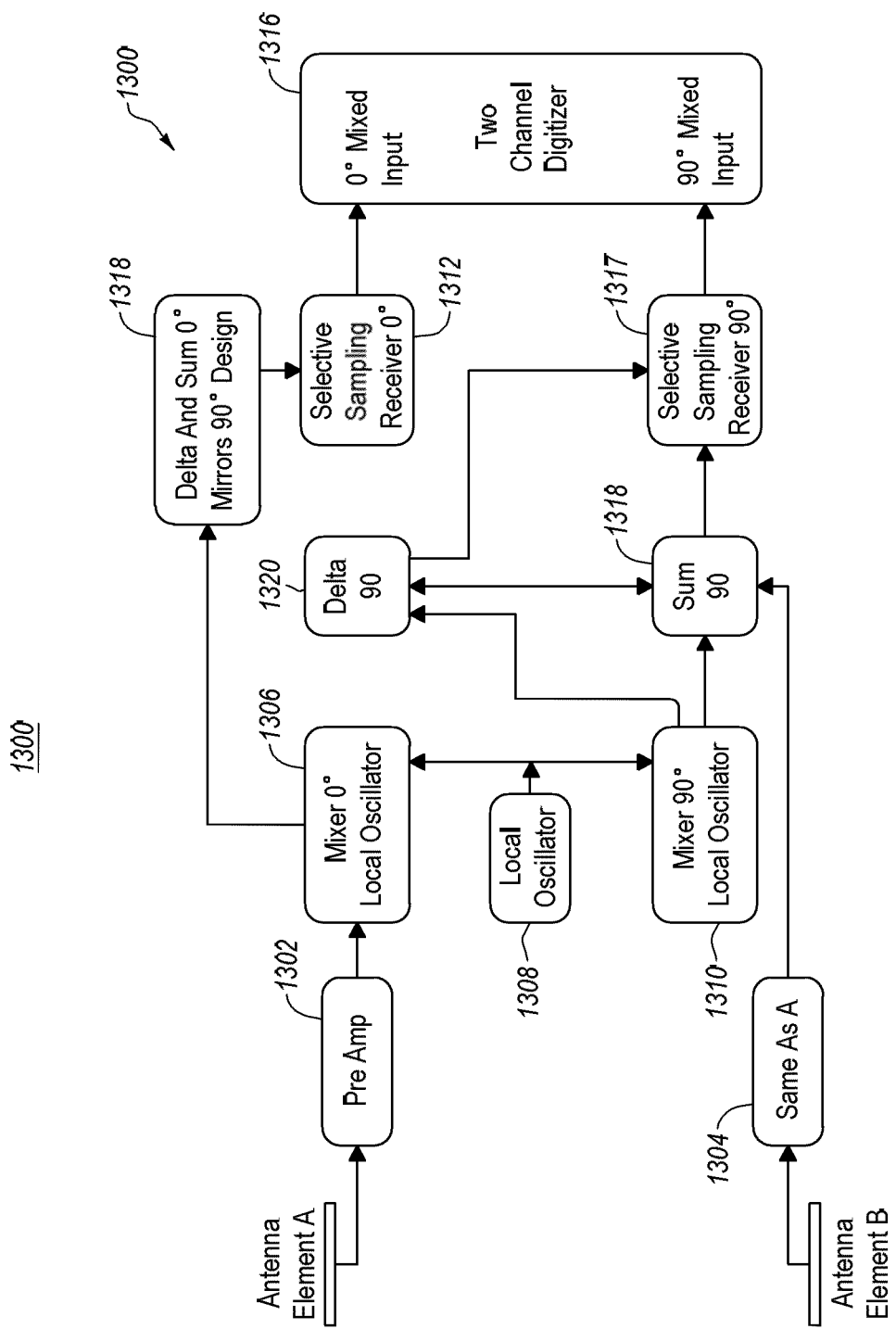
FIG. 13 illustrates an example of increasing samples per wave cycle.

FIG. 13 illustrates a system 1300 to increase a number of samples in, for example an SSR. The system 1300 uses offset local oscillator inputs. Since the zero crossing is a combination of the two mixed signals, the zero crossings will also be offset. As a result, samples per cycle can be generated that exceed Nyquist sampling rate requirements.

The portion 1318 mirrors the 90 degree example. FIG. 13 illustrates signal A and B amplified, respectively, by pre amp 1302 and pre amp 1304. A local oscillator 1308 is mixed with a mixer 1310. An output of the mixer 1301 and the output of the pre amp 1304 is input to the sum 1320 and delta 1318 channels. The output of the delta 1320 and the sum 1318 channels are provided to an SSR 1314 for the 90 degree portion. The output of the SSR 1314 is provided to a digitizer 1316. The portion 1318 mirrors this example for the 0 degree portion and is provides to an SSR 1312. The outputs of the SSR 1312 and the SSR 1314 are then combined in the digitizer 1316, which results in a sampling rate that is greater than the Nyquist rate.

Figure 14:
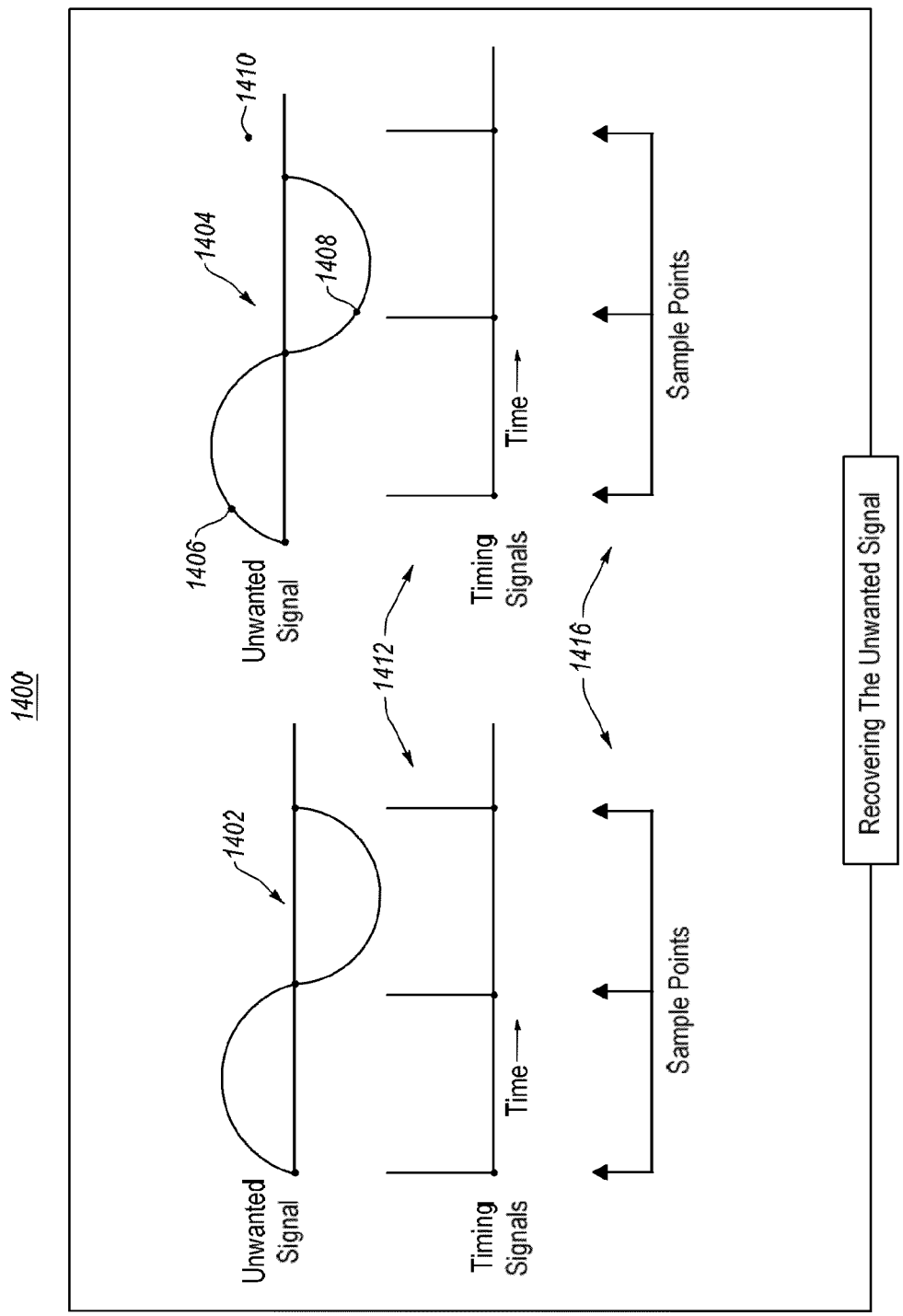
FIG. 14 illustrates an example of a selective sampling receiving process to recover an unwanted signal.

FIG. 14 illustrates recovering an unwanted signal, which can then be used to recover a desired signal. By sampling the unwanted signal 1404 at zero crossings of the wanted signal 1402, the unwanted signal can be recovered, as illustrated by the sample points 1406, 1408, and 1410. Selective sampling can be achieved by knowing when to sample at the zero energy points of the signal to be eliminated. Because noise and jamming signals are unknown, it is difficult to know the required timing of these signals. The wanted signal 1402, in contrast, is often known. A timing signal that identifies the zero crossings of the wanted signal can be used to recover the unwanted signal or signal component and then eliminate the unwanted signal in order to recover the wanted signal as previously described. The timing signal, for example, can be sent at a different frequency, modulated on the carrier, etc. The timing signals 1412 can be encoded in various ways and used to identify when sampling occurs as illustrated by the sampling times 1416.

Figure 15:
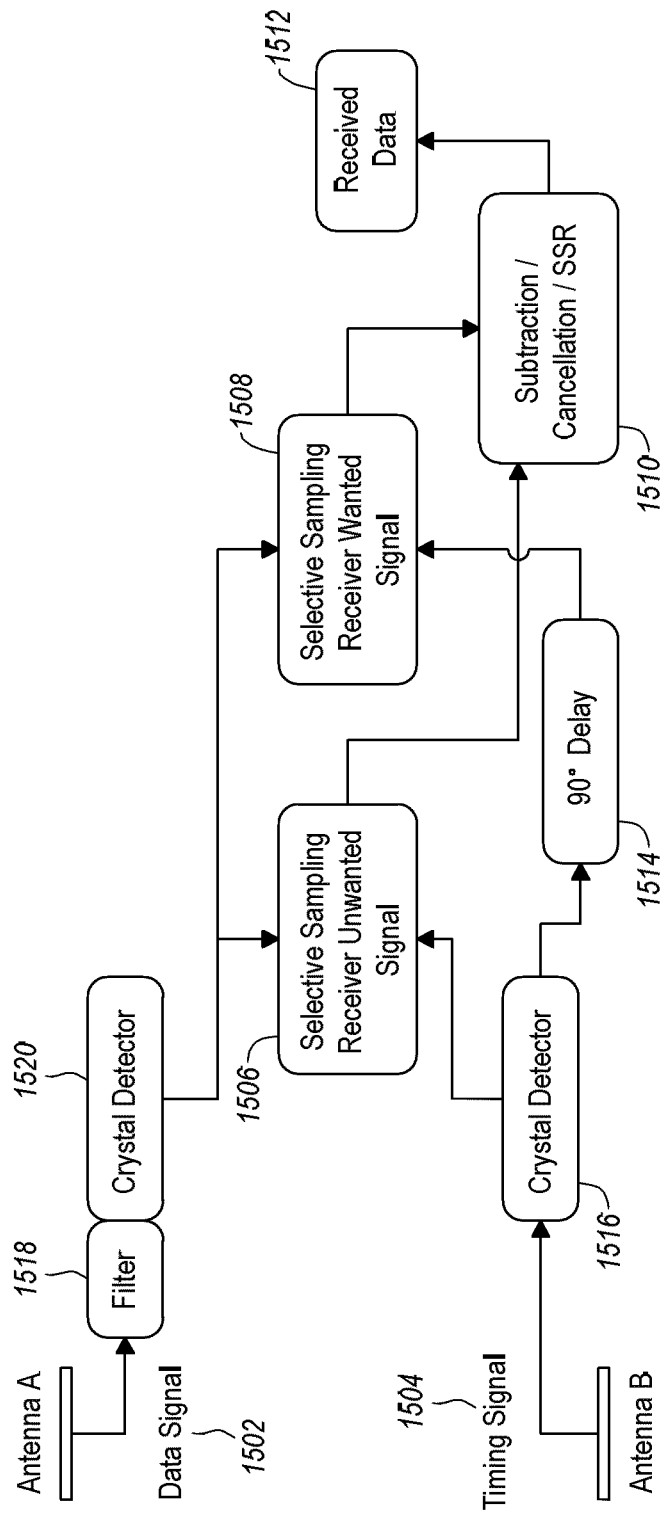
FIG. 15 illustrates an RFID application of a selective sampling receiver.

FIG. 15 illustrates an RFID application using a selective sampling receiver. RFID tags have not been excepted do to their high cost do to the receivers needed. In contrast the receiver in FIG. 15 is made of a few dozen inexpensive passive components. The data signal 1502 passes through a filter 1518 and a detector 1520 (e.g., a crystal detector, which is very inexpensive). A timing signal 1504 is also detected by a detector 1516 (or other suitable device or component). One SSR 1506 identifies the unwanted signal while another SSR/ or sample circuit 1508 recovers the max power of the wanted signal received from, for example, an RF ID tag. A final SSR is used to recover the received data by suppressing the unwanted signals 1512. The 90 degree delay provides maximum timing for the desired signal when fed by the 0, 180 degree sampling timing signal. The timing and data signals can be supplied by different carriers or modulations on the same carrier or other suitable means to communicate the timing data.

The RFID system illustrated in FIG. 15 can be used for multiple RFID tags simultaneously. The scanner can be a hand scanner to a warehouse scanner that provides the data and timing information to the RFID tag. The tag responds with a digital data stream that identifies what it is as well as a serial number to identify who it is. With the SSR's directional capabilities we can identify where the tag is. Since tags can respond at the same time using the SSR's directional capabilities, multiple frequency matching, or multiple phase delay operation many tags can talk at once and on the same frequency. At the time of purchase the system would record the transaction and would not respond to the second scan as the product walks out the door or the tag itself would be put into an inactive state at the time of purchase. To prevent other products that are not to be purchased from responding, the directional capabilities of multiple scanners can be used to limit the geographic area of the cart or purchase area. Also to prevent multi-path one scan is performed at a time. A tag can also respond to tampering and alert the inventory system.

Figure 16:
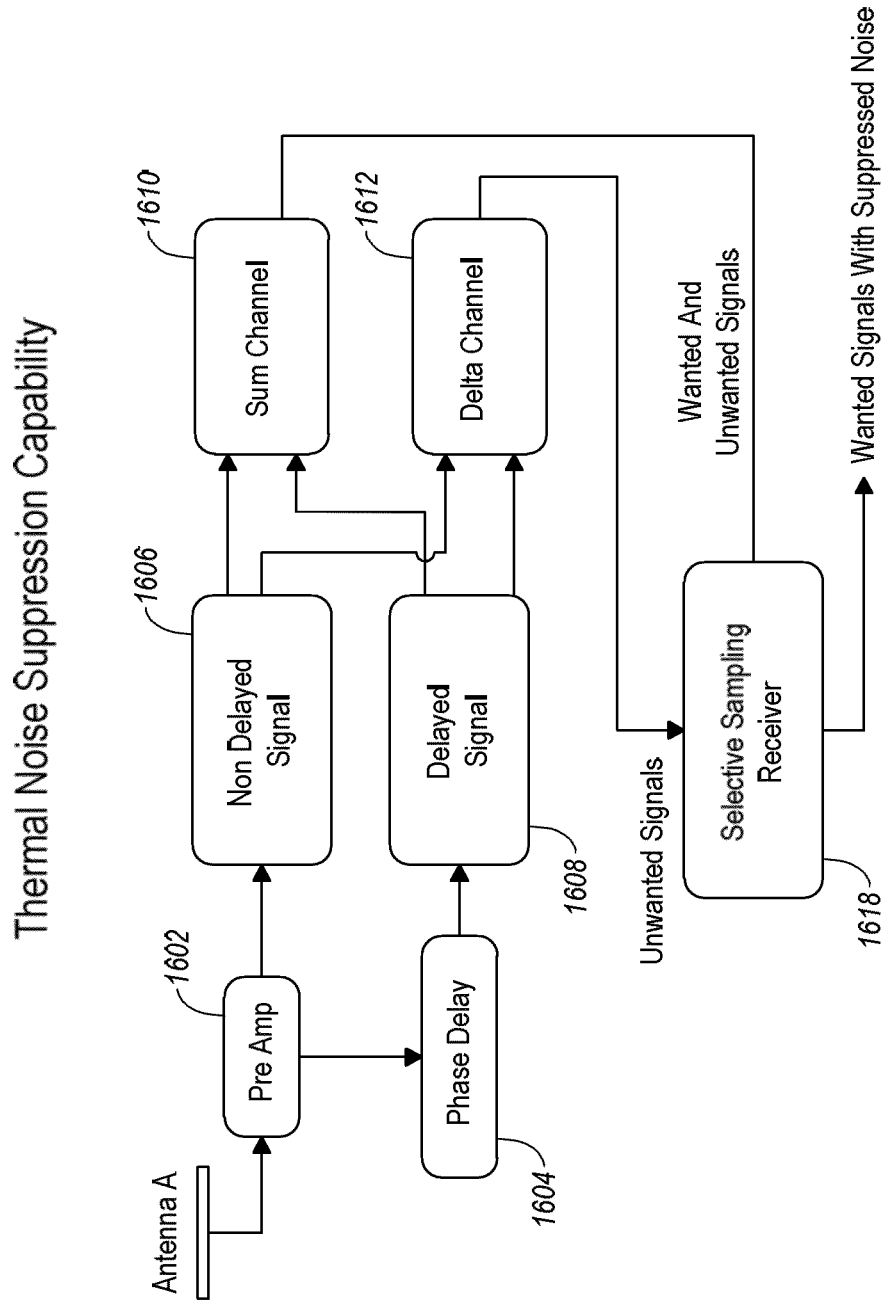
FIG. 16 further illustrates thermal noise suppression in a selective sampling receiving process.

FIG. 16 illustrates another example of thermal noise suppression. In this example, a pre amp 1602 amplifies a signal from an antenna. The output of the pre amp 1602 is provided to a phase delay 1604. Thus, two identical signals are provided to the SSR through the use of phase delays. The non delayed signal 1606 and the delayed signal 1608. The transmitter transmits two identical pulses. The first input or non delayed signal 1606 to the SSR sum 1610 and Delta 1612 networks may not be phase delayed. The second input (the delayed signal 1608) is phase delayed. As these delayed and non delayed signals combine they produce a null in the delta channel and is inputted into the SSR 1618 and produce a time delayed processed SSR signal. FIG. 16 shows pulsed operation but other forms are also possible to include Continues wave.

FIG. 16 illustrates that a phase delay is one way to create a null. The delay is often a multiple number of cycles. The delay can be relatively small from a few cycles to tens of cycles or in the range of hundreds of cycles or even more in some embodiments. The delay is an example of creating a multipath signal and is used to create a null in order to operate the SSR 1618. The receiver of the signals should be substantially the same.

Figure 17:
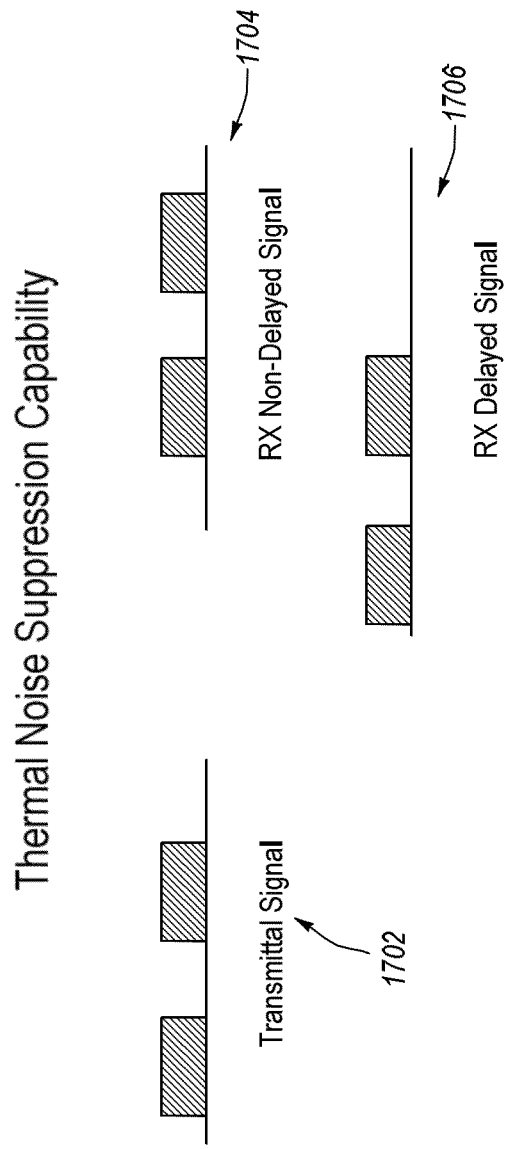
FIG. 17 further illustrates thermal noise suppression in a selective sampling receiving process.

FIG. 17 illustrates an example. The transmitted signal 1702 is received and the non delayed signal 1704 and the delayed signal 1706. The delayed signal matches up with the non delayed signal 1704, which enables the SSR to extract the desired signal and suppress interference, noise, or other unwanted signals. Some suppression can also be done with a cancelation nulling stage after demodulation.

In a radar or data TX system, for example, two TX pulses can be transmitted at different times but at the same or different frequencies. The pulses are then received by an antenna (such as the antenna in FIG. 16). The second RX pulse (corresponding to the second TX pulse) which is the same in every way (to include returning Doppler shift). Thus, the first RX signal and the delayed RX signal will have identical signals that will cancel in the delta stage and reinforce in the sum stage. Such signals pass through the SSR or nulling out after a demodulation stage.

FIG. 40, for example, illustrates that adjacent equipment like radars may jam each other. An SSR can be used to suppress the jamming signal. The desired signal is typically stronger in the main receiving channel. The gain difference is an example of what the SSR may use to suppress the adjacent jamming signal.

Most jamming and some thermal noise, in contrast, will neither reinforce or cancel and will thus be canceled in the SSR. This can clean up received signals and make other signals available by pushing down the noise floor. It is also possible to use the time of transitions between pulses as a filter to separate out one signal from overlapping data signals. Such an approach allows for one frequency to carry many data streams all at the same time and frequency. Such an approach can be used in any stage of a super-heterodyne receiver, cable, twisted pair system Thus, as illustrated in FIG. 17, timing signals generated out of the delta channel will be when the signals and noise are equal and produce a null. Noise will rarely be at a zero level in both channels at the same time. Because this signal is based off of an average of two signals, the timing signal will be generated more often around zero than the peak noise level, thereby providing some noise suppression.

A system of successive SSR's have the ability of tuning out noise and unwanted signals based on angle of approach (antenna networks and nulls), two or more frequency matched signals, phase delay SSR, time delayed, antenna pattern or polarization, modulation type SSR etc. Each stage adds to the suppression of jamming noise and improves signal to noise ratio. This would include applying the SSR in multiple stages within the receiver process each reducing unwanted signals to include all noise types.

Figure 18:
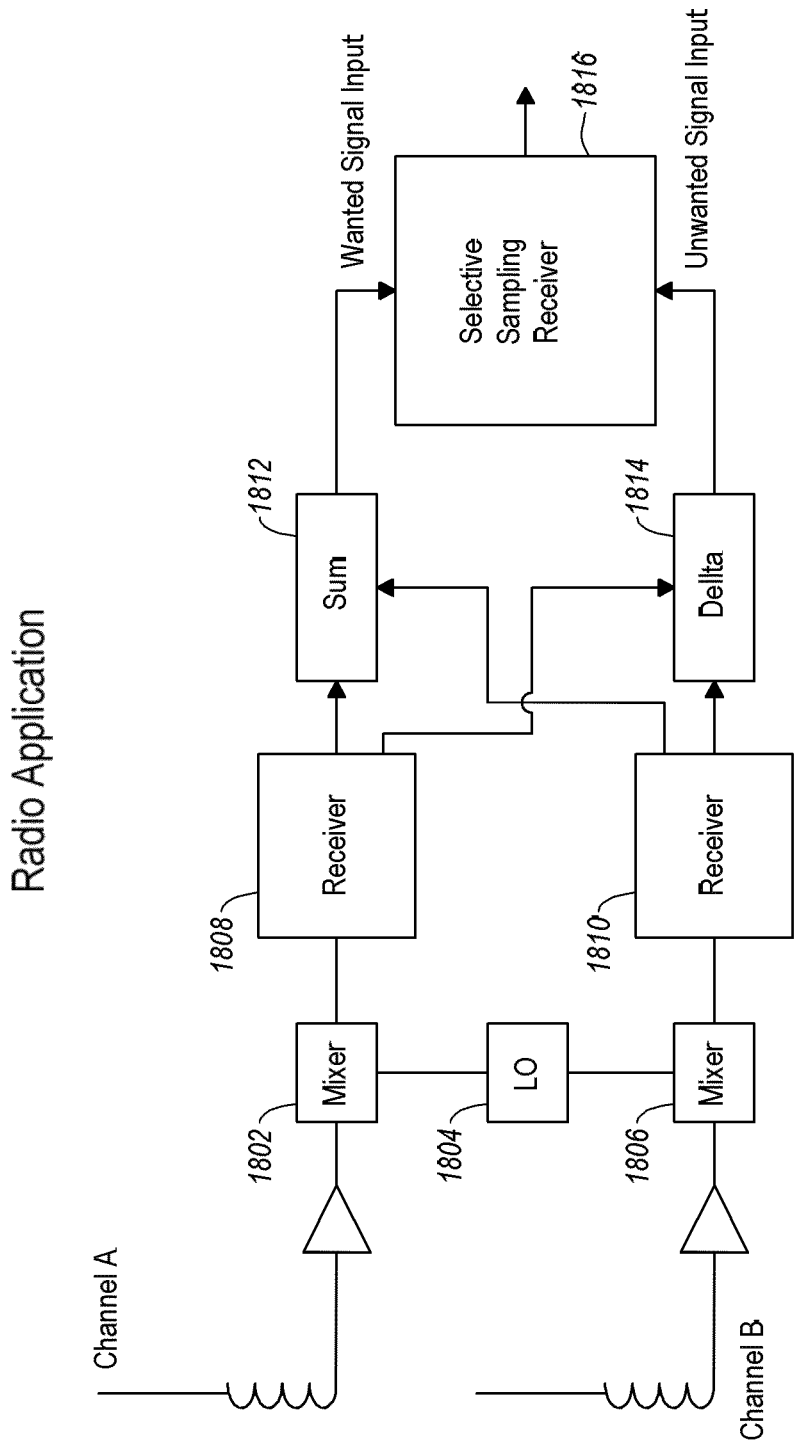
FIG. 18 illustrates a radio application of a selective sampling receiver.

FIG. 18 illustrates a radio application that rejects thermal and/or other noise including jamming. In one example, the radio application may remove interference from adjacent radars. Signals are received by the channel A and the channel B and provided, respectively, to the mixers 1802 and 1806, where the signals are mixed with a frequency 1804. The receivers 1808 and 1810 provide their outputs the sum channel 1812 and the delta channel 1814. An SSR 1816 can then identify the desired signal or be configured to identify an unwanted signal or both. These receivers can be at the same or different frequencies.

In FIG. 18, the received data is equally processed through the system, but thermal noise and some system noise may be channel dependent. The matched signals in both channels is cancelled in the delta or unwanted signal input and is used for the zero crossing detector and reinforced in the sum or desired signal input. Such receivers may be matched for proper operation. Noise is usually random and needs to be matched for a null to exist in the delta channel to produce a sample pulse to the SSR. Jamming signals could be cancelled with Selective Sampling Receiver. In one example, the receiver 1808 and/or 1810 can be tuned to the jamming signal. For example, the frequency of an adjacent radar may be known. This frequency can be tuned in order to better identify the jamming signal when extracting the desired signal in the SSR 1816.

FIGS. 19 and 20 illustrate an example of cascading SSRs. The example in FIG. 19 reduces off bore-site signals and provides for multiple RX paths in a system. FIG. 19 illustrates a directional SSR 1902 followed by an SSR 1904. The directional SSR 1902 can reduce off bore sight signals and provide for multiple RX paths as previously stated. The directional SSR 1902 may include two antennas to create a null in order to generate the desired signal or remove the unwanted signal. The directional SSR 1902 may include an AM and/or FM modulation.

The output of the directional SSR 1902 is provided to the next SSR 1904 stage. A second stage can improve signal to noise ratio, provide data stream separation due to unlike paring of frequencies or modulation types, and provide RX of desired signal sync data or modulation types data for further processing. The second SSR 1904 works on two different frequencies and creates nulls based on matched frequency information in the modulation.

FIG. 20 illustrates additional SSR stages to the stages illustrated in FIG. 19. The output of the SSR 1904 is provided to the SSR 2002. The SSR 2006 may use an AM sync signal (identified in the stage or SSR 1904) to identify zero crossings. The SSR 2002 can produce all un-synced signals for processing.

The output of the SSR 2006 can then be subtracted from the output of the stage 1904 in a subtraction stage 2010. The output of the subtraction stage 2010 is provided to an SSr 2008 along with an output of the SSR 2006 to generate a final output 2012. Cascaded SSRs remove un-synced or unwanted signals that may include intentionally introduced unwanted signals, all types of noise, or the like.

In other words, initially an SSR is used to recover the unwanted signal. This stage can recover un-synced signals for further processing (stage 2002). This stage is followed by a subtraction stage that can cancel un-synced signals (2010). This stage is followed by a thermal noise rejection stage (2008) that used an SSR to reduce remaining unwanted signals to generate an output.

FIG. 21 illustrates data compression with delay lines. Multiple data streams can be transmitted. In some examples, the data streams are transmitted on the same frequencies. Each data stream may also be delayed. As a result, each data stream is transmitted twice (once as an original signal and once as a delayed signal.

On the receive side, SSRs can be used to recover the original data stream signals as described herein. The delays in each stream can vary or be identified in different ways. For example, the amplitude of the signals can be used to identify the delays in the various signals. As previously described, the original signal can be recovered using the delay. In one example, this enables multiple data streams to be transmitted and to be recovered without causing problems. For instance, when recovering the data stream #1 using the appropriate delay, the other data streams 2-5 and their associated delayed signals effectively appear as noise, which noise is removed by the SSR processing the data stream 1.

FIG. 22 illustrates dual modulation, although embodiments contemplate additional types of modulation. An SSR can be used to recover the desired signal and/or the undesired signal. Data streams can be separated due to unlike paring of modulation types. In FIG. 22, modulation is used for a signal received at an antenna. The modulation can include AM and/or FM modulation. The outputs of the modulation 2202 and 2204 are provides to the sum channel 2206 and the delta channel 2208. The outputs of the sum and delta channels 2206 and 2206 are provided to the SSR 2210, which may use the AM modulated signal sync signal. The output of the SSR 2210 can be used in later stages if desired.

FIG. 23 illustrates dual frequency using SSRs. In this case, many data sets can be used and overlap. The SSR can be used to pass matched sets. This provides improved signal to noise ratio and data stream separation due to unlike paring of adjacent frequency channels. The signal is provided to a receiver 2302 using one frequency and to a receiver 2304 using another frequency. The outputs of the receivers 2302 and 2304 are provided to the sum and delta channels 2306 and 2308. The SSR 2310 can pass matched sets of frequencies while being able to reject unmatched frequencies, which often correspond to noise in one embodiment. Data streams that match are used to create nulls, which in turn can be used to sample the signal to isolate and ultimately remove unwanted signals from the received signal with a subtraction stage or selective sampling receiver.

FIG. 24 illustrates forced high frequency sampling. This enables the SSR to be applied into the output of the received signals at low frequencies. In FIG. 24, increased sampling rate can be achieved. When a higher frequency signal is allowed to dominate the sum and delta outputs equally, many zero crossings are produced for every original data wave. This facilitates reconstruction of the original data signal. This digitization occurs since the delta zero crossing occurs when the sum channel is offset by the same amount as the desired signal's amplitude. This allows for the SSR to be applied into the output of the received signals at low frequencies.

Figure 25:
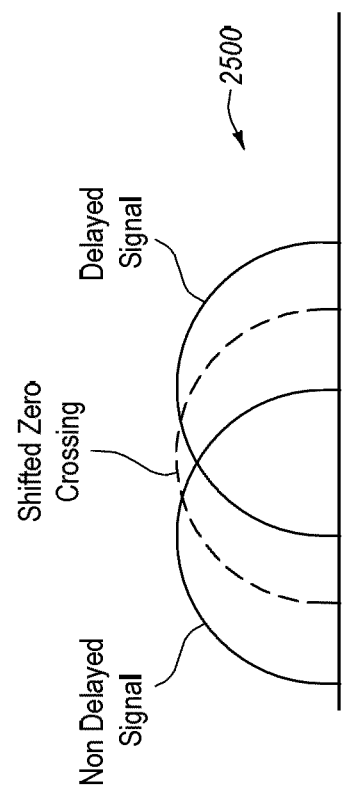
FIG. 25 illustrates a calculation of phase shift, which may be sample by sample

FIG. 25 illustrates an example of calculating phase shift and illustrates a non-delayed signal, a shifted zero crossing, and a delayed signal. Calculating the phase shift enables the zero crossing to be shifted and used in the SSR. As two signals are added or subtracted together the zero crossing can be affected. The SSR system is no exception and when many signals are present such offsets are likely to exist which will limit the effectiveness of the SSR. Embodiments such as the Delay line SSR the direct line signal can be used as a reference timing from which the delayed signal, Sum, is added and the delayed signal, delta, is subtracted. As a result the effects of this type of offset can be calculated on a sample by sample basis.

Figure 26:
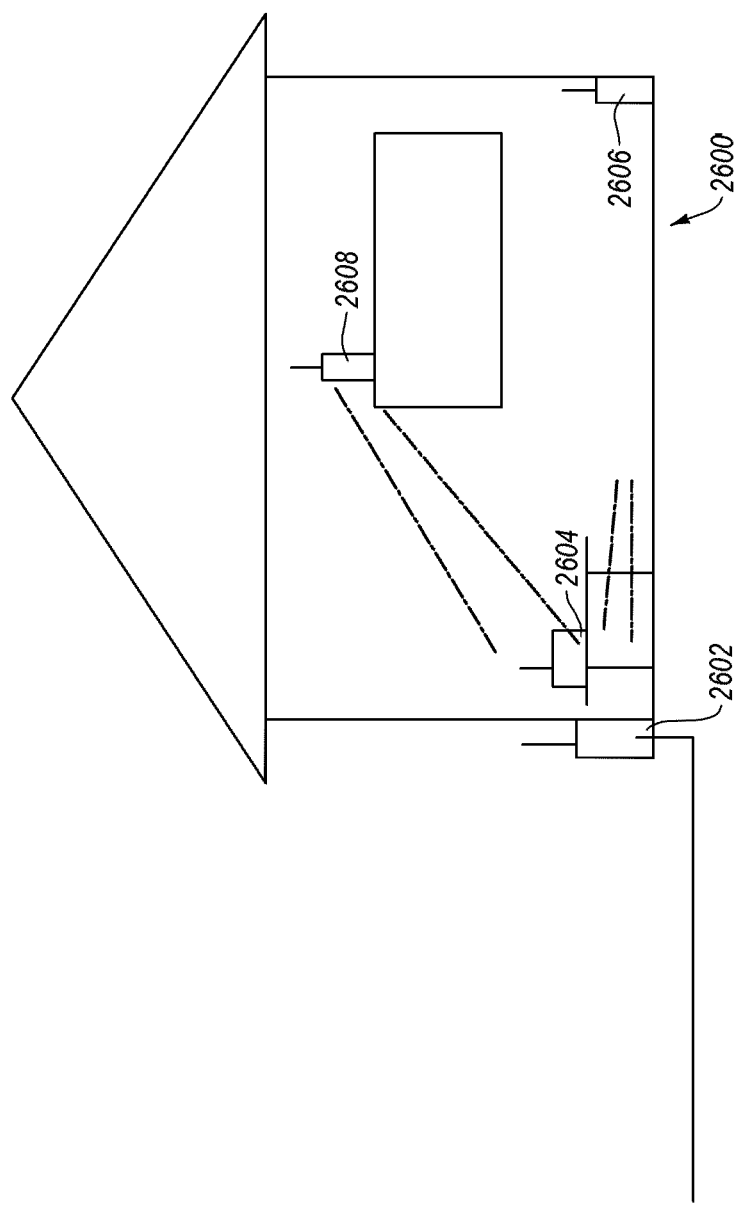
FIG. 26 illustrates an RF networked home using SSRs

FIG. 26 illustrates an example of an RF networked home or business that includes one or more SSRs. Because an SSR can be produced inexpensively, the ability to incorporate SSRs into wireless networks is not a cost burden. In addition, the ability of an SSR to incorporate the entire bandwidth for multiple signals enhances the use of the available bandwidth and can increase or maintain effective network speeds even as additional network devices are added.

In FIG. 26, an SSR 2602 can be mounted at a demark point and connected, by way of example, to a phone line or other communication line. This may provide power to the SSR 2602. The SSR 2602 may then communicate with a wireless router 2604, which can in turn communicate with devices 2606. Directional SSR's prevent most interference and multi-part when slant rates are high. This allows for the reuse of the allotted bandwidth. Roof top units will have the highest slant rates and least multi-path. Sending unit on roof can distribute antennas at different spots along the roof line to reuse band width as well for more users. With the extremely low power, directional abilities, increased data flow rates, and encoding abilities of the SSR a wireless communications house becomes practical. The data would flow as shown to the demark point at which time a very low power TX/Rx SSR that is powered off of the phone line, would send the data to a wireless router that would distribute it through out the house. This allows for no lines to be run in new construction or eliminate the need for existing wires that may need repair or that are limiting the data flow rate without remodeling the house. A solar powered wireless roof top unit (SSR) can also be used to communicate with a service provider.

Figure 27:
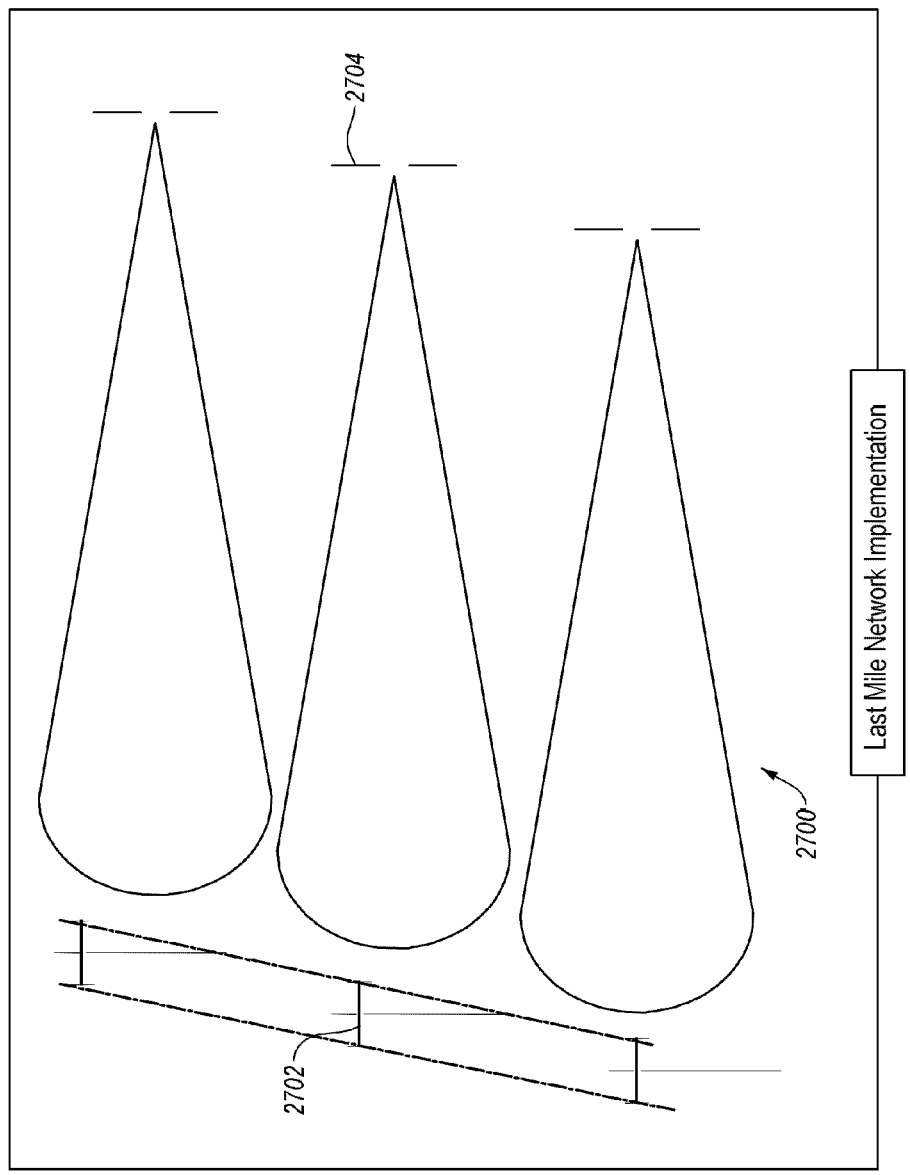
FIG. 27 shows an implementation of SSRs in delivering connectivity to multiple receivers.

FIG. 27 illustrates an example of a last mile network implementation. The last mile is an example of a final leg of connectivity from a communications provider to a customer. The last mile is typically expensive for the provider because the wires and cables are fanned out to the various locations. The cost requirement to establish and maintain the infrastructure is expensive.

Figure 42:
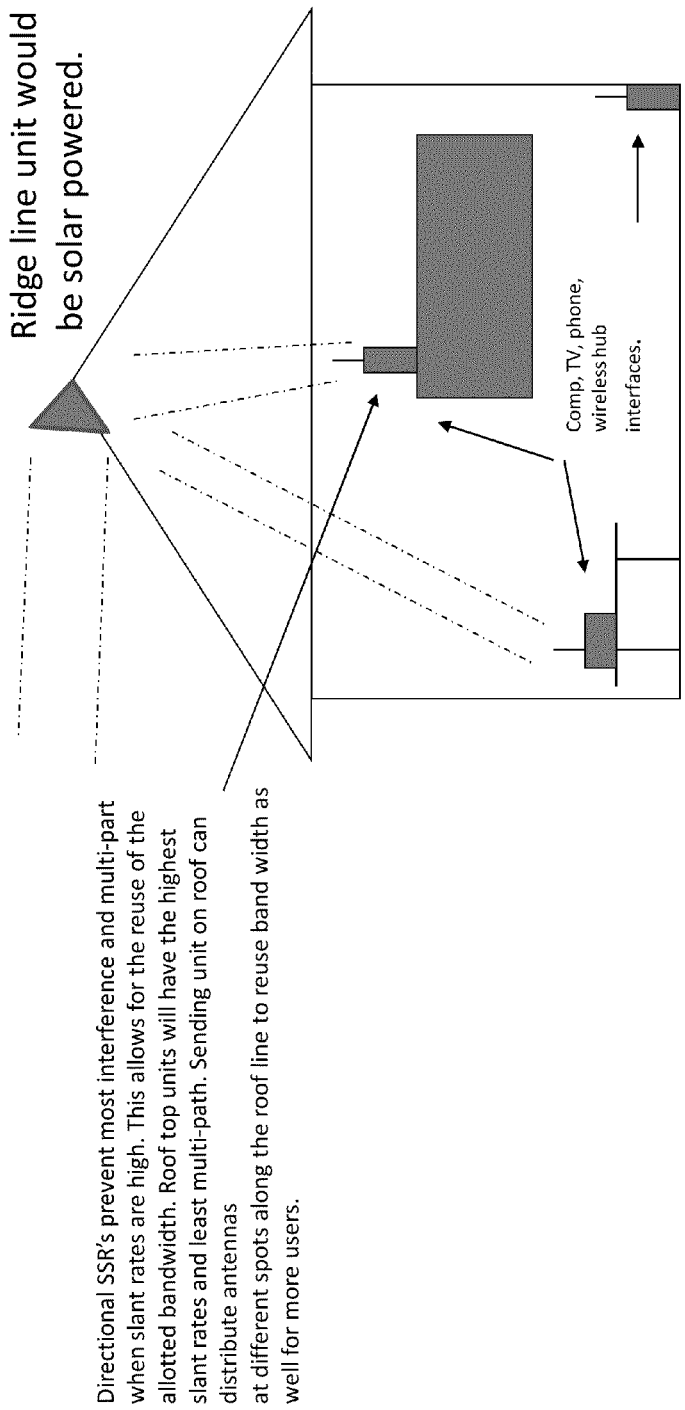
FIG. 42 further illustrates an example of an RF networked home or business.

FIG. 42 further illustrates an example of an RF networked home or business. Ridge line or elevated units will be able to communicate with community networks that are fed from high density data lines like fiber optic and may be on telephone poles or the like (see FIG. 27). High demand can be accommodated since, as previously described, an SSR allows multiple data streams over the same frequencies.

Embodiments of the invention can overcome this problem, as illustrated in FIG. 27. In this example, a telephone line can used to implement the embodiment. A transmitter/receiver (which may include an SSR) can be mounted on each telephone pole, for example, and a receiver can be implemented at each receiving location (e.g., home). The transmitter/receiver can actually be mounted in any location and not necessarily on a telephone pole. However, the array can be variable to deal with signal to noise and focusing concerns. As previously described, the SSRs enable the entire allotted frequency spectrum to be used at each location. Thus, each transmitter/receiver can communicate with one or more customers without interference from other adjacent receivers/transmitters. More specifically, a transmitter/receiver 2702 (which may include an SSR or a multistage SSR) in a system 2700 may be mounted at an appropriate location to communicate with a receiver 2704. Embodiments enable high density receivers and allows each transmitter/receiver 2702 to reuse the entire allotted frequency spectrum.

Figure 28:
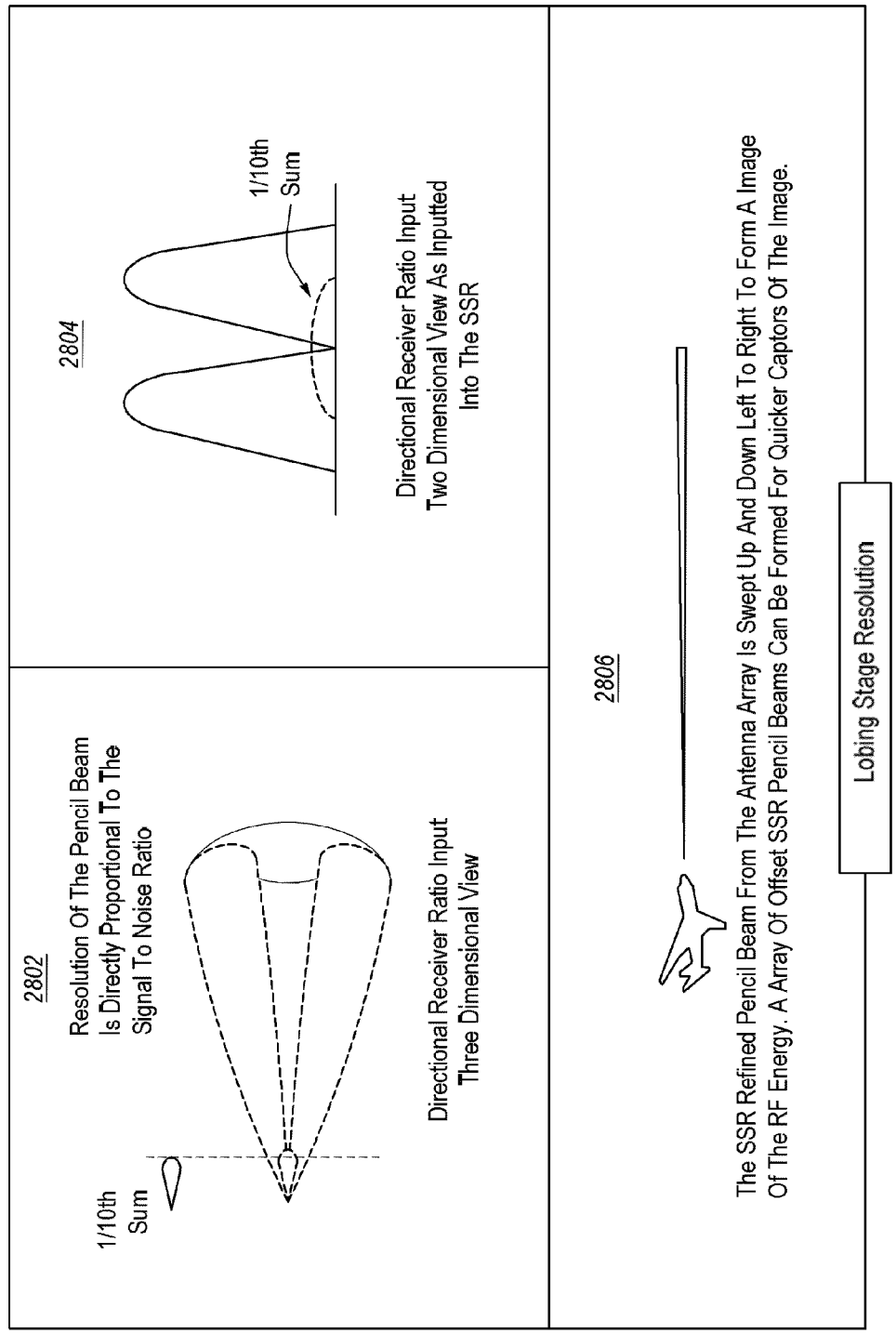
FIG. 28 illustrates lobing stage resolution.

FIG. 28 illustrates an example of lobing stage resolution. At block 2802, a resolution of a pencil bean is directly proportional to the signal to noise ratio and provides a three dimensional view of a directional receiver ratio input. At 2804, a two dimensional view as inputted into an SSR is shown. Block 2806 illustrates that an SSR refined pencil bean from an antenna array can be swept up and down and/or left to right to form an image of the RF energy. An array of offset SSR pencil beams can be formed for quicker capture of the image.

Figure 29:
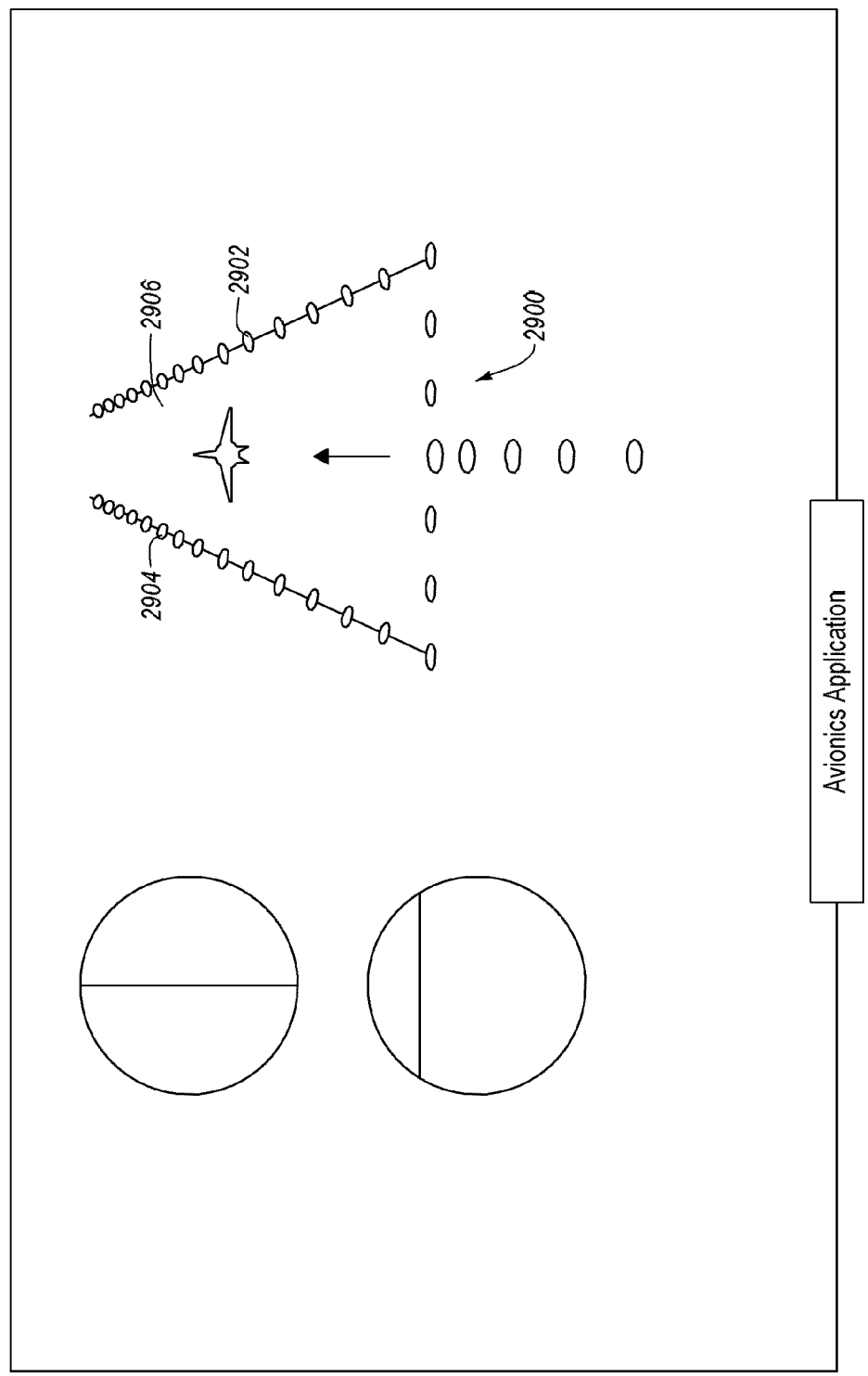
FIG. 29 illustrates an imaging system using SSRs and one or more transmitters.

More specifically, as shown in FIG. 29, an SSR can be used to form an image of a runway. Because an SSR can see through many jamming signals at once as described herein, a runway 2906 can be lined with transmitters (e.g., transmitters 2902 and 2904) of the same or different frequencies. An SSR and an antenna array enables the runway to be imaged. A pencil beam, for example, can be used to sweep the runway 2906 and to identify the locations of the various transmitters and generate an image therefrom. The directionality of the SSR also aids to identify the locations of the transmitters. A pilot can thus maintain situational awareness of what is on the runway. Embodiments of the invention are not limited to imaging a runway, but can be used in other situations or environments as well.

Figure 30:
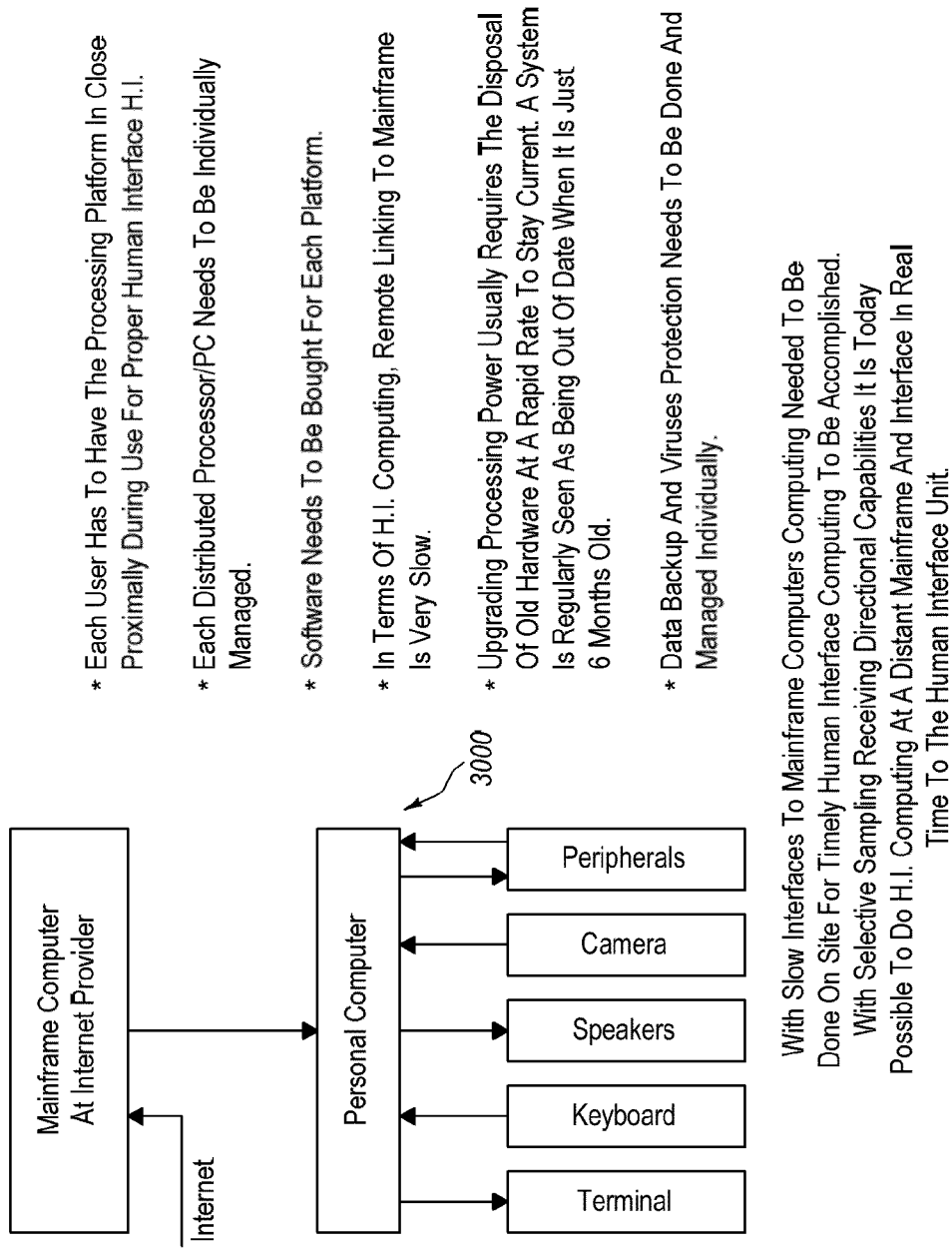
FIG. 30 shows a computing flowchart.

FIG. 30 illustrates a flowchart 3000 for computing. A personal computer typically has a terminal, cameras, speakers, or other peripherals. Each user typical needs the processing platform in close proximity during use. Further, software is often brought to each platform. Further, in terms of computing at an internet provider or mainframe computer, the link is often slow. Thus, the software is brought to the platform proximal the user. Further, the ability to upgrade processing power is often expensive and must be repeated continually since hardware is often out of date.

Figure 31:
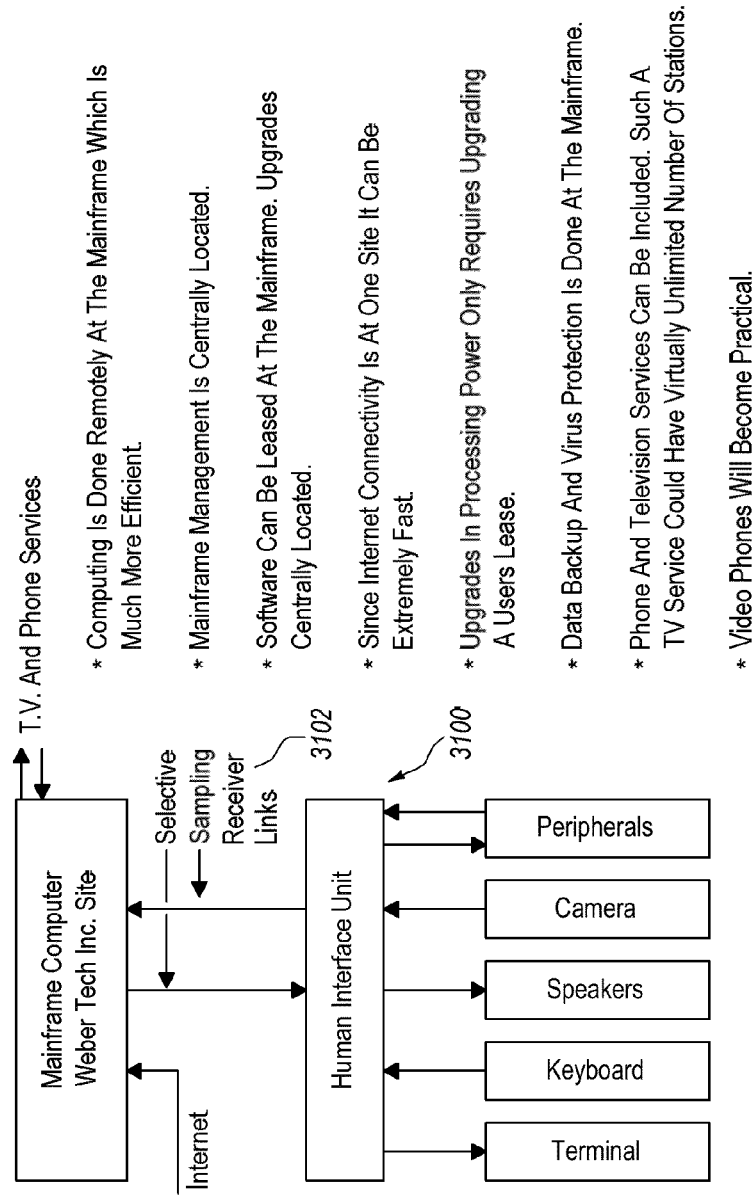
FIG. 31 shows a computing flowchart using SSRs

FIG. 31 illustrates an example of a computing flowchart 3100 that incorporates an SSR 3102. The SSR enables faster speeds such that computing can be done remotely. Software can thus be maintained at the server. The SSR, with its ability to reuse bandwidth as described herein can enable phone and television services, video phones, and the like.

Figure 32:
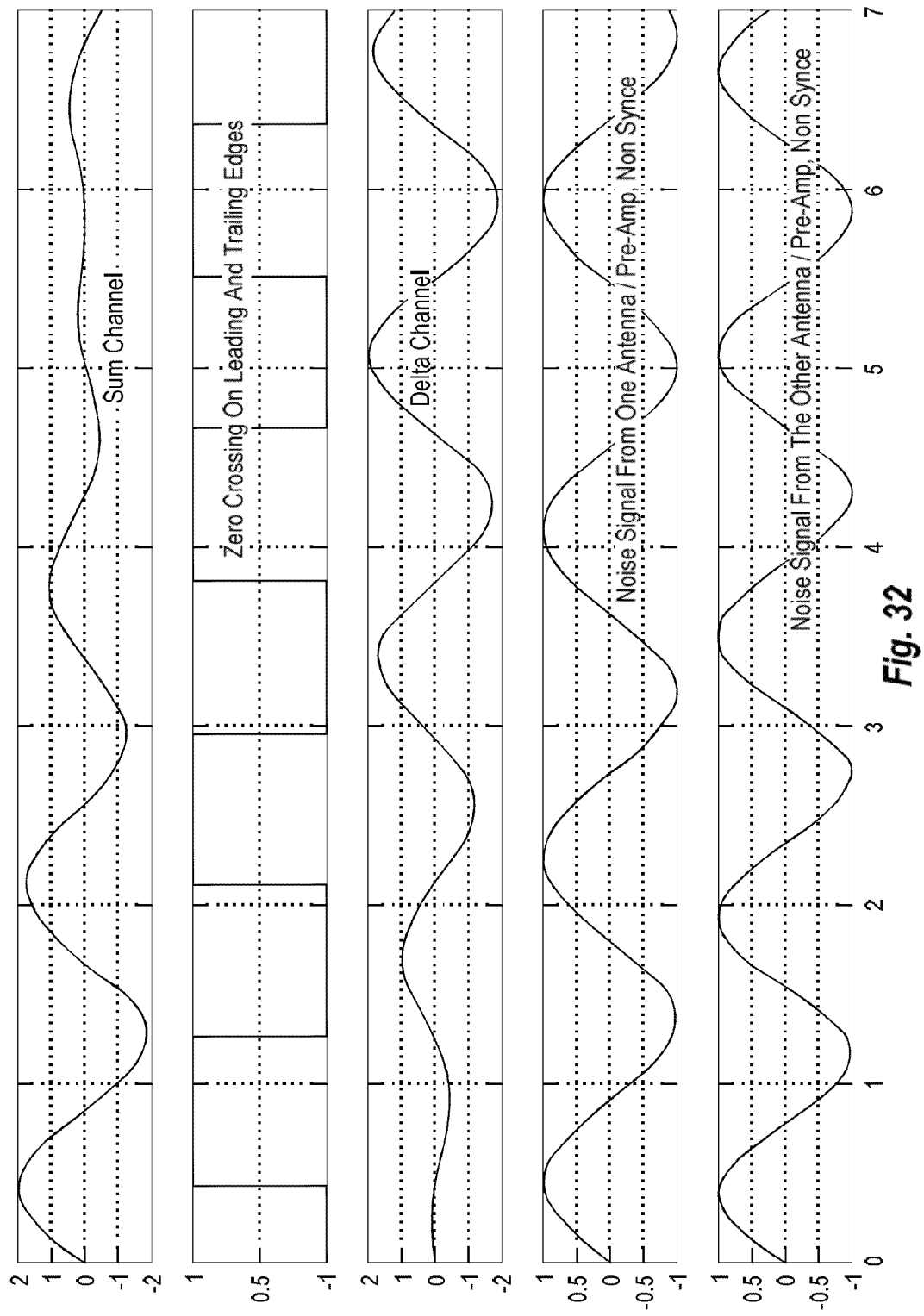
FIG. 32 illustrates thermal noise suppression using an SSR.
Figure 33:
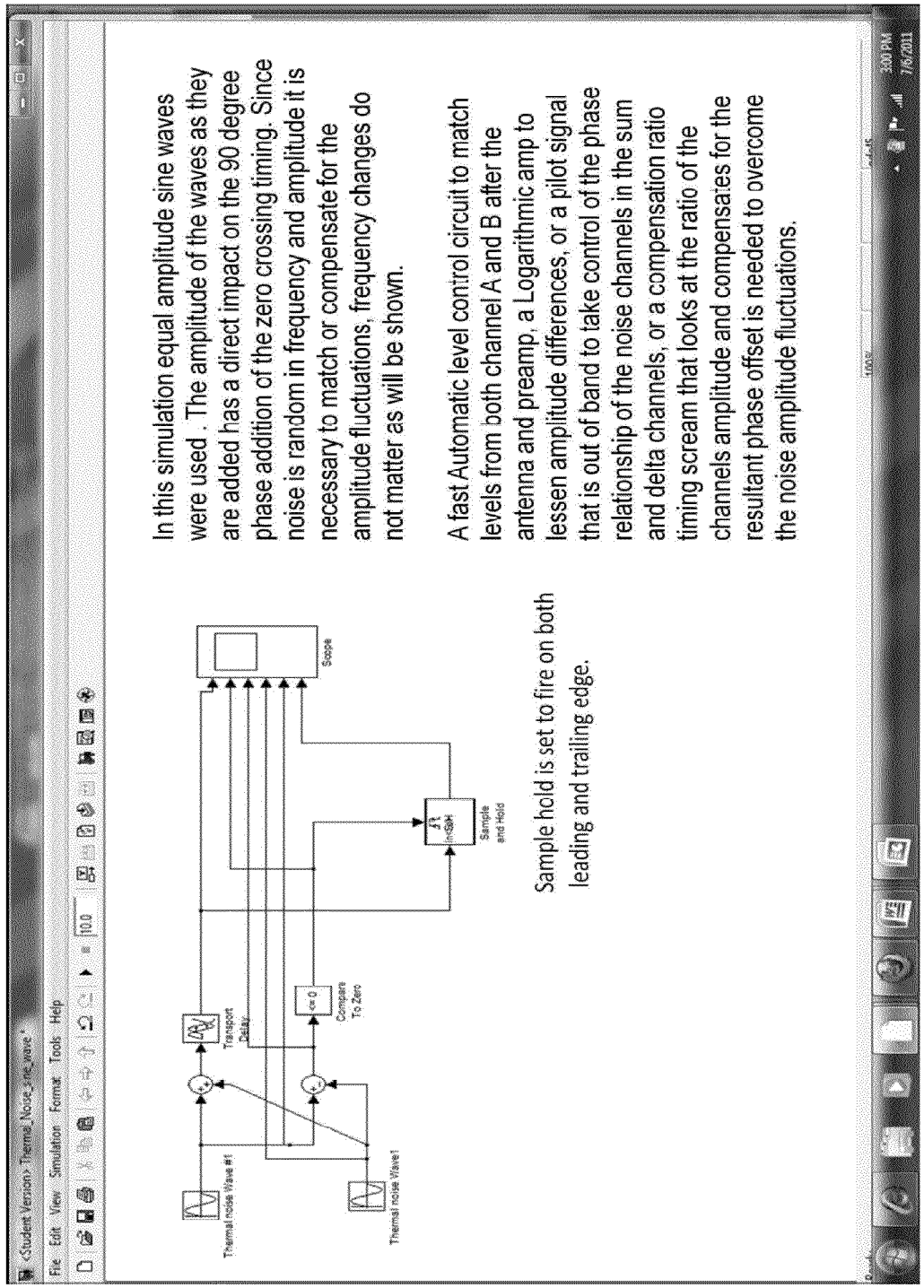
FIGS. 33-37 illustrate examples of a simulation for reducing noise in a signal with an SSR or a plurality of SSRs.
Figure 34:
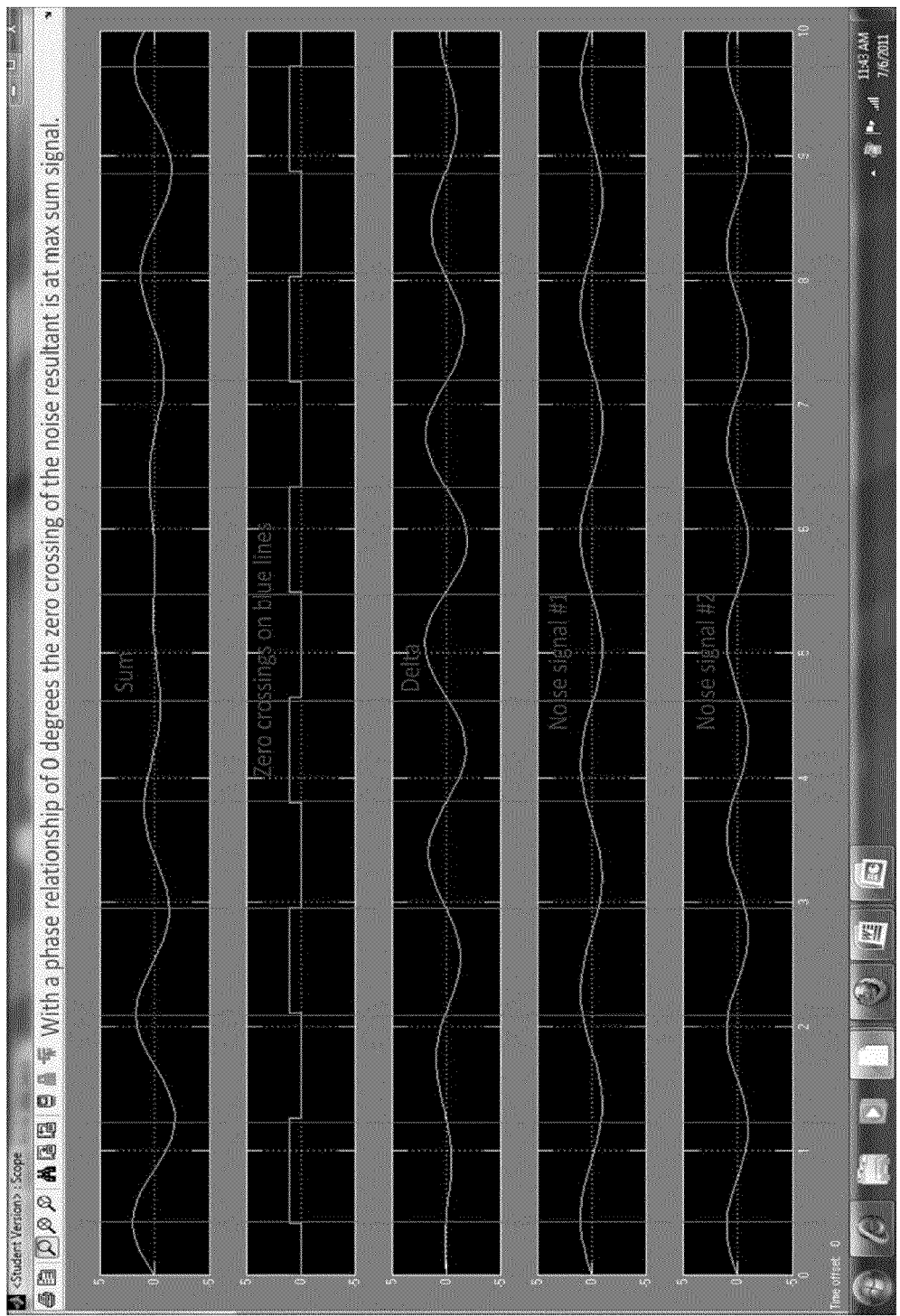
Figure 35:
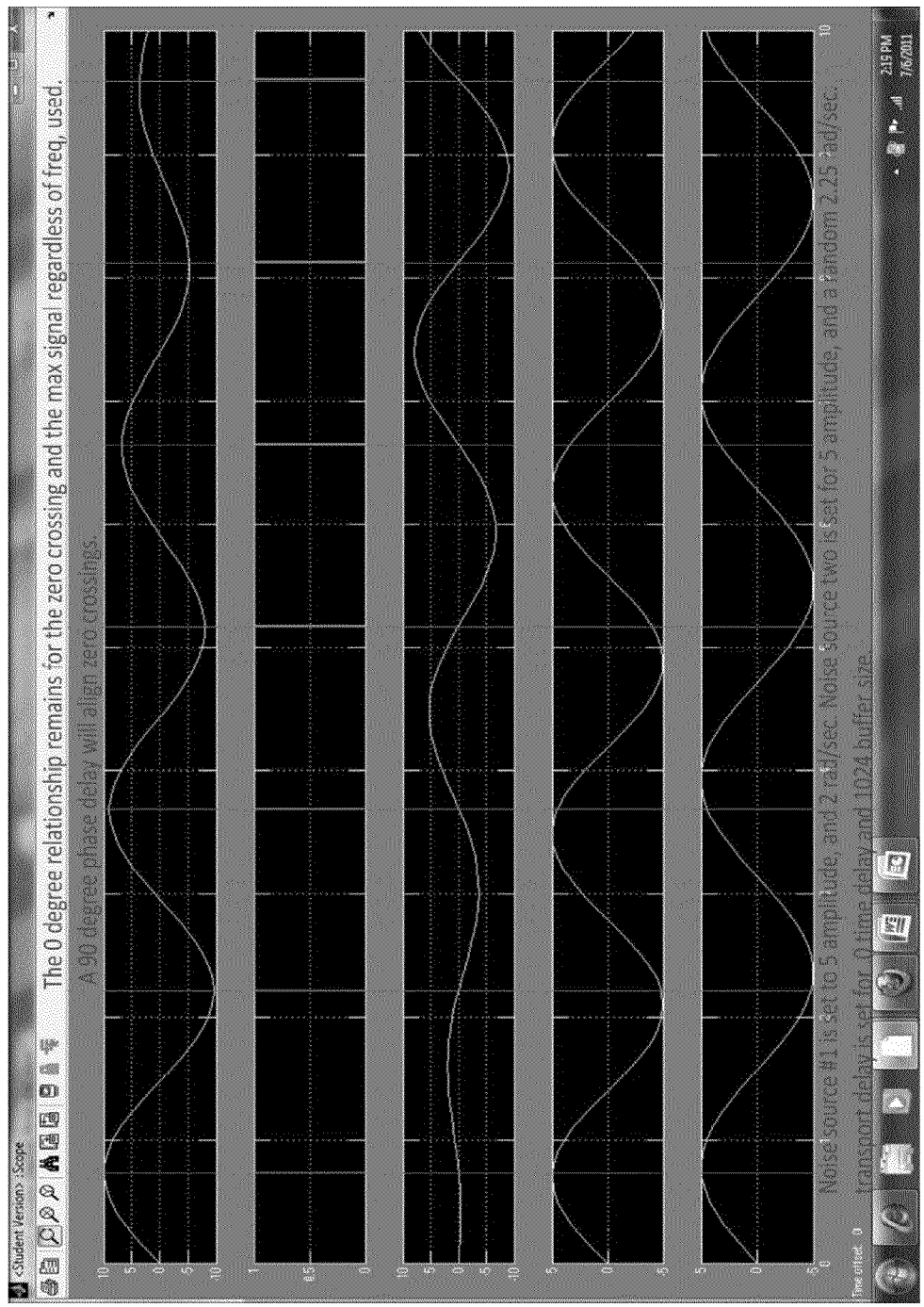
Figure 36:
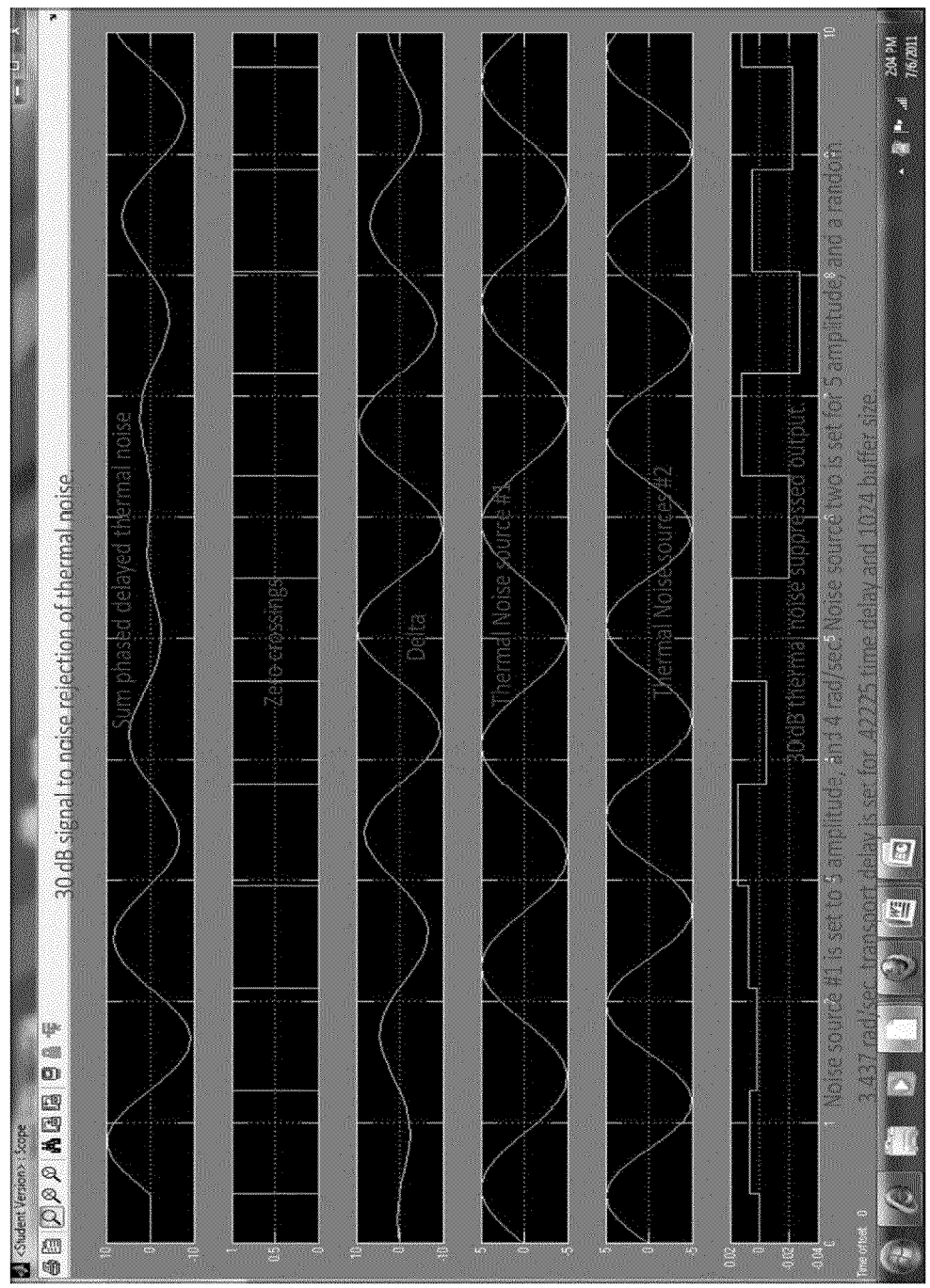
Figure 37:
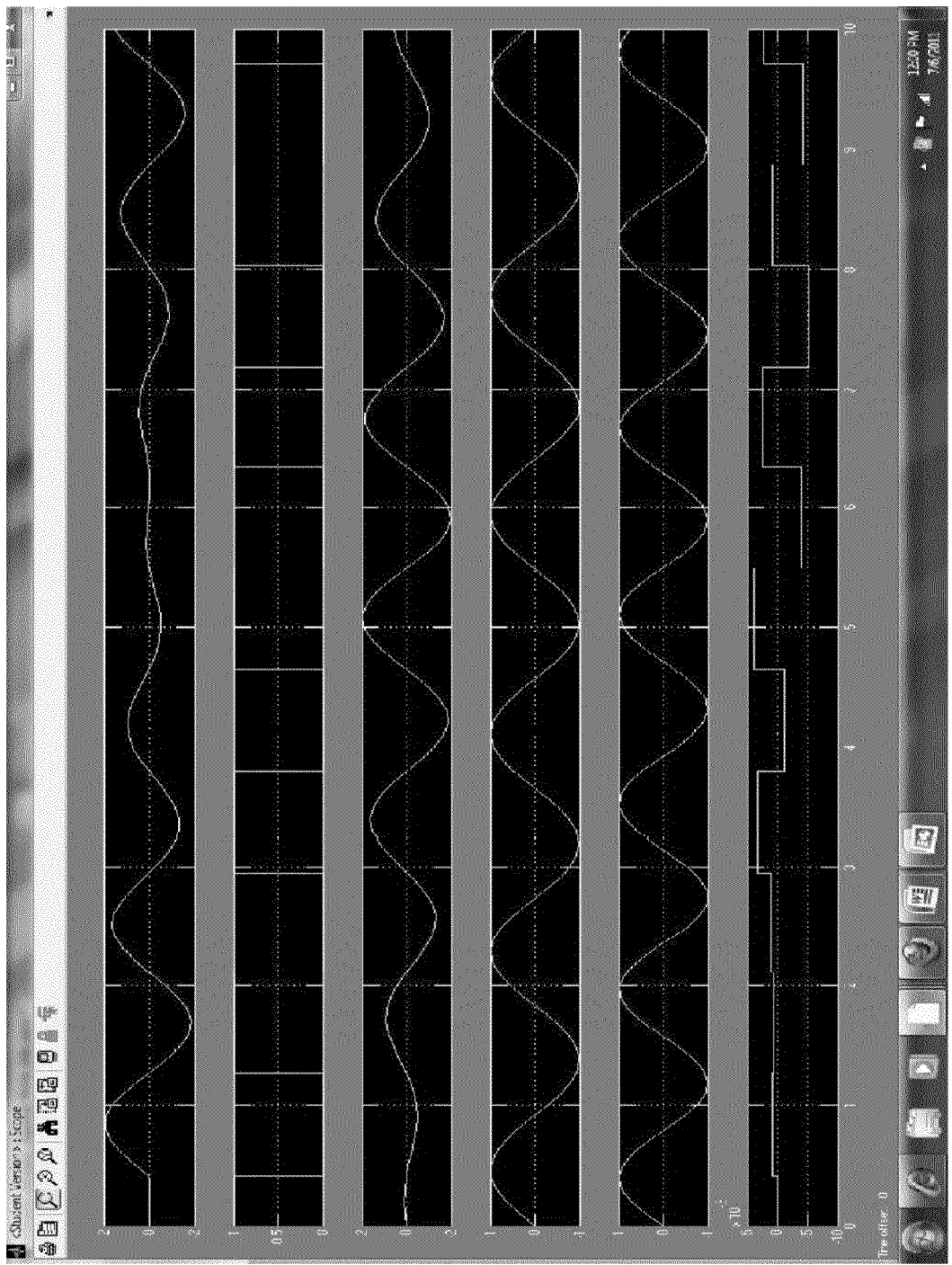

FIG. 32 illustrates an example of a thermal noise simulation where an SSR can reduce or eliminate noise such as thermal noise. The noise signals from the antennas are shown. The sum channel and the delta channel are also shown. Two non synched noise signals that represent thermal noise, one for each antenna, pre-amp/channel before 90 degree offset to sync zero crossings. As a result the zero crossing are on the maximum sum amplitude levels. So after aligning the zero crossings the thermal noise will be greatly suppressed. The delta zero crossing is aligned with the sum maximum. The opposite is true that the delta max is aligned with the sum minimum. As a result a system that triggers off of the maximum positive and negative values in the delta channel would not need to be delayed 90 degrees. In various applications such as carriers with large data bandwidths where the delta/sum channels can move significantly during the 90 degrees of delay this non delayed system is needed.

Embodiments relate to a multiple-sensor antenna array processor that offers a low-complexity implementation, responds rapidly to changes in the signal environment, and offers performance similar to optimal beam-space processors for the case of a single interferer as well as for multiple interferers (e.g., jamming signals, noise signals, etc.).

FIGS. 33-37 illustrate a simulation of an SSR and illustrates an SSR that can identify signals that are unique to each antenna like thermal noise and remove undesirable signals, and the like.

FIG. 41 illustrates an encoding SSR to process encode data streams. An SSR enables data transmitting to be encoded in many different ways. FIG. 41 illustrates 4800 possible transmission types in this example. Selecting the wrong key to for the encoded data stream prevents the data stream from being received.

Figure 43:
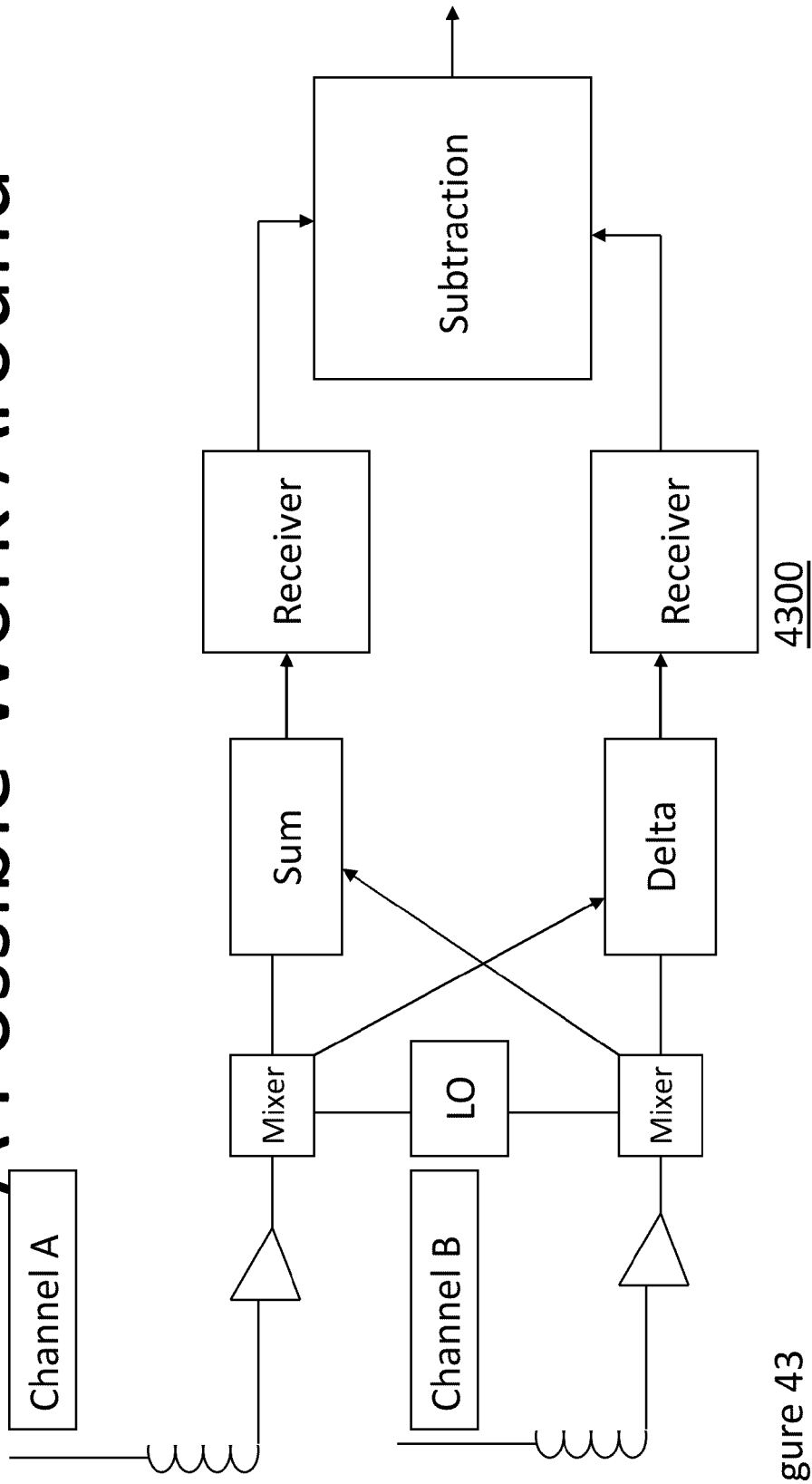
FIG. 43 illustrates an example of a system to recover a desired signal using a subtraction state.

FIG. 43 illustrates an example of a system to recover a desired signal using a subtraction state. In FIG. 43, signals received in the system 4300 as channel A and channel B are mixed and sum and delta channels are created. The sum and delta channels are then provided to a receiver and may be demodulated as discussed herein. The subtraction stage can be used to simply subtract the delta channel from the sum channel, from which the desired signal can be recovered similar to when a selective sampling receiver is used to recover the desired signal as already discussed herein.

In FIG. 43, when two signals are received and offset in such a way as to create a null of one of the signals, this null will create all but the nulled signal in the demodulation of the delta channel.

The sum will create all signals when demodulated in the sum channel. With some demodulations (such as FM), the demodulated signals will be matched except for the sum channel will have the desired signal. This allows for subtraction of the sum and delta channel outputs in the subtraction stage resulting in the nulled signal being left after subtraction since all other signals are present and equal in both sum and delta channels. Better performance can be achieved with Selective Sampling Receiving particularly when using the output of the subtraction as the input to the SSR's desired single input.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

Figure 44:
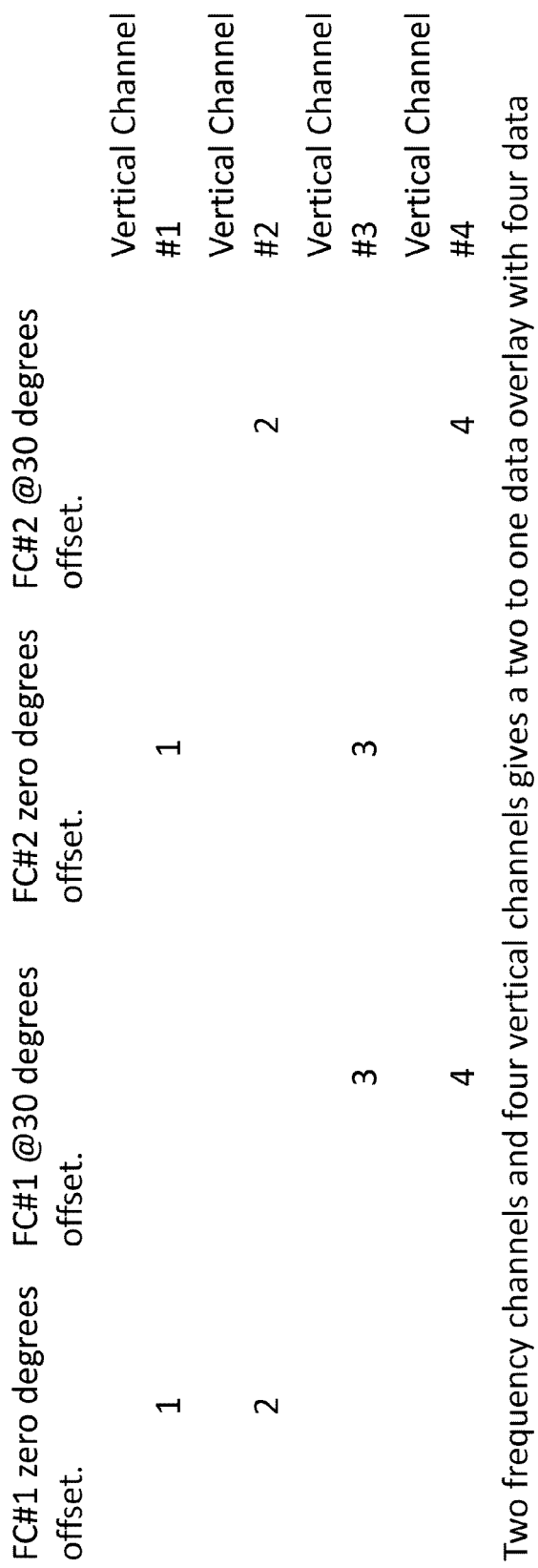
FIG. 44 illustrates an example of transmitting multiple data streams in a cellular network.

FIG. 44 illustrates an example of transmitting multiple data streams in a cellular network. This approach in system 4400 uses frequency channel paring and phase delay. With two frequency channels and four data feeds, three unwanted and one desired, at each frequency a data throughput of X2 is accomplished. FC is a RF frequency channel in one example in.

The foregoing detailed description has set forth various embodiments of the devices and/or processes via the use of block diagrams, flowcharts, and/or examples. Each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

At least a portion of the devices and/or processes described herein can be integrated into a data processing system. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for removing unwanted components from a signal, the method comprising:
    receiving a signal that includes a desired component and an unwanted component;
    receiving timing information of the desired component;
    selective sampling the signal with the timing information or sampling the signal after a demodulation of sum and delta channels to recover the unwanted component with a selective sampling receiver or a subtraction stage; and
    determining the desired component from the signal using the unwanted component.

2. The method of claim 1, wherein the timing information includes zero crossings of the desired component.

3. The method of claim 2, wherein the timing information is delivered at a different frequency or modulated on a carrier.

4. The method of claim 1, further comprising determining the desired component by subtracting, using the selective sampling receiver or the subtraction stage or both the selective sampling receiver and the subtraction stage, the recovered unwanted component from the signal.

5. The method of claim 1, wherein the unwanted component includes noise or thermal noise.

6. A computer readable medium having computer executable instructions for performing a method of claim 1.

7. A method for raising a sampling ratio of samples in a selective sampling receiver to exceed a Nyquist sampling rate, the method comprising:
  receiving first and second signals;
  allowing a higher frequency signal having a larger amplitude than the first and second signals to coherently generate mixed first and second signals; and
  sampling the mixed first and second signals at zero crossings, wherein an amplitude of a desired signal is offset by an instantaneous amplitude of the desired signal, wherein the desired signal is included in one of the first and second signals, wherein the higher frequency signal produces multiple zero crossings for sum and delta channels or the first signal and/or the second signal, wherein the first signal and/or the second signal are reconstructed from samples taken at the multiple zero crossings.

8. The method of claim 7, further comprising tuning out noise based on at least one of an angle of approach using antenna networks and nulls, frequency matched signals, phase delay, signal polarity and modulation type.

9. A method for using a bandwidth to transmit multiple data streams, the method comprising:
  sending multiple data streams over a network;
  receiving the multiple data streams with a receiver; and
  separating the multiple data streams, wherein the receiver separates each of the multiple streams; and
  recovering a particular coherent data stream from the multiple data streams using a selective sampling receiver or a cancelation/subtraction stage, wherein other data streams appear as non-coherent noise with respect to the particular data stream, wherein the receiver separates out the particular data stream by treating the other data streams in the multiple data streams as the non-coherent noise.

10. The method of claim 9, further comprising sending the multiple data streams over multiple frequency channels.

11. The method of claim 9, wherein separating the multiple data stream comprises separating the multiple data streams based on amplitude.

12. The method of claim 9, wherein separating the multiple data streams comprises separating the multiple data streams based on phase or time delays.

13. The method of claim 9, wherein the receiver comprises a selective sampling receiver.

14. The method of claim 12, wherein the receiver includes a sum channel and a delta channel, wherein outputs of the sum channel and the delta channel are provided to a selective sampling receiver in order to separate the multiple data streams.

15. The method of claim 9, further comprising transmitting each data stream twice, once as an original signal and once as an altered signal.

16. The method of claim 15, wherein the altered signal is a delayed/phased signal and a delay/phase is determined and used to recover a particular data stream by making a desired data stream coherent before a delta channel nulls the desired data stream for use in a selective sampling receiver, digitally sampling based on a delay for the particular data stream before signal processing applied by the selective sampling process.

17. The method of claim 10, further comprising performing a selective sampling process or a subtraction stage in software.

18. The method of claim 15, wherein the altered signal includes an amplitude change.

19. The method of claim 15, wherein a selective sampling receiver transmits the multiple data streams and wherein another selective sampling receiver receives the multiple data streams and is configured to separate the multiple data streams.

* * * * *